US008400296B2

(12) United States Patent
Brinton et al.

(10) Patent No.: US 8,400,296 B2
(45) Date of Patent: Mar. 19, 2013

(54) METHOD AND APPARATUS TO AUTOMATE DATA COLLECTION DURING A MANDATORY INSPECTION

(75) Inventors: Brett Brinton, Burien, WA (US); Charles Michael McQuade, Issaquah, WA (US); William Brinton, Jr., Kent, WA (US); Daniel Mayer, Issaquah, WA (US); Eric Manegold, Federal Way, WA (US); Richard Lugash, Los Angeles, CA (US); Robie G. Russell, Seattle, WA (US)

(73) Assignee: Zonar Systems, Inc., Seattle, WA (US)

( * ) Notice: Subject to any disclaimer, the term of this patent is extended or adjusted under 35 U.S.C. 154(b) by 533 days.

(21) Appl. No.: 12/475,218

(22) Filed: May 29, 2009

(65) Prior Publication Data

US 2009/0237245 A1   Sep. 24, 2009

Related U.S. Application Data

(63) Continuation-in-part of application No. 11/425,222, filed on Jun. 20, 2006, now Pat. No. 7,564,375, which is a continuation-in-part of application No. 11/247,953, filed on Oct. 11, 2005, now Pat. No. 7,362,229, which is a continuation-in-part of (Continued)

(51) Int. Cl.
*G21C 17/013* (2006.01)
*G01M 17/00* (2006.01)

(52) U.S. Cl. ......... 340/539.24; 340/539.23; 340/539.11; 702/182; 702/184; 701/29.1

(58) Field of Classification Search .......... 702/182–187; 701/29–35; 705/26.61, 305–307; 340/439, 340/539.13, 539.22, 539.26, 539.23, 539.24
See application file for complete search history.

(56) References Cited

U.S. PATENT DOCUMENTS

| 3,573,620 A | 4/1971 | Ashley et al. |
| 3,990,067 A | 11/1976 | Van Dusen et al. ........... 340/306 |
| 4,025,791 A | 5/1977 | Lennington et al. .......... 250/341 |

(Continued)

FOREIGN PATENT DOCUMENTS

| CA | 2 138 378 | 11/1994 |
| CA | 2 326 892 | 10/1999 |

(Continued)

OTHER PUBLICATIONS

Tuttle, John R. "Digital RF/ID Enhances GPS" Proceedings of the Second Annual Wireless Symposium, pp. 406-411, Feb. 15-18, 1994, Santa Clara, CA.

(Continued)

*Primary Examiner* — George Bugg
*Assistant Examiner* — Anne Lai
(74) *Attorney, Agent, or Firm* — Michael C. King

(57) ABSTRACT

A system and method for verifying that an operator was sufficiently close to one or more items to be inspected during an inspection to actually inspect the components, and storing an indication to that effect in a memory accessible via a computer network. In addition to the indication, the memory can store other inspection related data, such as a starting time or ending time of the inspection, or maintenance information about the item that was input during the inspection. The system and method enable a third party application, such as an accounting program or a maintenance program, to access any of the inspection related data.

21 Claims, 20 Drawing Sheets

Related U.S. Application Data application No. 10/915,957, filed on Aug. 11, 2004, now Pat. No. 7,557,696, which is a continuation-in-part of application No. 10/219,892, filed on Aug. 15, 2002, now Pat. No. 6,804,626, which is a continuation-in-part of application No. 09/951,104, filed on Sep. 11, 2001, now Pat. No. 6,671,646, said application No. 11/425,222 is a continuation-in-part of application No. 10/862,122, filed on Jun. 3, 2004, now Pat. No. 7,117,121.

(56) References Cited

U.S. PATENT DOCUMENTS

| | | | | |
|---|---|---|---|---|
| 4,092,718 | A | 5/1978 | Wendt | 364/436 |
| 4,258,421 | A | 3/1981 | Juhasz et al. | 364/424 |
| 4,263,945 | A | 4/1981 | Van Ness | 141/98 |
| 4,325,057 | A | 4/1982 | Bishop | 340/539 |
| 4,469,149 | A | 9/1984 | Walkey et al. | 141/94 |
| 4,602,127 | A | 7/1986 | Neely et al. | 379/68 |
| 4,658,371 | A | 4/1987 | Walsh et al. | 364/550 |
| 4,763,356 | A | 8/1988 | Day, Jr. et al. | 379/368 |
| 4,799,162 | A | 1/1989 | Shinakawa et al. | 364/436 |
| 4,804,937 | A | 2/1989 | Barbiaux et al. | 340/52 F |
| 4,846,233 | A | 7/1989 | Fockens | 141/94 |
| 4,897,792 | A | 1/1990 | Hosoi | 364/449 |
| 4,934,419 | A | 6/1990 | Lamont et al. | 141/94 |
| 4,935,195 | A | 6/1990 | Palusamy et al. | 376/249 |
| 5,058,044 | A | 10/1991 | Stewart et al. | 364/551.01 |
| 5,068,656 | A | 11/1991 | Sutherland | 340/989 |
| 5,072,380 | A | 12/1991 | Randelman et al. | 364/406 |
| 5,120,942 | A | 6/1992 | Holland | 235/376 |
| 5,128,651 | A | 7/1992 | Heckart | 340/433 |
| 5,204,819 | A | 4/1993 | Ryan | 364/465 |
| 5,206,643 | A | 4/1993 | Eckelt | 340/932.2 |
| 5,223,844 | A | 6/1993 | Mansell et al. | 342/357.07 |
| 5,243,323 | A | 9/1993 | Rogers | 340/433 |
| 5,321,629 | A | 6/1994 | Shirata et al. | 702/187 |
| 5,337,003 | A | 8/1994 | Carmichael et al. | 324/402 |
| 5,359,522 | A | 10/1994 | Ryan | 364/465 |
| 5,394,136 | A | 2/1995 | Lammers et al. | 340/439 |
| 5,399,844 | A | 3/1995 | Holland | 235/376 |
| 5,442,553 | A | 8/1995 | Parillo | 364/424.04 |
| 5,459,304 | A | 10/1995 | Eisenmann | 235/380 |
| 5,459,660 | A | 10/1995 | Berra | 701/33 |
| 5,479,479 | A | 12/1995 | Braitberg et al. | 379/58 |
| 5,488,352 | A | 1/1996 | Jasper | 340/431 |
| 5,499,182 | A | 3/1996 | Ousborne | 364/424.04 |
| 5,541,845 | A | 7/1996 | Klein | 364/449 |
| 5,546,305 | A | 8/1996 | Kondo | 364/424.03 |
| 5,557,254 | A | 9/1996 | Johnson et al. | 340/426 |
| 5,557,268 | A | 9/1996 | Hughes et al. | 340/933 |
| 5,572,192 | A | 11/1996 | Berube | 340/574 |
| 5,585,552 | A | 12/1996 | Heuston et al. | 73/116 |
| 5,594,650 | A | 1/1997 | Shah et al. | 364/449.1 |
| 5,596,501 | A | 1/1997 | Comer et al. | 364/464.23 |
| 5,600,323 | A | 2/1997 | Boschini | 341/173 |
| 5,610,596 | A | 3/1997 | Petitclerc | 340/825.23 |
| 5,623,258 | A | 4/1997 | Dorfman | 340/825.08 |
| 5,629,678 | A | 5/1997 | Gargano et al. | 340/573.4 |
| 5,671,158 | A | 9/1997 | Fournier et al. | 345/8 |
| 5,680,328 | A | 10/1997 | Skorupski et al. | 364/550 |
| 5,719,771 | A | 2/1998 | Buck et al. | 364/443 |
| 5,731,893 | A | 3/1998 | Dominique | 359/379 |
| 5,732,074 | A | 3/1998 | Spaur et al. | 370/313 |
| 5,742,915 | A | 4/1998 | Stafford | 701/35 |
| 5,745,049 | A | 4/1998 | Akiyama et al. | 340/870.17 |
| 5,758,299 | A | 5/1998 | Sandborg et al. | 701/29 |
| 5,758,300 | A | 5/1998 | Abe | 701/33 |
| 5,781,871 | A | 7/1998 | Mezger et al. | 701/33 |
| 5,794,164 | A | 8/1998 | Beckert et al. | 701/1 |
| 5,808,565 | A | 9/1998 | Matta et al. | 340/994 |
| 5,809,437 | A | 9/1998 | Breed | 701/29 |
| 5,815,071 | A | 9/1998 | Doyle | 340/439 |
| 5,835,871 | A | 11/1998 | Smith et al. | 701/29 |
| 5,838,251 | A | 11/1998 | Brinkmeyer et al. | 340/825.31 |
| 5,839,112 | A | 11/1998 | Schreitmueller et al. | 705/4 |
| 5,856,931 | A * | 1/1999 | McCasland | 702/182 |
| 5,867,404 | A | 2/1999 | Bryan | 364/550 |
| 5,874,891 | A | 2/1999 | Lowe | 340/433 |
| 5,884,202 | A | 3/1999 | Arjomand | 701/29 |
| 5,890,061 | A | 3/1999 | Timm et al. | 455/404 |
| 5,890,520 | A | 4/1999 | Johnson, Jr. | 141/94 |
| 5,892,441 | A * | 4/1999 | Woolley et al. | 340/539.26 |
| 5,913,180 | A | 6/1999 | Ryan | 702/45 |
| 5,922,037 | A | 7/1999 | Potts | 701/29 |
| 5,923,572 | A | 7/1999 | Pollock | 364/528.17 |
| 5,942,753 | A | 8/1999 | Dell | 250/338.1 |
| 5,956,259 | A | 9/1999 | Hartsell, Jr. et al. | 364/528.37 |
| 5,995,898 | A | 11/1999 | Tuttle | 701/102 |
| 6,009,355 | A | 12/1999 | Obradovich et al. | 701/1 |
| 6,009,363 | A | 12/1999 | Beckert et al. | 701/33 |
| 6,016,795 | A | 1/2000 | Ohki | 123/681 |
| 6,024,142 | A | 2/2000 | Bates | 141/94 |
| 6,025,776 | A | 2/2000 | Matsuura | 340/438 |
| 6,043,661 | A | 3/2000 | Gutierrez | 324/504 |
| 6,054,950 | A | 4/2000 | Fontana | 342/463 |
| 6,061,614 | A | 5/2000 | Carrender et al. | 701/33 |
| 6,064,299 | A | 5/2000 | Leseskey et al. | 340/431 |
| 6,070,156 | A | 5/2000 | Hartsell, Jr. | 705/413 |
| 6,078,255 | A | 6/2000 | Dividock et al. | 340/539 |
| 6,084,870 | A | 7/2000 | Wooten et al. | 370/349 |
| 6,092,021 | A | 7/2000 | Ehlbeck et al. | 701/123 |
| 6,107,915 | A | 8/2000 | Reavell et al. | 340/433 |
| 6,107,917 | A | 8/2000 | Carrender et al. | 340/505 |
| 6,112,152 | A | 8/2000 | Tuttle | 701/115 |
| 6,127,947 | A | 10/2000 | Uchida et al. | 340/999 |
| 6,128,551 | A | 10/2000 | Davis et al. | 700/236 |
| 6,128,959 | A | 10/2000 | McGovern et al. | 73/660 |
| 6,144,301 | A * | 11/2000 | Frieden | 340/572.8 |
| 6,169,938 | B1 | 1/2001 | Hartsell, Jr. | 700/302 |
| 6,169,943 | B1 | 1/2001 | Simon et al. | 701/29 |
| 6,199,099 | B1 | 3/2001 | Gershman et al. | 709/203 |
| 6,202,008 | B1 | 3/2001 | Beckert et al. | 701/33 |
| 6,208,948 | B1 | 3/2001 | Klingler et al. | 702/183 |
| 6,236,911 | B1 | 5/2001 | Kruger | 701/1 |
| 6,240,365 | B1 | 5/2001 | Bunn | 701/213 |
| 6,253,129 | B1 | 6/2001 | Jenkins et al. | 701/29 |
| 6,256,579 | B1 | 7/2001 | Tanimoto | 701/201 |
| 6,259,358 | B1 | 7/2001 | Fjordbotten | 340/433 |
| 6,263,273 | B1 | 7/2001 | Henneken et al. | 701/51 |
| 6,263,276 | B1 | 7/2001 | Yokoyama et al. | 701/207 |
| 6,278,936 | B1 | 8/2001 | Jones | 701/201 |
| 6,285,953 | B1 | 9/2001 | Harrison et al. | 701/213 |
| 6,295,492 | B1 | 9/2001 | Lang et al. | 701/33 |
| 6,330,499 | B1 | 12/2001 | Chou et al. | 701/33 |
| 6,339,745 | B1 | 1/2002 | Novik | 701/208 |
| 6,362,730 | B2 | 3/2002 | Razavi et al. | 340/438 |
| 6,370,454 | B1 | 4/2002 | Moore | 701/29 |
| 6,374,176 | B1 | 4/2002 | Schmier et al. | 701/200 |
| 6,396,413 | B2 | 5/2002 | Hines et al. | 340/825.49 |
| 6,411,203 | B1 | 6/2002 | Leseskey et al. | 340/431 |
| 6,411,891 | B1 | 6/2002 | Jones | 701/201 |
| 6,417,760 | B1 | 7/2002 | Mabuchi et al. | 340/5.3 |
| 6,438,472 | B1 | 8/2002 | Tano et al. | 701/35 |
| 6,450,411 | B1 | 9/2002 | Rash et al. | 236/44 A |
| 6,456,039 | B1 | 9/2002 | Lauper et al. | 320/107 |
| 6,502,030 | B2 | 12/2002 | Hilleary | 701/207 |
| 6,505,106 | B1 | 1/2003 | Lawrence | 701/35 |
| 6,507,810 | B2 | 1/2003 | Razavi et al. | 703/24 |
| 6,529,723 | B1 | 3/2003 | Bentley | 455/405 |
| 6,529,808 | B1 | 3/2003 | Diem | 701/29 |
| 6,539,296 | B2 | 3/2003 | Diaz et al. | 701/33 |
| 6,594,579 | B1 | 7/2003 | Lowrey et al. | 701/123 |
| 6,594,621 | B1 * | 7/2003 | Meeker | 702/185 |
| 6,597,973 | B1 | 7/2003 | Barich et al. | 701/29 |
| 6,604,033 | B1 | 8/2003 | Banet et al. | 701/33 |
| 6,608,554 | B2 | 8/2003 | Leseskey et al. | 340/431 |
| 6,609,082 | B2 | 8/2003 | Wagner | 702/182 |
| 6,611,740 | B2 | 8/2003 | Lowrey et al. | 701/29 |
| 6,614,392 | B2 | 9/2003 | Howard | 342/357.07 |
| 6,616,036 | B2 | 9/2003 | Streicher et al. | 235/381 |
| 6,621,452 | B2 | 9/2003 | Knockeart et al. | 342/357.09 |
| 6,631,271 | B1 * | 10/2003 | Logan | 455/456.1 |

| | | | |
|---|---|---|---|
| 6,636,790 B1 | 10/2003 | Lightner et al. | 701/33 |
| 6,664,897 B2 | 12/2003 | Pape et al. | 340/573.3 |
| 6,671,646 B2 | 12/2003 | Manegold et al. | 702/127 |
| 6,680,694 B1 | 1/2004 | Knockeart et al. | 342/357.09 |
| 6,708,113 B1 | 3/2004 | Von Gerlach et al. | 701/210 |
| 6,714,859 B2 | 3/2004 | Jones | 701/201 |
| 6,727,818 B1 | 4/2004 | Wildman et al. | 340/573.1 |
| 6,732,031 B1 | 5/2004 | Lightner et al. | 701/33 |
| 6,732,032 B1 | 5/2004 | Banet et al. | 701/33 |
| 6,744,352 B2 | 6/2004 | Leseskey et al. | 340/431 |
| 6,754,183 B1 | 6/2004 | Razavi et al. | 370/254 |
| 6,768,994 B1 | 7/2004 | Howard et al. | 707/10 |
| 6,804,606 B2 | 10/2004 | Jones | 701/213 |
| 6,804,626 B2 | 10/2004 | Manegold et al. | 702/182 |
| 6,834,259 B1 | 12/2004 | Markwitz et al. | 702/187 |
| 6,856,820 B1 | 2/2005 | Kolls | 455/575.9 |
| 6,876,642 B1 | 4/2005 | Adams et al. | 370/338 |
| 6,879,894 B1 | 4/2005 | Lightner et al. | 701/33 |
| 6,880,390 B2 | 4/2005 | Emord | 701/103 |
| 6,894,617 B2 | 5/2005 | Richman | 340/573.1 |
| 6,899,151 B1 | 5/2005 | Latka et al. | 141/392 |
| 6,904,359 B2 | 6/2005 | Jones | 701/204 |
| 6,909,947 B2 | 6/2005 | Douros et al. | 701/29 |
| 6,928,348 B1 | 8/2005 | Lightner et al. | 701/33 |
| 6,940,392 B2 * | 9/2005 | Chan et al. | 340/10.4 |
| 6,946,953 B2 | 9/2005 | Leseskey et al. | 340/431 |
| 6,952,645 B1 | 10/2005 | Jones | 701/201 |
| 6,957,133 B1 | 10/2005 | Hunt et al. | 701/29 |
| 6,972,668 B2 | 12/2005 | Schauble | 340/438 |
| 6,988,033 B1 | 1/2006 | Lowrey et al. | 701/123 |
| 7,005,968 B1 * | 2/2006 | Bridgelall | 340/10.42 |
| 7,027,955 B2 | 4/2006 | Markwitz et al. | 702/187 |
| 7,048,185 B2 | 5/2006 | Hart et al. | 235/384 |
| 7,103,460 B1 | 9/2006 | Breed | 701/29 |
| 7,113,127 B1 | 9/2006 | Banet et al. | 342/357.07 |
| 7,117,121 B2 | 10/2006 | Brinton et al. | 702/182 |
| 7,155,199 B2 | 12/2006 | Zalewski et al. | 455/403 |
| 7,174,243 B1 | 2/2007 | Lightner et al. | 701/33 |
| 7,174,277 B2 | 2/2007 | Vock et al. | 702/188 |
| 7,225,065 B1 | 5/2007 | Hunt et al. | 701/29 |
| 7,228,211 B1 | 6/2007 | Lowrey et al. | 701/29 |
| 7,254,516 B2 | 8/2007 | Case, Jr. et al. | 702/182 |
| 7,341,197 B2 * | 3/2008 | Muehl et al. | 235/492 |
| 7,343,252 B2 | 3/2008 | Wiens | 702/54 |
| 7,362,229 B2 | 4/2008 | Brinton et al. | 340/572.1 |
| 7,447,574 B1 | 11/2008 | Washicko et al. | 701/29 |
| 7,477,968 B1 | 1/2009 | Lowrey et al. | 701/29 |
| 7,480,551 B1 | 1/2009 | Lowrey et al. | 701/29 |
| 7,523,159 B1 | 4/2009 | Williams et al. | 709/203 |
| 7,532,962 B1 | 5/2009 | Lowrey et al. | 701/29 |
| 7,532,963 B1 | 5/2009 | Lowrey et al. | 701/29 |
| 7,596,437 B1 | 9/2009 | Hunt et al. | 701/29 |
| 7,604,169 B2 | 10/2009 | Demere | 235/384 |
| 7,640,185 B1 | 12/2009 | Giordano et al. | 705/23 |
| 7,650,210 B2 | 1/2010 | Breed | 701/29 |
| 7,672,756 B2 | 3/2010 | Breed | 701/29 |
| 7,672,763 B1 | 3/2010 | Hunt et al. | 701/29 |
| 7,778,752 B1 | 8/2010 | Hunt et al. | 701/36 |
| 2001/0002464 A1 * | 5/2001 | Hogan | 702/186 |
| 2001/0047283 A1 | 11/2001 | Melick et al. | 705/8 |
| 2001/0053983 A1 | 12/2001 | Reichwein et al. | 705/1 |
| 2002/0016655 A1 | 2/2002 | Joao | 701/35 |
| 2002/0022979 A1 | 2/2002 | Whipp et al. | 705/5 |
| 2002/0022984 A1 * | 2/2002 | Daniel et al. | 705/8 |
| 2002/0065698 A1 | 5/2002 | Schick et al. | 705/8 |
| 2002/0107833 A1 | 8/2002 | Kerkinni | 707/1 |
| 2002/0107873 A1 | 8/2002 | Winkler et al. | 707/104.1 |
| 2002/0111725 A1 | 8/2002 | Burge | 701/29 |
| 2002/0122583 A1 | 9/2002 | Thompson | 382/141 |
| 2002/0133273 A1 | 9/2002 | Lowrey et al. | 701/29 |
| 2002/0133275 A1 | 9/2002 | Thibault | 701/35 |
| 2002/0147610 A1 | 10/2002 | Tabe | 705/1 |
| 2002/0150050 A1 | 10/2002 | Nathanson | 370/241 |
| 2002/0156558 A1 | 10/2002 | Hanson et al. | 701/33 |
| 2002/0163449 A1 | 11/2002 | Flick | 340/988 |
| 2002/0178147 A1 | 11/2002 | Arroyo et al. | 707/2 |
| 2002/0188593 A1 | 12/2002 | Moser et al. | 707/1 |
| 2003/0030550 A1 | 2/2003 | Talbot | 340/433 |
| 2003/0033061 A1 | 2/2003 | Chen et al. | 701/33 |
| 2003/0109973 A1 | 6/2003 | Hensey et al. | 701/35 |
| 2003/0120745 A1 | 6/2003 | Katagishi et al. | 709/217 |
| 2004/0009819 A1 | 1/2004 | Koga | 464/51 |
| 2004/0236596 A1 | 11/2004 | Chowdhary et al. | 705/1 |
| 2005/0273250 A1 | 12/2005 | Hamilton et al. | 701/200 |
| 2006/0232406 A1 | 10/2006 | Filibeck | 340/572.1 |
| 2007/0050193 A1 | 3/2007 | Larson | 705/1 |
| 2007/0069947 A1 | 3/2007 | Banet et al. | 342/357.09 |
| 2007/0179709 A1 | 8/2007 | Doyle | 701/209 |
| 2008/0154489 A1 | 6/2008 | Kaneda et al. | 701/201 |
| 2008/0154712 A1 | 6/2008 | Wellman | 705/11 |
| 2008/0319665 A1 | 12/2008 | Berkobin et al. | 701/213 |
| 2009/0069999 A1 | 3/2009 | Bos | 701/102 |
| 2009/0177350 A1 | 7/2009 | Williams et al. | 701/29 |
| 2009/0222200 A1 | 9/2009 | Link, II et al. | 701/202 |
| 2010/0088127 A1 | 4/2010 | Betancourt et al. | 705/5 |

FOREIGN PATENT DOCUMENTS

| | | |
|---|---|---|
| CA | 2 388 572 | 5/2001 |
| EP | 0 755 039 | 6/1996 |
| EP | 0 814 447 | 5/1997 |
| EP | 1 067 498 | 7/2000 |
| EP | 1 271 374 | 6/2002 |
| EP | 0 926 020 | 9/2002 |
| EP | 1 005 627 | 10/2003 |
| EP | 1 027 792 | 1/2004 |
| EP | 2 116 968 | 11/2009 |
| WO | WO 97/26750 | 7/1997 |
| WO | WO 98/03952 | 1/1998 |
| WO | WO 98/30920 | 7/1998 |
| WO | WO 03/023550 | 3/2003 |
| WO | WO 2007/092711 | 8/2007 |

OTHER PUBLICATIONS

Guensler et al., "Development of a Comprehensive Vehicle Instrumentation Package for Monitoring Individual Tripmaking Behavior." *Georgia Institute of Technology: School of Civil and Environmental Engineering*: 31pp., Feb. 1999.

Jenkins et al., "Real-Time Vehicle Performance Monitoring Using Wireless Networking." *IASTED International Conference on Communications, Internet, and Information Technology*: 375-380, Nov. 22-24, 2004.

Kwon, W., "Networking Technologies of In-Vehicle." *Seoul National University: School of electrical engineering*: 44pp., Mar. 8, 2000.

Leavitt, Wendy., "The Convergence Zone." *FleetOwner*, 4pp. <www.driversmag.com/ar/fleet_convergence_zone/index.html> 1998.

Miras. "About SPS Technologies." 1pg., May 7, 1999.

Miras. "How MIRAS Works." 1pg., Apr. 29, 1999.

Miras. "Miras 4.0 Screenshot." 1pg., May 7, 1999.

Miras. "MIRAS Unit." 1pg., May 4, 1999.

Miras. "Monitoring Vehicle Functions." 1pg., Apr. 27, 1999.

Miras. "Remote Control." 1pg., Apr. 29, 1999.

Miras. "Tracking & Monitoring Software." 1pg., Apr. 29, 1999.

"OBD Up." *MOTOR*: 28-34, Jul. 1998.

Sterzbach et al., "A Mobile Vehicle On-Board Computing and Communication System." *Comput. & Graphics*, vol. 20, No. 4: 659-667, 1996.

Zujkowski, Stephen. "Savi Technolgy, Inc.: Savi Security and Productivity Systems." *ATA Security Forum 2002*, Chicago, IL: 21pp., May 15, 2002.

n.a., "Private fleets moving to wireless communications." *FleetOwner*, 4pp. <www.driversmag.com/ar/fleet_private_fleets_moving/index.html> 1997.

n.a., "MIRAS GPS vehicle tracking using the Internet." *Business Wire*, 2pp., Nov. 22, 1996.

Albright, Brian: "Indiana Embarks on Ambitious RFID roll out." *Frontline Solutions*. May 20, 2002; 2pp. Available at: <http://www.frontlinetoday.com/frontline/article/articleDetail.jsp?id=19358>.

Anonymous. "Transit agency builds GIS to plan bus routes." *American City & County*. vol. 118, No. 4. Published Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

"Detex Announces the Latest Innovation in Guard Tour Verification Technology." *DETEX Life Safety, Security and Security Assurance*. Jan. 1, 2003. 1pp. © 2002-2004 Detex Corporation. <http://www.detex.com/NewsAction.jspa?id=3>.

"*D.O.T. Driver Vehicle Inspection Reports on your wireless phone!*" FleeTTrakkeR$_{LLC}$ 2002-2003 FleeTTrakkeR$_{LLC}$. All rights reserved <http://www.fleettrakker.com/web/index.jsp> Accessed Mar. 12, 2004.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Government: A Story Behind It's Ranking." *INCONTEXT Indiana;s Workforce and Economy*. Jan.-Feb. 2003 vol. 4, No. 5pp. Available at <http://www.incontext.indiana.edu/2003/jan-feb03/governement.html>.

"*Nextel, Mortorola and Symbol Technologies Offer First Wireless Bar Code Scanner for Mobile Phones.*" Jun. 11, 2003. <http://theautochannel.com/news/2003/06/11/162927.htm>.

Quaan et al., "Guard Tour Systems." *Security Management Online*. Sep. 16, 2003. 1pg. © 2000 <http://www.securitymanagement.com/ubb/Forum30/HTML/000066.html>.

Qualcomm. "Object FX Integrates TrackingAdvisor with Qualcomm's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving a Niche Beyond Asset Tracking." *Business Solutions*. Feb. 1999: 5pp. Available at: <http://www.businesssolutionsmag.com/Articles/1999_02/990208.html>.

"*The Data Acquisition Unit Escorte.*" The Proxi Escort.com. Nov. 20, 2001. 4pp. Copyright © 2000 GCS General Control Systems. <http://www.gcs.at/eng/produkte/hw/escorte.htm>.

"The PenMaster" and "The PSION Workabout." Copyright 2000 GCS General Control Systems. <http://www.gcs.at/eng/produkte/hw/penmaster.htm>.

Tiscor: The Mobile Software Solutions Provider. *Inspection Manager: An Introduction*. Sep. 27, 2004. Slide presentation; 19pp. Available: www.TISCOR.com.

Tiscor: *Inspection Manager 6.0 User Guide*. USA; 2004. 1-73.

"Tracking out of route: software helps fleets compare planned routes to actual miles. (Technology)." *Commercial Carrier Journal*. Published Oct. 1, 2005. 4pp. NDN-219-1054-1717-0.

Tsakiri, M et al. Abstract: "Urban fleet monitoring with GPS and GLONASS." *Journal of Navigation*, vol. 51, No. 3. Published Sep. 1998. 2pp. NDN-174-0609-4097-3.

Want, Roy, "RFID a Key to Automating Everything." *Scientific American*, Jan. 2004, p. 58-65.

"What is the Child Check-Mate Safety System"? *2002 © Child Checkmate Systems Inc*. <http://www.childcheckmate.com/what.html>.

* cited by examiner

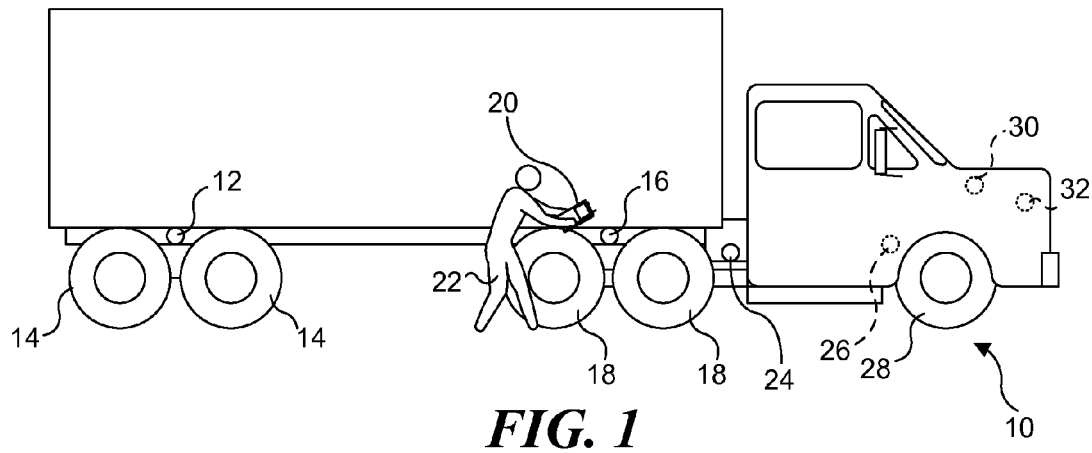
FIG. 1
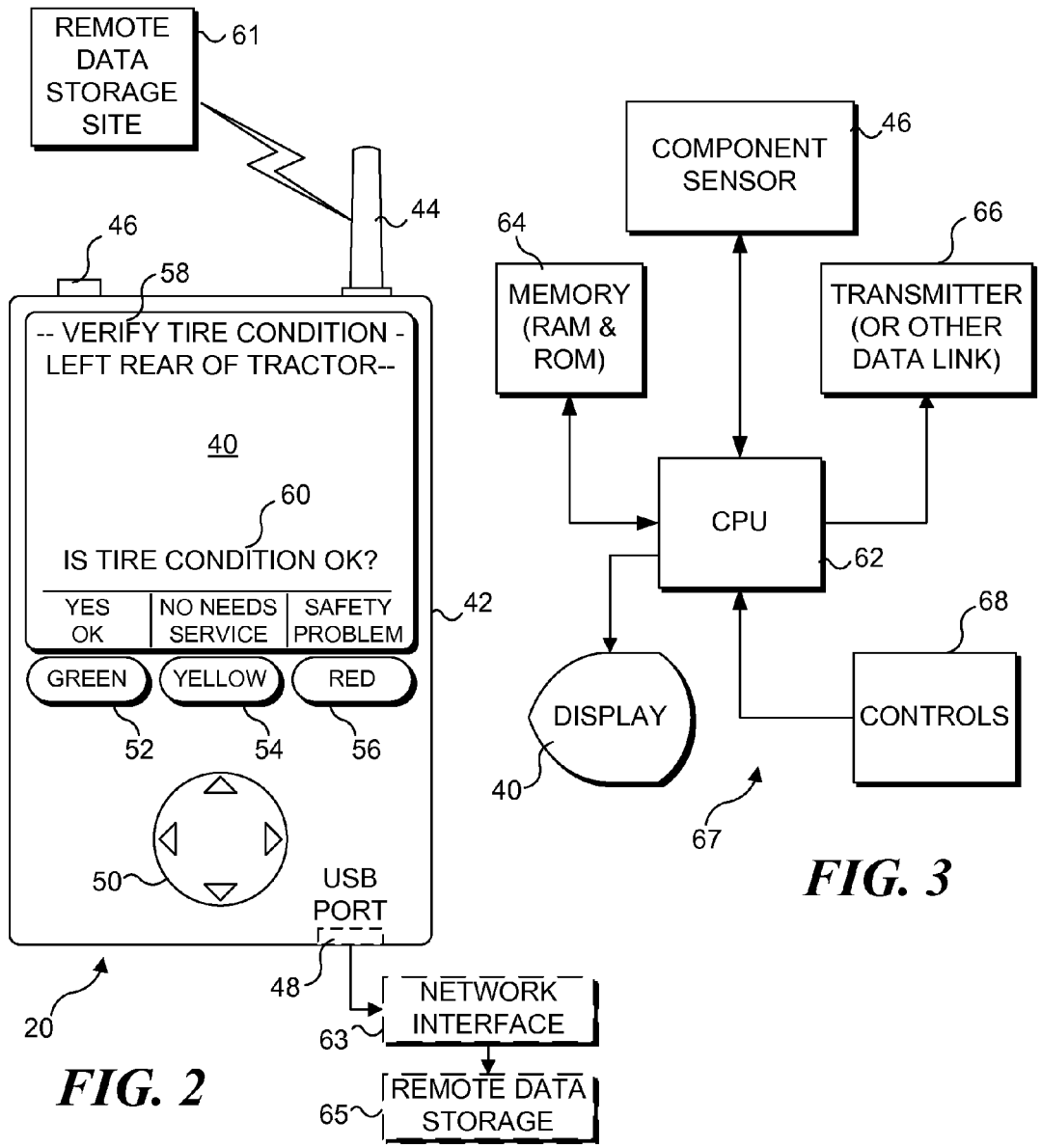
FIG. 2
FIG. 3

DRIVER'S VEHICLE INSPECTION REPORT
AS REQUIRED BY THE D.O.T. FEDERAL MOTOR CARRIER SAFETY REGULATIONS

CARRIER: _____

ADDRESS: _____

DATE: _____ TIME: _____ A.M. _____ P.M.

CHECK ANY DEFECTIVE ITEM AND GIVE DETAILS UNDER "REMARKS"

TRACTOR/
TRUCK NO. _____ ODOMETER READING _____

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _____

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _____
_____
_____
_____
_____
_____
_____

☐ CONDITION OF THE ABOVE VEHICLE IS SATISFACTORY

DRIVER'S SIGNATURE: _____

☐ ABOVE DEFECTS CORRECTED
☐ ABOVE DEFECTS NEED NOT BE CORRECTED FOR SAFE OPERATION OF VEHICLE

MECHANIC'S SIGNATURE: _____ DATE: _____

DRIVER'S SIGNATURE: _____ DATE: _____

*FIG. 7 (PRIOR ART)*

METHOD AND APPARATUS TO AUTOMATE DATA COLLECTION DURING A MANDATORY INSPECTION

RELATED APPLICATIONS

This application is a continuation-in-part of prior application Ser. No. 11/425,222, filed on Jun. 20, 2006, now issued as U.S. Pat. No. 7,564,375 on Jul. 21, 2009, which itself is a continuation-in-part of prior application Ser. No. 11/247,953, filed on Oct. 11, 2005, now issued as U.S. Pat. No. 7,362,229 on Apr. 22, 2008, which itself is a continuation-in-part of prior application Ser. No. 10/915,957, filed on Aug. 11, 2004, now issued as U.S. Pat. No. 7,557,696 on Jul. 7, 2009, which itself is a continuation-in-part of prior application Ser. No. 10/219,892, filed on Aug. 15, 2002 and now issued as U.S. Pat. No. 6,804,626 on Oct. 12, 2004, which itself is a continuation-in-part of prior application Ser. No. 09/951,104, filed on Sep. 11, 2001 and now issued as U.S. Pat. No. 6,671,646 on Dec. 30, 2003, the benefit of the filing dates of which is hereby claimed under 35 U.S.C. §120. Co-pending application Ser. No. 11/425,222 is also a continuation-in-part of prior application Ser. No. 10/862,122, filed on Jun. 3, 2004, now issued as U.S. Pat. No. 7,117,121 on Oct. 3, 2006, the benefit of the filing date of which is also hereby claimed under 35 U.S.C. §120.

BACKGROUND

Mandated inspections are required in a variety of different contexts. For example, to avoid accidents caused by defective equipment, Federal law presently requires that commercial drivers make a visual inspection of specific components on a commercial vehicle such as a truck (i.e., tractor and trailer), including components such as the brake system, fuel system, warning lights, tires, etc., performing pre- and post-trip inspections of these basic, but critical components. An exemplary vehicle inspection report, listing the components and systems that must be inspected by a driver to satisfy the DOT regulations, is illustrated in FIG. 7. However, under the current system, a driver is only required to fill out a paper log and keep it on file for 90 days. Many experts report that less than half of the drivers ever perform the check; instead, many drivers simply fill out the report while seated in the cab of the truck or in a coffee shop. The report is meaningless unless the listed components and systems have actually been inspected. For example, a driver who fails to actually inspect components on his vehicle will not notice that brake fluid is leaking from a hydraulic master brake cylinder. As a result, the brakes on the driver's truck may fail, potentially causing a serious accident.

Unfortunately, a signed inspection report does not provide any assurance that a driver actually inspected the components included on the report, because the individual tasked with performing the inspection could simply sit in a comfortable location, such as the cab of the vehicle, and complete the inspection report without actually physically being present at the locations requiring inspection. Thus, it would be desirable to provide a way to verify that the person tasked with performing an inspection actually was present at the location requiring inspection.

During the performance of such mandated inspections, many different types of data related to the inspection may be collected, such as data relating to the person performing the inspection and data relating to the item being inspected. It would be further desirable to provide a system and method to enable such data to be readily accessed over a computer network by individuals and applications requiring such data.

SUMMARY OF THE INVENTION

One aspect of the novel concepts presented herein is a system for storing inspection related data, wherein the inspection related data includes at least an indication that a particular item has been inspected. In one exemplary embodiment, the system includes a network accessible memory for storing inspection related data (where the memory is accessible over a data network such as the Internet), a portable device for verifying that the user of the portable data collection device was actually proximate an item to be inspected (and automatically producing an indication to that effect), and a data interface application configured to enable a third party application to access the inspection related data stored by the network accessible memory. An exemplary portable device includes means for verifying that the portable device is proximate an item to be inspected, and means for conveying an indication that the portable device is proximate the item to be inspected to the network accessible memory, such that inspection related data stored by the network accessible memory for the item to be inspected includes the indication provided by the portable device, the indication providing evidence that a user of the portable data collection device was actually proximate an item to be inspected.

The means for verifying that the portable device is proximate an item to be inspected can either be a sensor configured to detect the portable device is proximate the item to be inspected, or means to determine a geographical position of the portable device (such that the indication is generated by the portable device when the geographical position of the portable device matches a known geographical position of the item to be inspected). Where the item to be inspected has a fixed location (such as a support for a bridge), the means for determining the geographical position can be employed. Where the item to be inspected does not have a fixed geographical location (such as a component in a vehicle that moves from one geographical location to another), the sensor technology is preferred.

In an exemplary system that employs the sensor technology in the portable device, the system additionally includes a plurality of unique tokens, each unique token being disposed at an item to be inspected, and each unique token being detectable by the sensor in the portable device. In some embodiments, at least one token is coupled with a sensor configured to collect ancillary data, such that the ancillary data are automatically conveyed to the portable device when the sensor detects the token, the ancillary data being added to the inspection related data for that item.

The means for conveying the indication to the network accessible memory can include many conventional data transfer means, including but not limited to wireless data transfer technologies and wire data transfer technologies, and a combination thereof.

In some embodiments, the portable device will include a time and date stamp with the indication. Where an inspection includes a plurality of items or checkpoints, a first item can be designated as a starting point, and a second item can be designated as an ending point, such that the time stamps associated with the first and second items can be used to determine how much time was required for the inspection. Depending on the inspection, that time measurement can be used by a third party accounting program for payroll functions. For example, a company can instruct employees to inspect the first location as soon as they start work, and inspect the second location as they finish their work shift, such that the accounting program can access the inspection data related to the first and second times stored on the network to determine the number of hours the employee tasked with the inspection of those items worked.

In some embodiments, the portable device will include a user interface configured to enable a user of the portable device to input data, such that the user-entered data are added to the inspection related data for an item, such data being stored on the network accessible memory. For example, a user can input maintenance related data about an item being inspected using the portable device, and a third party maintenance application can then access that data from the network accessible memory.

In one exemplary but not limiting embodiment, the data interface application is configured to implement one or more of the following functions: (1) extracting billing data from the inspection related data so that the billing data can be provided to a third party accounting program; and, (2) extracting maintenance data from the inspection related data, and providing the maintenance data to a third party maintenance management program. For example, the billing data can include one or more of the following types of data: a starting time record, a finishing time record, an employee timesheet record, an engine hour record, and a vehicle mileage record.

In an exemplary (but not limiting) method for verifying that an inspection of an item has been performed, and enabling data associated with the inspection of the item to be readily disseminated, the method includes the steps of: (1) providing a portable device configured to verify that the portable device is sufficiently close to an item to be inspected so as to enable an operator to inspect the item; (2) positioning the portable device proximate the item to be inspected during an inspection; (3) automatically verifying that the portable device is proximate to the item to be inspected and producing an indication to that effect; (4) conveying the indication that the portable device was proximate to the item to be inspected during the inspection, to a network accessible memory, such that data associated with the inspection of the item comprise at least the indication provided by the portable device; (5) storing the data associated with the inspection of the item in the network accessible memory; and, (6) enabling a third party application to access the data associated with the inspection of the item stored by the network accessible memory.

In one related embodiment, the step of automatically verifying that the portable device is proximate the item to be inspected includes the step of comparing a geographical position of the portable device with a known geographical position of the item to be inspected. In another related embodiment, the step of automatically verifying that the portable device is proximate the item to be inspected includes the step of using a sensor in the portable device to determine if the portable device is proximate to the item to be inspected. In some embodiments where the device employs a sensor to determine if the device is proximate the item to be inspected, the step of using a sensor in the portable device to determine if the portable device is proximate the item to be inspected includes the step of using the sensor to automatically detect a token disposed proximate the item to be inspected. In at least one exemplary embodiment, where the sensor in the portable device is detecting a token, the step of using the sensor to automatically detect the token disposed proximate the item to be inspected includes the step of automatically conveying ancillary data collected by the token to the portable device when the sensor detects the token, the ancillary data being added to the data associated with the inspection of the item.

Such ancillary data can include parameters related to the item being inspected. Where the item being inspected is a vehicle, such parameters can include mileage, engine hours, operating temperatures, and other operational parameters related to the vehicle.

The step of enabling a third party application to access the data associated with the inspection of the item stored by the network accessible memory can include either of the following steps: (1) extracting billing data from the data associated with the inspection of the item and providing the billing data to a third party accounting program; or, (2) extracting maintenance data from the data associated with the inspection of the item and providing the maintenance data to a third party maintenance management program.

A related method involves the following steps: (1) providing a portable device configured to verify that the portable device is sufficiently close to an item to be inspected so as to enable an operator to inspect the item; (2) positioning the portable device proximate the item to be inspected during an inspection; (3) automatically verifying that the portable device is proximate the item to be inspected, and producing an indication to that effect; (4) enabling a user of the portable device to input inspection related data into the portable device; (5) conveying any user entered inspection related data and the indication to a network accessible memory, such that data associated with the inspection of the item comprise any user entered data and the indication provided by the portable device; (6) storing the data associated with the inspection of the item in the network accessible memory; and, (7) enabling a third party application to access the data associated with the inspection of the item stored by the network accessible memory.

Still another aspect of the concepts disclosed herein is a portable data collection device (useful in implementing either of the methods discussed above) for verifying that a checkpoint was visited during an inspection by an operator carrying the portable device. The portable device includes means for automatically verifying that the portable data collection device is proximate to an item to be inspected, a user interface configured to enable a user of the portable data collection device to input data, and means for conveying an indication that the portable data collection device is proximate to the item to be inspected, and for conveying any user input data to the network accessible memory. In this case, the inspection related data stored by the network accessible memory for the item to be inspected comprise the indication provided by the portable device and any data input by the user relating to the item.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a schematic diagram of a tractor and trailer equipped with tokens at each component to be inspected, illustrating a person using a portable device in accord with the concepts disclosed herein;

FIG. 2 is a top plan view of a portable device for use in making a safety inspection of a tractor and trailer, showing a message that prompts the operator to inspect the left rear tires of the tractor;

FIG. 3 is a schematic block diagram of the functional components included in the portable device of FIG. 2;

FIG. 7 (Prior Art) is an exemplary manually-completed inspection record used for safety inspections of tractors and trailers, illustrating the specific components and systems that are required to be inspected;

Figure 21:
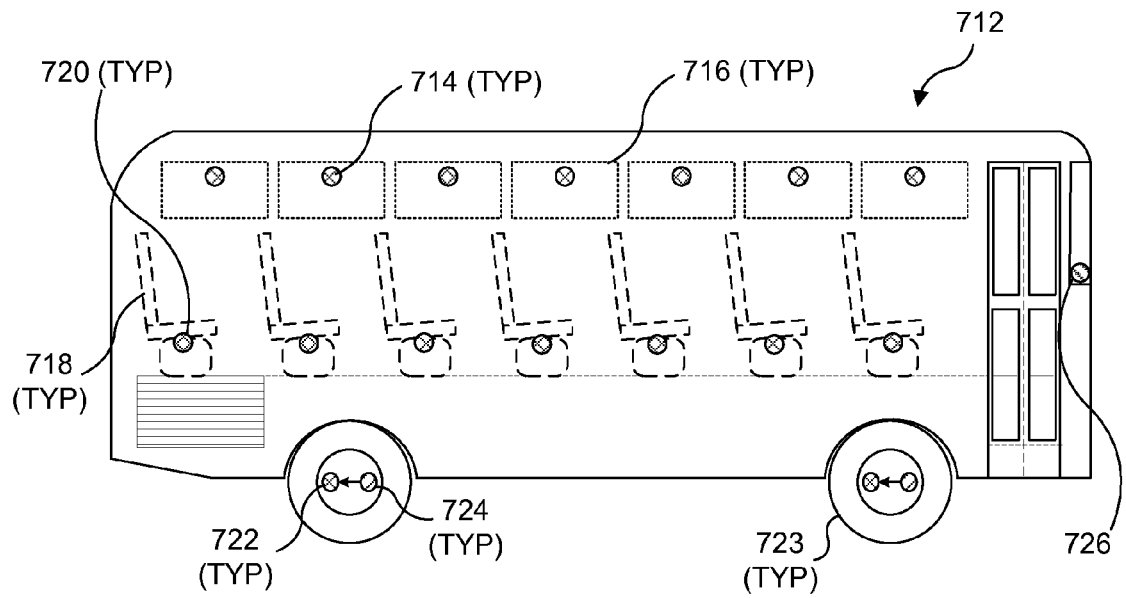
Figure 24:
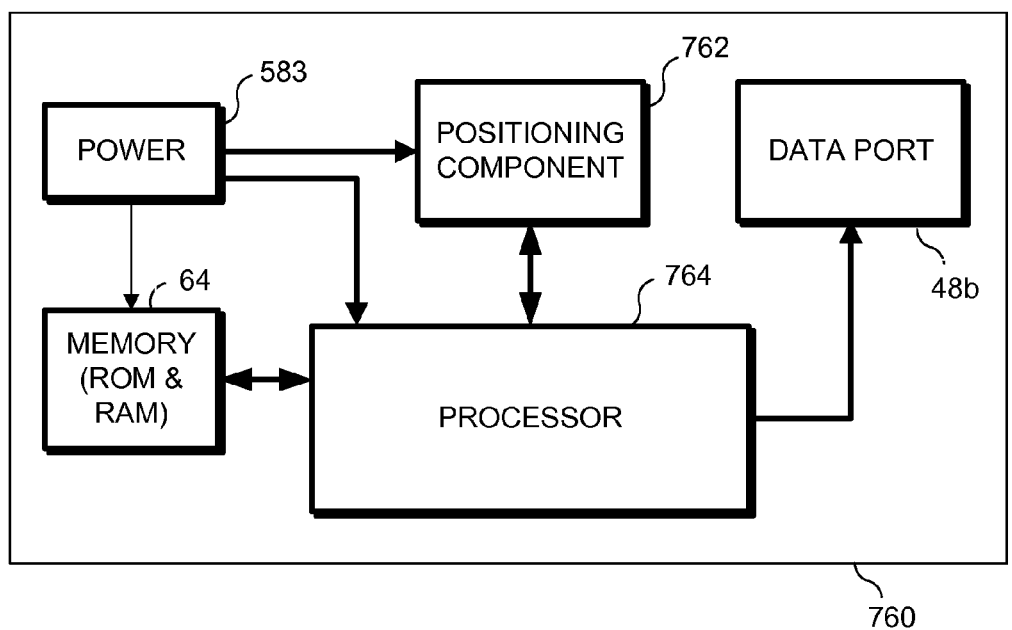
Figure 22:
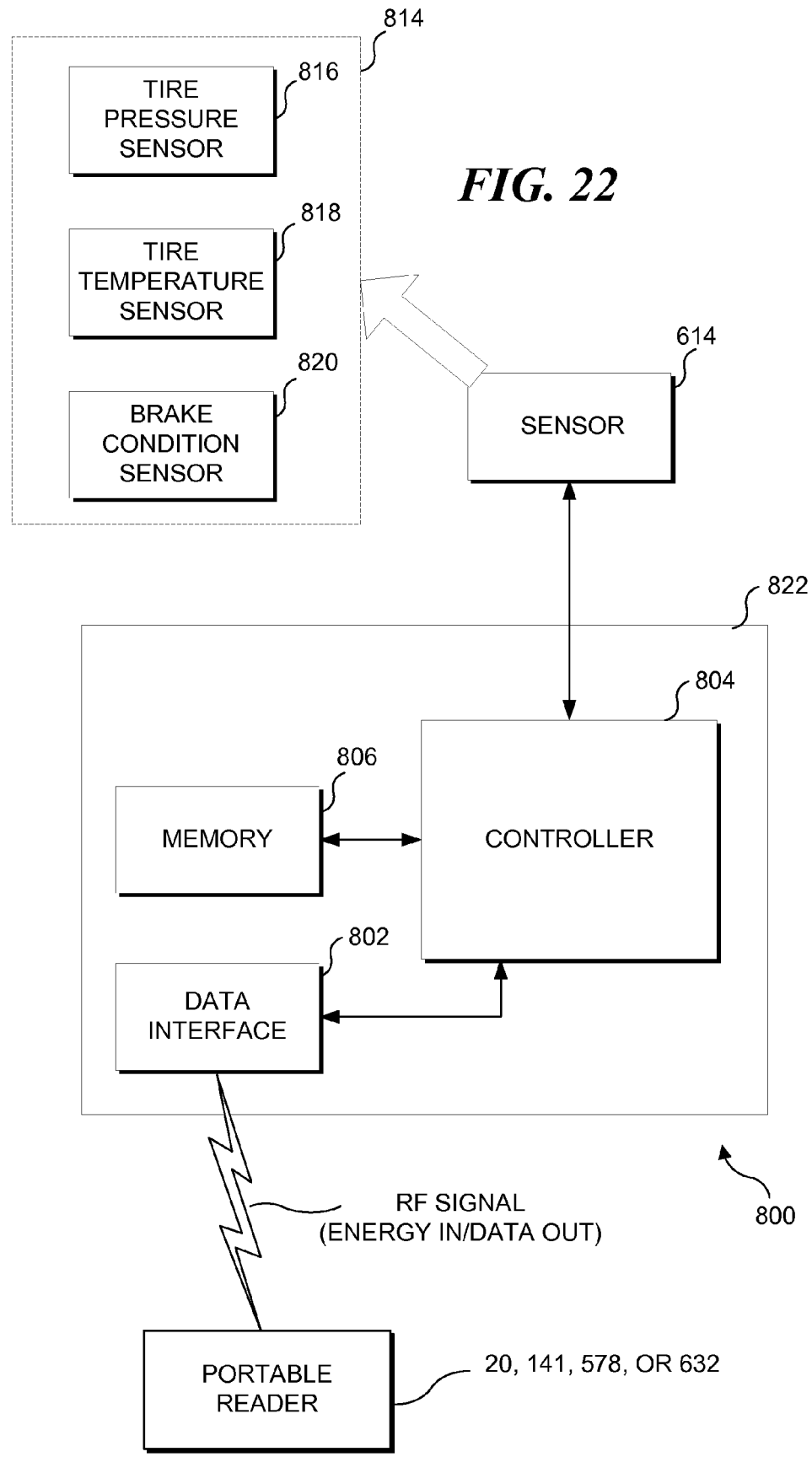
Figure 23:
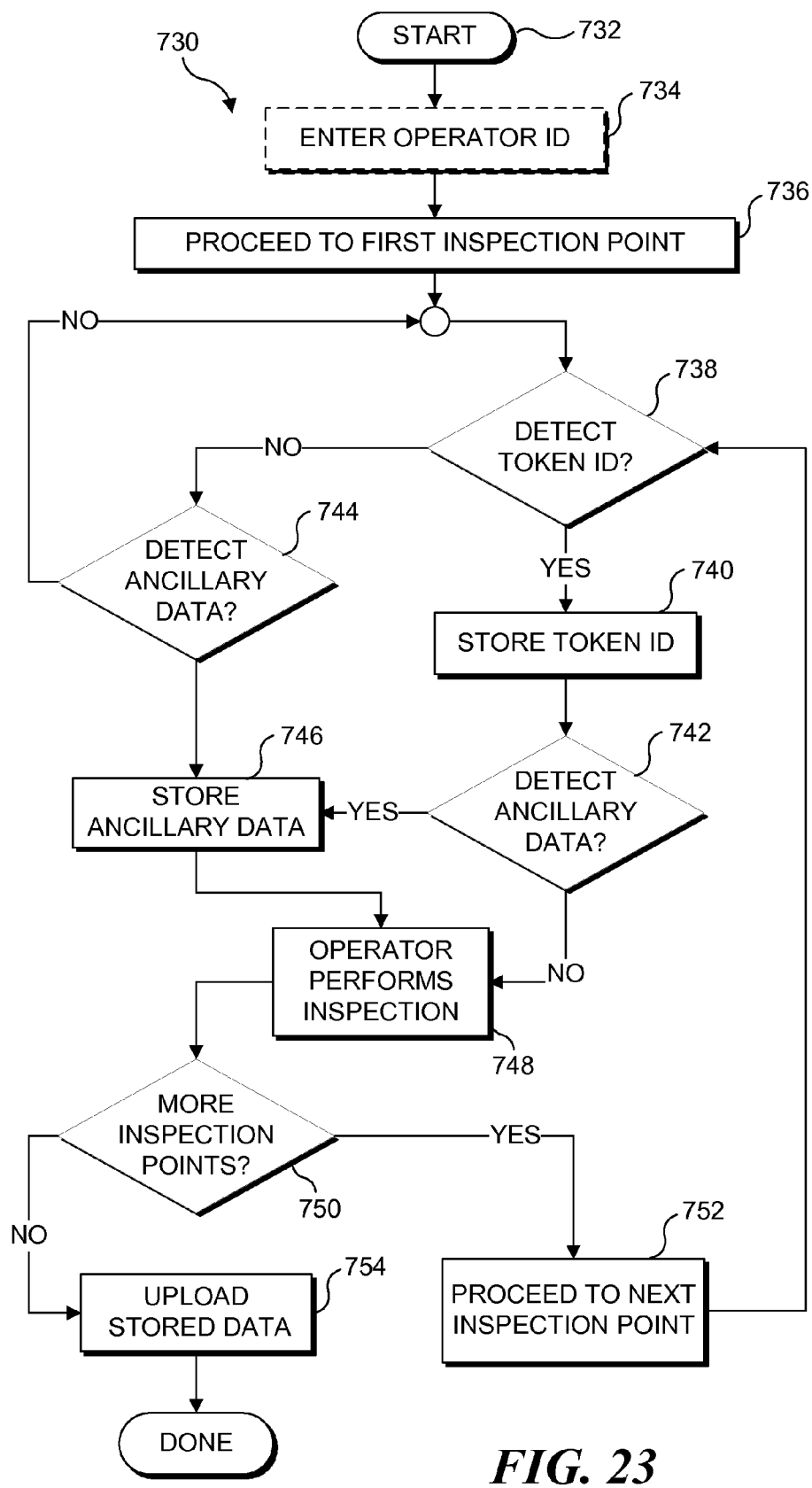
Figure 25:
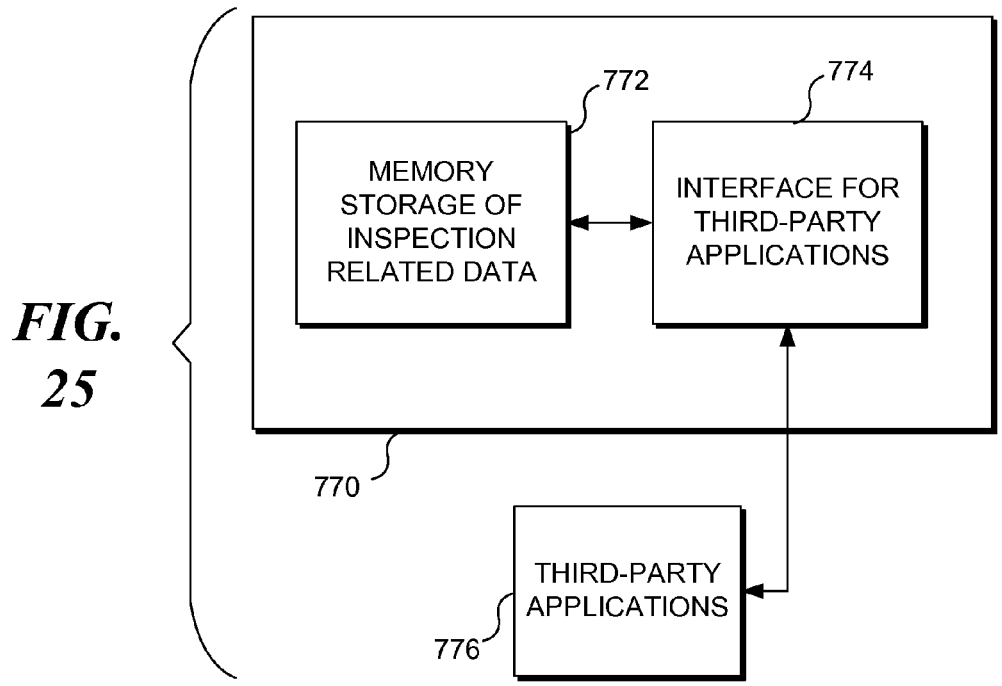
Figure 26:
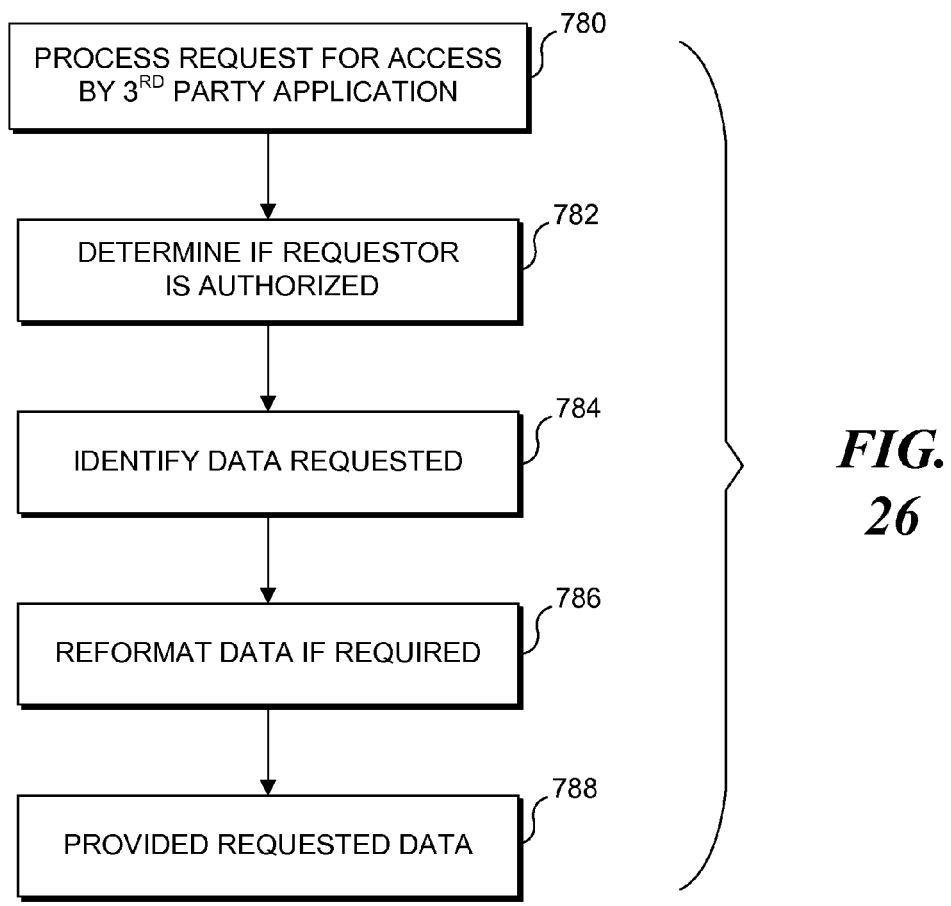

FIG. 21 schematically illustrates a public transport vehicle configured to enable the portable devices described herein to automatically collect inspection data and ancillary data, contemporaneously with an inspection;

FIG. 22 schematically illustrates an exemplary token configured to convey ancillary data to a portable device;

FIG. 23 is a flow chart illustrating the steps employed in contemporaneously collecting inspection data and ancillary data;

FIG. 24 is a functional block diagram of a portable device providing verification that a user of the portable device was proximate to an inspection point by determining a geographical position of the portable device during an inspection;

FIG. 25 schematically illustrates a website, or more generally, a network accessible node that hosts a memory in which inspection related data are stored; and FIG. 26 is a flow chart illustrating exemplary steps implemented to enable a third party application to access inspection related data that are stored in memory.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Utility of the Various Exemplary Embodiments Described Herein

The concepts disclosed herein are applicable to generating, recording and accessing data relating to an inspection of almost any type of vehicle, equipment, apparatus, or system, and is particularly applicable to inspections in which it is desirable to maintain a data record as evidence that the person making the inspection was actually physically present at a checkpoint, location, or component requiring inspection. While the data accumulated using the present concept is not conclusively presumptive evidence that each location or component to be inspected was indeed carefully inspected, in most cases, if a person is required to visit a location or component, it is very likely that the person will actually inspect the location or component. By encouraging a person making an inspection to be physically close enough to a particular location or component to carry out an inspection, and by providing evidence of that fact in the data recorded, there is at least a justifiable presumption that the person actually performed the inspection.

It should be recognized that while a portion of the following disclosure is specifically directed to the pre-trip inspection of commercial vehicles, that such a vehicle inspection is intended to be exemplary, rather than limiting the scope of the inventive concepts disclosed herein. In particular, the contemporaneous collection of ancillary data during an inspection will be discussed in detail below, and such ancillary data can be collected during any type of inspection, regardless of whether the inspection is related to a vehicle, or related to a safety inspection.

A majority of the present disclosure refers to the inspection of a component. In many cases, particularly with respect to the pre-trip inspection described in detail below, specific components (such as a vehicle lights, vehicle brake systems, vehicle tires, etc.) are being inspected. In other inspections, rather than a specific component being inspected, the purpose of the inspection is to check a general location. For example, the terrorist threat to public transportation may prompt a requirement that all passenger vehicles (such as trains, buses, and airplanes) be regularly inspected. Rather than indicating that specific components of the vehicle need to be inspected, an inspection directed to minimizing a terrorist threat will likely involve checking those portions of the vehicle that can be accessed by passengers, to ensure that no passenger has left behind a potentially dangerous device, such as an explosive or toxin. This may involve thoroughly inspecting locations such as restrooms, galleys, seating areas, overhead storage bins, and other areas that can be accessed by passengers during transit. In this case, the inventive concept described herein can be used to verify that an inspector was present at a series of predefined locations associated with a particular vehicle. Thus, it should be understood that an inspection can involve a specific component (such as a vehicle tire), a predefined checkpoint (such as each door in a transit or other facility), or a particular location (such as the seating area and luggage bins in a transportation vehicle).

FIG. 1 illustrates a tractor-trailer 10 with which an embodiment of the concepts disclosed herein is usable to carry out a safety inspection. Tractor-trailer 10 is provided with a plurality of tokens affixed adjacent to each checkpoint or component that is to be inspected. While only a few of the tokens are illustrated in FIG. 1, FIG. 7 (Prior Art) lists all of the components or systems that should be inspected if a driver is to be in compliance with the DOT regulations regarding pre- and post-inspections of such vehicles. A token will preferably be affixed adjacent to the components and systems listed in FIG. 7, although several components might be associated with the same token. For example, in the engine compartment, one token might be used for both the radiator and the belts. As a driver moves about the tractor and trailer, evidence that the driver or the person doing the inspection was sufficiently close to the components being inspected so that the inspection could actually take place is recorded in a first embodiment of a portable device 20. Further details of portable device 20 and of other related embodiments are described below.

For the few tokens illustrated in FIG. 1, the relevance of the disposition of the token adjacent to a corresponding component of the tractor-trailer 10 should be evident. For example, token 12 is disposed adjacent to tandem dual rear tires 14 on the trailer. Since all of the tires of the tandem dual rear wheels on the left rear of the trailer are readily visible from a position adjacent to token 12, a single token is sufficient to determine that the driver was sufficiently close so that all four tires at the left rear of the trailer could readily be inspected. Similarly, tandem dual wheels 18 on the left rear of the tractor are readily inspected when an observer 22 is positioned as shown in FIG. 1. In this position, the observer moves portable device 20 within a maximum predefined range of token 16, which is exposed above tandem dual wheels 18. Portable device 20, detects and responds to token 16, recording data indicating that the driver was in a position to inspect tandem dual rear wheels 18 on the tractor. It is contemplated that the operator may initiate the recognition of a token by activating a switch, or the portable device can instead simply respond when a token is sufficiently close to the portable device.

Other tokens 24, 26, 30, and 32 are illustrated adjacent to other components of the tractor that are part of the safety inspection. For example, token 26 is affixed adjacent to a tire 28, which is disposed on the right front of the tractor, while tokens 30 and 32 are accessible if the front hood of the tractor is opened and are disposed adjacent the hydraulic brake master cylinder and the engine belts/radiator, respectively (not shown separately).

For each token, there is a predetermined maximum distance that portable device 20 can be held from the token while still enabling the portable device to detect the token, and thus, the component that is associated with it, in order to produce a record as evidence that the person holding the portable device was in a position to inspect the component. Depending upon the component to be inspected and the type of token, different predetermined maximum distances may be associated with the various components. The different predetermined maximum distances might be achieved by partially shielding a token to vary the distance at which the portable device can detect the token.

Operator 22 is prompted to approach the next component in a series of components that must be checked during the safety inspection, by displaying a message 58 on a display 40 of portable device 20, as shown in FIG. 2. For example, if operator 22 has just completed the inspection of tandem dual tires 14 on the left rear of the truck, display 40 provides a prompt 58 indicating that the operator should "verify tire condition—left rear of tractor." A sensor 46 on portable device 20 responds to token 16 when the portable device is held less than the predetermined maximum distance from token 16, by producing a signal indicating that the portable device is within the required range of tandem dual tires 18 to enable the operator to inspect the tires. Display 40 also provides a prompt 60 to operator 22 requesting that the operator indicate whether the tire condition is okay. If so, the operator presses a green control button 52 corresponding to the message "YES, OK." However, in this first embodiment of the portable device, if during the visual inspection of the tires, the operator determines that they require servicing, the operator is prompted to depress a yellow control button 54 on the portable device. (The other embodiments of the portable device that are described below do not include a yellow control button, but instead invite the operator to indicate the condition of the component.)

Certain conditions, such as a tread separation or a nail or other sharp object lodged in the tire, would likely lead the person doing the inspection to depress a red control button 56, indicating a safety problem that requires the operator to contact a supervisor, who will likely elect to delay the trip until the component is repaired and/or replaced, or take other appropriate action, depending upon the nature of the component and the type of problem that makes the component unsafe. Portable device 20 also includes a cursor control 50, which is a four-position switch that enables a cursor (not shown in this Figure) to be moved up or down, and left or right. Cursor control 50, green, yellow, and red control buttons 52, 54, and 56, and display 40 are all disposed on a front surface of a housing 42 of portable device 20. Sensor 46 is disposed on the top edge of housing 42, while an optional universal serial bus (USB) port 48 is disposed on the bottom edge of housing 42, opposite from the end at which sensor 46 is disposed.

In this embodiment, an antenna 44 is also disposed on the top edge of the housing for transmitting radio frequency (RF) transmissions to a remote data storage site 61 that is used for long-term storage of data resulting from safety inspections. The data produced by a safety inspection indicates each of the components of the vehicle (or other system or apparatus being inspected) that were visited by the operator, who positioned the portable device within the predetermined maximum distance from the token associated with the component, and further indicates the status of the component. In the event that the component appears to need service or represents a safety problem (as would be evident if the operator depressed yellow control button 54 or red control button 56, respectively), the operator is prompted to select one of a plurality of predefined conditions that justify the state of the component determined by the operator and best represent its observed condition.

If the state of the component is okay so that green control button 52 is depressed, i.e., if the component does not require any service and is usable or otherwise within its nominal operating parameters, there is no need to provide an indication of the condition of the component. The condition need only be recorded as part of the data stored in the portable device if either yellow control button 54 or red control button 56 is depressed by the operator to indicate the state of the component being other than "OK."

Figure 4:
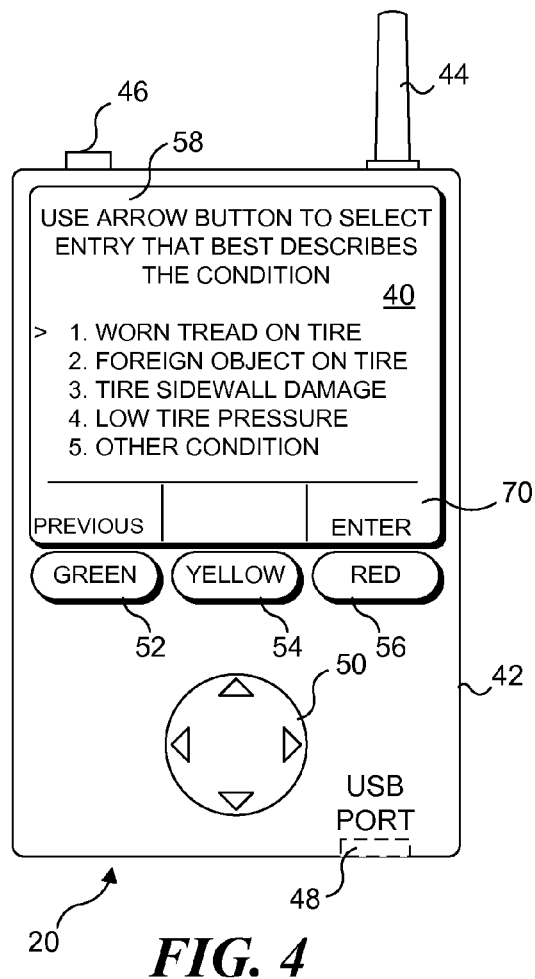
FIG. 4 is a top plan view of the portable device of FIG. 2, illustrating a menu that indicates possible conditions of tires in need of service.

A further example illustrating the selection of a condition relating to the example shown in FIG. 2 is included in FIG. 4. As shown in FIG. 4, if the operator has indicated that the state of the tires is such that they need service, by pressing yellow control button 54, portable device 20 automatically displays several possible conditions that might lead an operator to indicate that state. In the example shown, message 58 prompts the operator to use the arrow button (i.e., cursor control 50) to select a possible condition from among the listed options that best describes the observed condition of the tires. Display 40 includes five possible conditions, the last of which covers any condition that might not be included among the first four that are listed. Using cursor control 50, the operator can move the cursor to the displayed statement that best describes the observed condition of the tire and then can depress red control 56, which corresponds to an "Enter" menu option 70 on display 40 for this screen. Green control 52 can be depressed to select a "Previous" display, if the operator elects to reconsider the state of the component that was previously selected.

FIG. 3 illustrates functional components 67 that are included in portable device 20, either on or inside housing 42. A central processing unit (CPU) 62 comprises the controller for portable device 20 and is coupled bi-directionally to a memory 64 that includes both random access memory (RAM) and read only memory (ROM). Memory 64 is used for storing data in RAM and machine instructions in ROM that control the functionality of CPU 62 when executed by it. CPU 62 is also coupled to sensor 46, and is configured to receive operator input from controls 68. Collectively, controls 68 include green control button 52, yellow control button 54, red control button 56, and cursor control 50. In addition, CPU 62 provides text and graphics to display 40 for the prompts and other messages, and menu items and options from which the operator can select, using cursor control 50.

After operator 22 has visited each of the checkpoints required for the safety inspection, the operator can optionally transmit the data that have been collected during the inspection to remote data storage site 61 through an RF transmission via antenna 44. The data provide evidence that the operator has visited the components and indicate the state and condition of the components that were visited and inspected, based on the operator input. Alternatively, optional USB port 48 on portable device 20 can be coupled to a network interface 63 on an external cradle or docking station (an example of which is described below in connection with other embodiments of the portable device), which is in communication with remote data storage 65, as shown in FIG. 2. In FIG. 3, CPU 62 is shown communicating data to transmitter 66 (or through another data link) using a wire and/or wireless data communication link. The data collected and stored in memory 64 of portable device 20 during the safety inspection can thus be safely transferred to the remote data storage site and retained for as long as the data might be needed.

In some cases, it may be preferable to transmit the data to the remote site immediately after making a safety inspection to ensure that the data retained in memory 64 are not lost, should an accident occur that destroys portable device 20. An accident destroying the evidence that the safety inspection was implemented could have an adverse effect during any litigation related to the accident, which might allegedly have been caused by one of the components inspected. However, since the risk of such an accident is relatively remote, it is contemplated that an operator may collect the data from a number of safety inspections in memory 64 and then subsequently upload the data to remote data storage 65 by coupling the data to the external cradle or docking station that includes a USB port terminal and network interface to communicate with a remote storage over the Internet or other network. The cradle or docking station might be maintained by a carrier company at a freight terminal at least periodically visited by the truck that was inspected.

Alternatively, the external cradle or docking station might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 20 through USB port 48 to such a data communication system, the data stored within memory 64 can readily be transmitted to a remote site maintained by the carrier for long-term storage, even while a trip is in progress.

The tokens that are affixed at various points on the tractor-trailer (or adjacent components of other types of systems or apparatus unrelated to a vehicle) can be of several different types, depending upon the type of sensor 46 that is included on portable device 20. In a preferred form of one of the concepts disclosed herein, the token that is preferably employed is a radio frequency identification (RFID) tag that is attached with a fastener or an appropriate adhesive to a point on a frame or other support (not shown) adjacent to the component associated with the token. One type of RFID tag that is suitable for this purpose is the WORLDTAG™ token that is sold by Sokymat Corporation. This tag is excited by an RF transmission from portable device 20 via antenna 44. In response to the excitation energy received, the RFID tag modifies the RF energy that is received from antenna 44 in a manner that specifically identifies the component associated with the RFID tag, and the modified signal is detected by sensor 46.

An alternative type of token that can also be used in one of the concepts disclosed herein is an IBUTTON™ computer chip, which is armored in a stainless steel housing and is readily affixed to a frame or other portion of the vehicle (or other type of apparatus or system), adjacent to the component associated with the IBUTTON chip. The IBUTTON chip is programmed with JAVA™ instructions to provide a recognition signal when interrogated by a signal received from a nearby transmitter, such as from antenna 44 on portable device 20. The signal produced by the IBUTTON chip is received by sensor 46, which determines the type of component associated with a token. This type of token is less desirable since it is more expensive, although the program instructions that it executes can provide greater functionality.

Yet another type of token that might be used is an optical bar code in which a sequence of lines of varying width or other optical patterns encode light reflected from the bar code tag. The encoded reflected light is received by sensor 46, which is then read by an optical detector. Bar code technology is well understood by those of ordinary skill in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines or other pattern can be properly read. If the bar code is applied to a plasticized adhesive strip, it can readily be mounted to any surface and then easily cleaned with a rag or other appropriate material.

Yet another type of token usable in one of the concepts disclosed herein is a magnetic strip in which a varying magnetic flux encodes data identifying the particular component associated with the token. Such magnetic strips are often used in access cards that are read by readers mounted adjacent to doors or in an elevator that provides access to a building. However, in this aspect of the concepts disclosed herein, the magnetic flux reader comprises sensor 46 on portable device 20. The data encoded on such a token are readily read as the portable device is brought into proximity of the varying magnetic flux encoded strip comprising the token.

As yet another alternative, an active token can be employed that conforms to the BLUETOOTH™ specification for short distance data transfer between computing devices using an RF signal. However, it is likely that the range of the signal transmitted by the token would need to be modified so that it is substantially less than that normally provided by a device conforming to the BLUETOOTH™ specification. It is important that the portable device be able to detect that it is proximate to the component only within a predetermined maximum range selected to ensure that the operator is positioned to actually carry out an inspection of the component.

Logical Steps Implemented in at Least One of the Concepts Disclosed Herein

Figure 5:
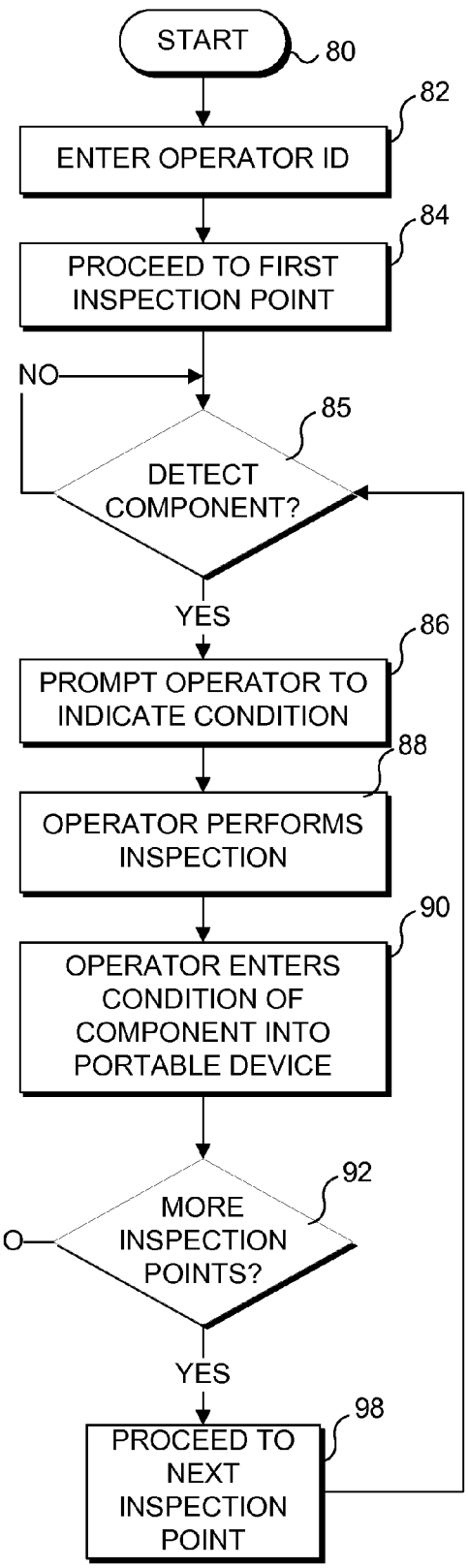
FIG. 5 is a flow chart showing the steps followed in carrying out a safety inspection in accord with the concepts disclosed herein.

FIG. 5 illustrates the logical steps implemented in connection with carrying out a safety inspection of a vehicle or other apparatus or system. From a start block 80, a step 82 provides for manual entry of an operator identification (ID) into a data record, or the operator ID can already be stored in memory of the portable device, or can be automatically entered in response to a special operator ID tag disposed on the vehicle. Cursor control 50 is employed to sequentially select digits from a displayed list, to input the operator ID for the individual making the safety inspection. The operator ID might be a four (or more) digit number or alphanumeric code. Alternatively, a plurality of possible operator IDs might be displayed as a list on portable device 20, enabling the operator to select his/her operator ID from the list using cursor control 50 and one of the three control buttons.

Once the operator ID is entered, portable device 20 prompts the operator to proceed to a first inspection point at a step 84. For example, as indicated in FIG. 2, message 58 prompts the operator to verify the tire condition on the left rear of the tractor. A decision step 85 determines if the portable device has detected the token associated with the component that is next to be inspected. If not, the logic loops until the component is detected. Once sensor 46 on portable device 20 has detected the token associated with the current component to be inspected, the logic then advances to a step 86 in which the operator is prompted to indicate a state of the component (and possibly, its condition). In a step 88, the operator performs the inspection, which may involve visually observing the state and condition of the component, or carrying out other steps that might be required to confirm the state and condition of the component. It is contemplated that in some types of inspections, a series of one or more steps might be required to test the component to determine if it is operating properly, needs maintenance or repair, or is unusable. Again, portable device 20 can be programmed to provide appropriate prompts to direct the operator through the series of steps required to carry out the inspection of such a component. Accordingly, in a step 90, the operator selectively enters the condition of the component into portable device 20 using the control buttons and cursor control 50.

A decision step 92 determines if there are further inspection points in the safety inspection currently being carried out. If not, a step 94 provides for transmitting or loading the inspection data into storage at a remote site; this step can be done immediately after the inspection is completed, or at some later time, perhaps after additional safety inspections have been completed, and/or after the portable device has been inserted into the external cradle or docking station. Once the data are transmitted to the remote site for long-term storage, the process is completed in a step 96.

Assuming that further inspection points remain in the safety inspection at decision step 92, a step 98 provides for the operator to proceed to the next inspection point, which will again be determined by a prompt displayed to the operator on display 40 of portable device 20. The logic then loops back to decision step 85, which determines if the sensor on the portable device has detected the component, indicating that the portable device is within the predefined maximum range of the token, thus ensuring that the operator is sufficiently close to the component to inspect it.

Figure 6:
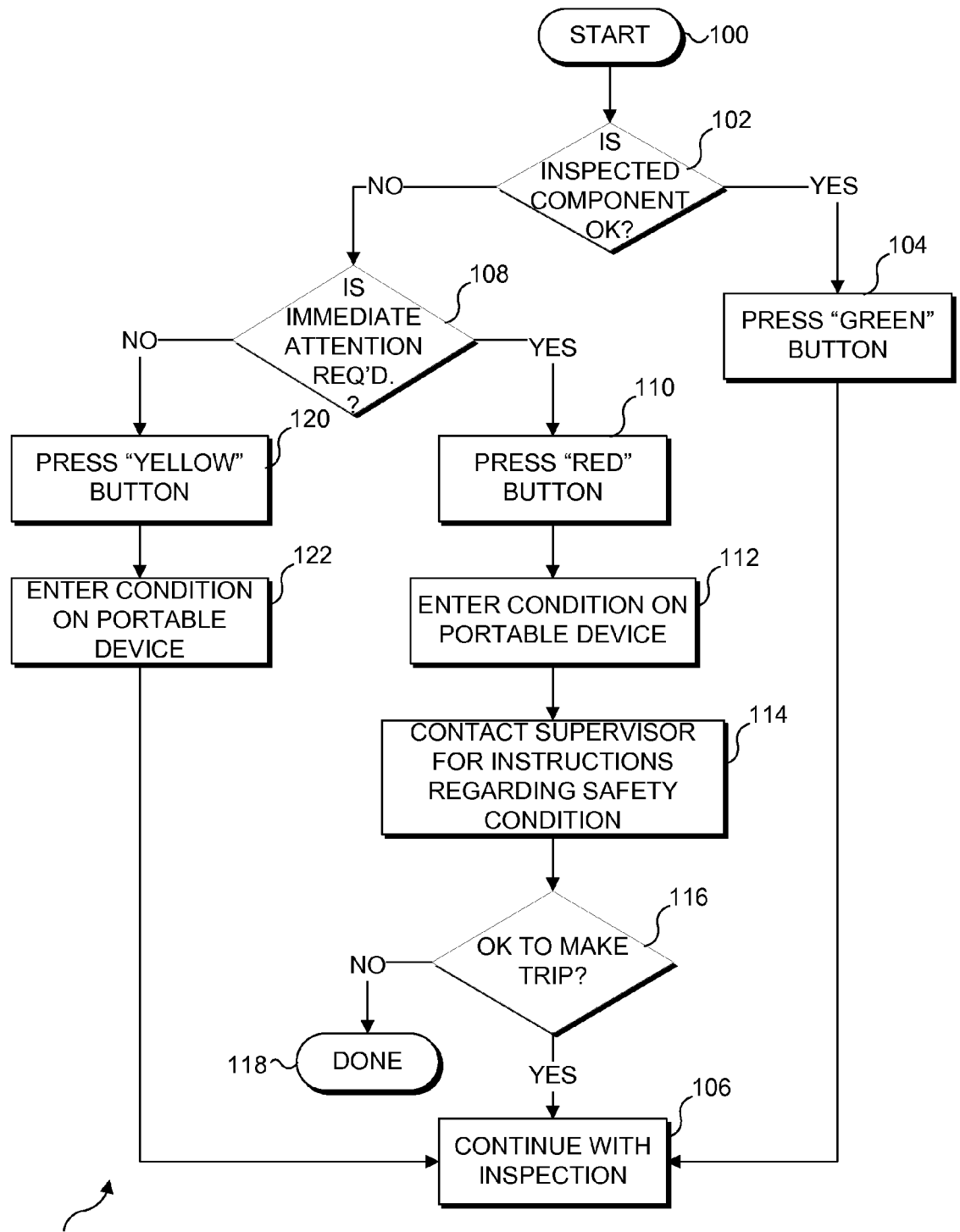
FIG. 6 is a flow chart illustrating the steps employed in recording a condition of a component that is being inspected using the portable device of FIGS. 2 and 4.

Further details of step 90 are illustrated in FIG. 6. From a start block 100, a decision step 102 determines if the inspected component is okay. If so, the operator presses green control button 52 in a step 104. Since the component is okay, nothing further is required for that component, and the logic then proceeds to a step 106, which provides that the operator can continue with the inspection, i.e., proceed with decision step 92 in FIG. 5.

However, if the determination in decision step 102 indicates that the inspected component is not okay, a decision step 108 enables the operator to determine if immediate attention is required. If so, the operator presses red control button 56 at a step 110 and enters the condition of the component on the handheld unit. For example, if the operator is inspecting a tire and determines that the tread of the tire is separating, i.e., that the tire should not be used but should instead be replaced, the operator would use the cursor control on the portable device to select an option for the condition "tread separating from tire" at a step 112. In many types of inspections, the operator will be required to contact a supervisor for instructions regarding the safety condition, at a step 114. In the example just noted, the supervisor would likely arrange for the tire to be replaced by maintenance or repair personnel before the operator makes a trip in the vehicle.

In some cases, a supervisor might override the operator's determination of the state of the component based upon the reported condition. Therefore, a decision step 116 determines if the supervisor has given authorization to the operator to make the trip, scheduling a later repair of the component. If so, the logic proceeds to step 106, in which the operator continues with the inspection as described above. If not, there is no further need to inspect the remainder of the vehicle at that point, since the complete inspection will need to be carried out again after the unsafe condition has been corrected, e.g., by replacing the defective tire. The logic is then done, as indicated in step 118.

In the event that the operator determines that immediate attention is not required at decision step 108, at a step 120, the operator presses yellow control button 54 on portable device 20. The operator then selects and enters the condition noted on the portable device, as indicated in a step 122. In the example shown in FIG. 4, six possible conditions are indicated by statements on display screen 40 for a tire that is still usable but needs service. In this case, the operator employs cursor control 50 to move the cursor to a selected statement that thus describes the observed condition of the component and then depresses red control button 56 to enter the condition, creating a record of the state and condition of the component currently being inspected that is retained within the memory of the portable device. Thereafter, the logic proceeds to step 106, in which the operator continues with the inspection.

Alternative Embodiments of Portable Device

It should be recognized that many alternative configurations for the portable device described above are possible. Additional features such as a flashlight and digital camera can be added to the portable device.

Docking Station and Network Storage of Inspection Data

Figure 8:
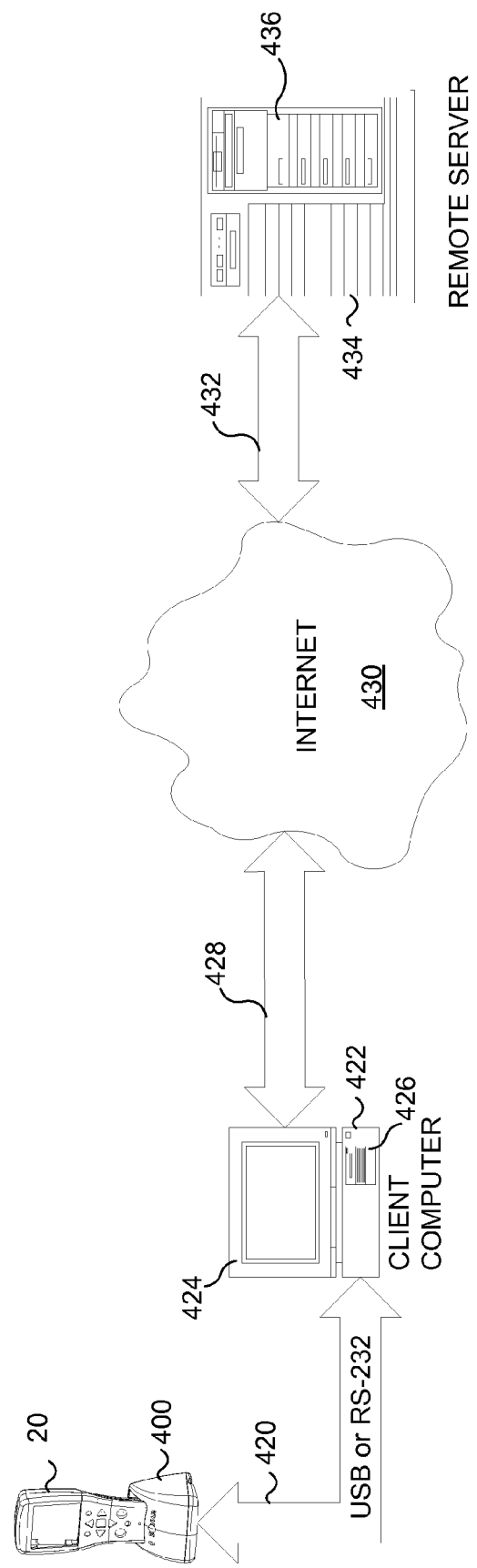
FIG. 8 is a schematic diagram of the system for transferring data over the Internet, between the portable device in the docking station and storage on a remote server.

FIG. 8 illustrates a docking station 400 for portable device 20. Docking station 400 includes a housing having a receptacle into which the portable device can be fitted, to facilitate downloading of the data stored within the portable device to a remote storage. Docking station 400 can include an indicator light that changes color to indicate that data are being transmitted from the portable device to a networked device (such as a data storage device). Docking station 400 also includes an interface circuit that couples the data port on the portable device to a computer 422 through a lead 420. The interface circuit converts the data format of portable device 120 to a universal serial bus (USB) or serial RS-232 format for communication with personal computer 422. Accordingly, data link 420 is connected either to the USB port or serial port on personal computer 422 from a port on docking station 400. It should be recognized that other types of computing devices might be used instead of computer 422, and other data formats can be employed, as appropriate. As shown, computer 422 has a display monitor 424 and a hard drive 426 for recording data temporarily transferred from the portable device. Subsequently, the data stored on hard drive 426 are downloaded through a data link 428, over Internet 430, and through a data link 432, to a remote server 434, which includes additional storage in the form of a plurality of hard drives 436.

Data links 428 and 432 can each comprise a telephone modem connection over a telephone network, a wireless data link, a broadband connection through a DSL interface or cable modem, or a cell phone link. Alternatively, computer 422 can be directly connected over a local area or wide area network to remote server 434. In general, it is only necessary that the data stored within the portable device resulting from one or more inspections be transferred to a more permanent storage, whether in computer 422 or in remote server 434, so that the memory within the portable device is thereafter available to store data from further inspections. By providing remote storage of the data that are downloaded from the portable device from time to time, the security and maintenance of the data are ensured.

An Accessory Embodiment for Use with Portable Computing Devices

While it is likely that an initial preferred embodiment will employ portable device 20, it is also contemplated that an accessory might be provided for a portable computing device, such as a personal digital assistant (PDA), that would enable the portable computing device to be used for generally the same functions as portable device 20. The accessory to the portable computing device should thus include a sensor to detect when the portable computing device is within the predetermined maximum range from the token associated with the component currently being inspected. The conventional controls on the portable computing device can be used to make and enter a selection. Furthermore, instead of using a cursor control, it is also contemplated that a touch screen display (such as those commonly found on PDAs) might instead be used for making selections of menu items and other options presented to the operator on the touch screen display. In addition, the portable computing device must be programmed to carry out the functions implemented by portable device 20, to generally carry out the step described above. Preferably, the portable computing device and accessory should be sufficiently small and lightweight so as to enable a user to carry and manipulate the combination for a period of time sufficient to complete an inspection without undue fatigue.

Figure 9A:
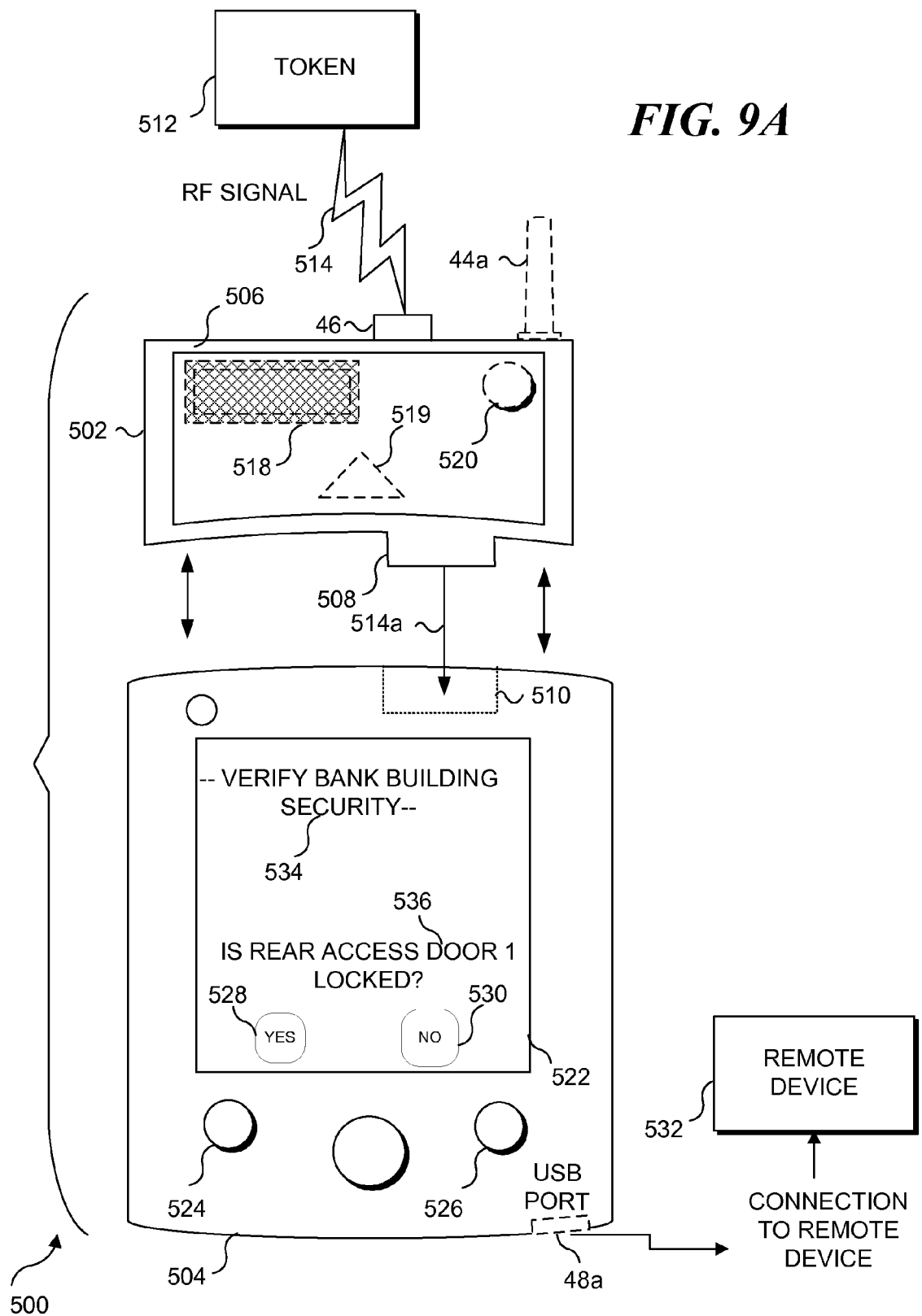
FIG. 9A is a schematic block diagram showing how an accessory is to be coupled to a portable computing device in an alternative embodiment of the portable device.

FIG. 9A schematically illustrates such an accessory for use with a portable computing device. A portable reader 500 is achieved by attaching an accessory 502 to a portable computing device 504, via an interface connection 508. Once the portable computing device is coupled to the accessory, the portable device can be used for the same functions as the portable device embodiments described earlier. As noted above, portable computing device 504 must be programmed to carry out those functions, and in some embodiments is preferably programmed to carry additional functions as described below. In brief, when accessory 502 detects that it is proximate to a token 512 (preferably affixed adjacent to a component that is to be inspected), the accessory transmits a sensor signal 514a to portable computing device 504. The sensor signal is indicative that the operator holding portable reader 500 is positioned such that an inspection of the component can be achieved. Accessory 502 can include a power source (such as a disposable or rechargeable battery), or accessory 502 can be configured to parasitically draw power from the portable computing device.

Once portable computing device 504 has received the signal from accessory 502, the programming of the portable computing device will determine the action that occurs next. In one embodiment, the portable computing device produces a record to be stored in a memory (e.g., on a hard drive) of the portable computing device. As discussed above, all such records stored in the portable computing device can be transferred to a remote storage location, either by using a physical connection (such as a USB port 48a), or a wireless transmission. In another embodiment, the portable computing device is programmed such that no record is produced and stored in the portable device; instead, the portable computing device is programmed to transmit the signal received from the accessory to a remote device (such as a desktop computer coupled to a network) via a wireless transmission. The record can then be generated and stored at the remote device. In this embodiment, the portable computing device preferably includes a transmitter (or radio) enabling the portable computing device to communicate with a remote device wirelessly (or to a router that is coupled to the remote device via a physical connection). While data transmission could occur via a physical connection such as a USB port connection, such a configuration would require the portable computing device to be physically coupled to a network, limiting the mobility of the portable computing device. The wireless communications capability could be implemented using infrared (IR) transmissions, but such transmission is generally limited to relatively short distances. Preferably the wireless communications capability is implemented using longer range technology, such as wireless telephony technology (i.e., any radio frequency transmissions, including microwave transmissions).

Accessory 502 includes a housing 506, sensor 46, and interface connection 508. The sensor is configured to inductively couple to token 512, but alternatively, it may detect the token optically. While sensor 46 is shown as a separate component in FIG. 9A, in another embodiment, the sensor is configured to use antenna 44a to detect the token affixed proximate to the component to be inspected. The interface connection enables the accessory to transmit data, such as sensor signal 514a, to the portable computing device. Interface connection 508 can be implemented as a physical connection (i.e., using male and female electrical contacts, one set of contacts being on the portable computing device and the other set of contacts on the accessory), or a wireless connection. Because the accessory will be in close proximity to the portable computing device (preferably attached to the portable computing device, such that the combination of the portable computing device and the accessory can be carried in one hand), wireless data transmission such as IR data transmission can be beneficially employed. Of course, longer range wireless transmission technology, such as radio frequency transmission or microwave transmission can be employed, but the longer range typically provided by such technologies is not required. The interface connection can also provide means for physically coupling the accessory to the portable device. As shown, interface connection 508 is a port that plugs into a receptacle 510 on the portable computing device. An interference fit between the receptacle and the plug enables the accessory to be removably attached to the portable computing device. While not shown, latches or other securing hardware can be implemented to secure the accessory to the portable computing device. Those skilled in the art will recognize that the physical connection between the accessory and the portable computing device can be configured such that the accessory is joined to the portable computing device at alternative locations, including along the sides, or back of the portable computing device.

Preferably, portable computing device 504 is a PDA, such as a PALM™ PDA. The portable computing device could also be a personal computer or laptop; however, such an implementation may result in a relatively large combination that may be unwieldy for carrying out long inspections. Of course, as the sizes of personal computers continue to decrease (for example, tablet computers are likely to be offered in smaller sizes in the future), the issue of the portability becomes less of a concern for such combinations. The portable computing device employed might already include a transmitter that enables the portable computing device to communicate with another device via a wireless communication, such as the conventional WiFi circuitry often provided in accord with the IEEE 802.11a/b/g standards, or newer longer range versions of wireless communication to be provided on portable computing devices in the near future.

Preferably, the accessory can be configured so that it is coupled to a portable computing device, such as a PDA for a first inspection. Thereafter, the accessory can be detached from the personal digital assistant and attached to a different portable device for use in a subsequent inspection. If the accessory is configured to be used with multiple portable computing devices that have different form factors (such as a PDA and a tablet computer), the housing of the accessory is preferably configured to attach to the various multiple form factors of portable computing devices with which the accessory will be used.

Once the interface connection has been properly established between the accessory and the portable computing device, the combination corresponds to portable reader 500. This portable reader can then be used to verify that a user was in a position to conduct almost any type of inspection, of any component, for almost any purpose. Thus, when accessory 502 is within a predetermined maximum distance from token 512, the sensor will produce a signal indicating accessory 502 is within a required range of the component to be inspected. The sensor may be configured to detect the token through a radio frequency signal 514 as shown in FIG. 9A. In the alternative, the sensor can be configured to detect a signal generated by a magnetic field, an electrical field, or an optical pattern, as discussed in detail above, with reference to FIG. 3.

Returning to FIG. 9A, optional components of accessory 502 include a speaker 518, a light indicator 520, and a positioning component 519. Either the speaker or light indicator (or both) can be used to provide an indication to the operator that the accessory is within the predetermined maximum distance from token 512, such that signal 514 is generated. Accessory 502 is preferably configured so that speaker 518 generates an audible tone (or message) whenever signal 514 is generated. Similarly, indicator 520 can optionally be illuminated whenever signal 514 is generated, providing a visual and/or audible indication to the operator, depending upon whether only the indicator or the speaker are energized. A combination of both audible and visual indicators may be preferable to provide a clear verification to the operator that signal 514 has been generated.

If accurate proximity readings of the tokens are required, the positioning component may be employed to provide a longitude coordinate and a latitude coordinate for each token, which can be done regardless of whether the token is disposed at a fixed site or a mobile site. The longitude and the latitude coordinate data for tokens that are located at fixed sites such as railroad, pipeline, fence, or tunnel inspection points would not necessarily provide useful information for inspection reports, since these types of structures are typically located in geographically stable areas so that their position does not change. However, it is possible that this information could be useful in studies to evaluate unstable geographical areas, such as areas that have experienced significant erosion, or in studies to evaluate the movement of glaciers, or shifting of the Earth's tectonic plates. In this scenario, periodic measurement of the GPS coordinates of tokens located in these areas could be of scientific benefit.

However, it is more likely that longitude and latitude data will be useful where such data are obtained from tokens that are disposed on mobile structures (such as vehicles and other types of mobile equipment). For example, if there is a requirement that vehicles need to be inspected each time they enter a specific geographic area, this data will provide evidence that the vehicle was inspected in that area. In the alternative, if a vehicle is stolen, a review of areas in which and the times at which the stolen vehicle has been driven may be helpful in determining patterns of theft. To illustrate the benefit of this approach, a trucking company may notice a higher than unusual incidence of theft or vandalism occurring on vehicles in their fleet records when driven through certain cities or neighborhoods. Thus, the pattern identified by the location data may lead the company to bolster security measures on vehicles when the vehicles are driven in certain geographical locations.

The positioning component can be implemented by using a GPS receiver that receives positional data from the satellite-based navigation system maintained by the U.S. Government, or by using similar systems. GPS receivers are configured to receive signals from a plurality of different satellites and to use those signals to determine a position of the GPS receiver. Alternatively, the positioning component may be a component capable of triangulating signals from a plurality of cellular telecommunication towers in order to similarly determine the location of the positioning subsystem component.

Once signal 514 has been generated, accessory 502 will convey the signal to portable computing device 504 via interface connection 508. Preferably, portable computing device 504 will then display operator prompts on a visual display 522, e.g., concerning the component being inspected (as discussed in detail above). The operator can use conventional controls 524 and 526 on the portable computing device to respond to such prompts. In the alternative, the operator may respond to the prompts by using touch screen indicators 528 and 530. Those skilled in the art will recognize that if the portable computing device is a laptop, that a keyboard associated with the laptop can be utilized to input responses to such prompts.

Once the operator has responded to the prompts on the portable computing device, this data can then be transmitted to a remote device 532 from the portable computing device. The transmission may occur in the form of a download through a hardwired connection. For example, optional USB port 48a or an optional serial port (not shown) could be utilized to enable portable computing device 504 to transfer data to remote device 532. The portable device may include a transmitter/receiver, enabling the portable device to communicate wirelessly with a remote device, as noted above. If the portable device does not include a transmitter/receiver, but the accessory does, the portable device can be programmed to use the accessory's wireless transmitter to send data to the remote device. Note that if the accessory is used to transmit data from the portable computing device to a remote device, then the interface connection between the portable device and the accessory must support bi-directional communication.

As described earlier, portable reader 500 can be used to verify that a component was visited for a variety of reasons. First, to illustrate its use for security inspections, a security guard at a financial institution may be given accessory 502 that couples to portable computing device 504 (thus achieving portable reader 500) in order to ensure the security of entrance and exit doors of the financial institution. In this situation, a security guard (the operator) would need to periodically visit each entrance and exit of a bank to check that the doors were locked and check for any evidence of tampering or breakage. When the security guard is within the predetermined maximum distance from a token that is strategically located at the first entrance or exit to be inspected, indicators on the portable reader would become active. If included, light indicator 520 can be made to start flashing when the security guard is sufficiently close to an exit/entrance to check its security. Optionally, speaker 518 could be activated to beep or deliver an audible message to the security guard, such as: "You are within range of this inspection point. Please proceed to the next inspection point."

Although tokens located at vulnerable banking institution exits and entryways are fixed and will not be mobile like tokens mounted on a truck, security specialists may still find it helpful to record the longitude and the latitude coordinate data whenever such tokens are read. This record of token locations may be used to ensure that the security guard's route taken to the specific tokens is indeed random in order to prevent would-be criminals from gaining easy access to the building at a time and place selected based upon observation of the guard's habitual pattern of movement through the building. Thus, a database of the previous routes used by a guard to inspect all tokens that is derived from the longitude and the latitude coordinate data taken for each token during previous inspections can be analyzed to provide new sequences for token inspections that ensure random routes are followed for accessing the tokens. The prompt displayed to the guard can be customized to achieve a random route for the inspection performed by the guard. For example, in this embodiment, portable computing device 504 can be programmed to display appropriate inspection prompts, such as a message 534 ("verify bank building security"), and a message 536 ("is rear access door locked?") on visual display 522, so that the guard is led through the building in the desired random route inspection sequences. If a specialist has determined from analysis of the longitude and the latitude coordinate data that the security guard has been instructed too often to begin the inspection at a north side access door, message 536 prompting an inspection of a south side access door initially can be displayed to ensure a more random and stronger security routine, because inspecting the south side access door first would represent a variation from what is always done. In the event that there is a breach of the bank's security, an analysis of both the coordinate data of the token inspected and a timeline should provide a clear indication of where the security guard likely was at all times. Hence, depending on the distances between tokens and thus, the length of time it may have taken the guard to reach another token, insight into how the thieves successfully avoided the guard's route may be gained, and this knowledge can subsequently be used to improve security. Portable computing device 504 can be programmed to enable the operator to manipulate conventional controls 524 and 526 to indicate either a "yes" or "no" response to message 536, or to respond to message 536 using touch screen controls 528 and 530. Because such a security inspection might be considered to be very time-sensitive, rather than downloading the inspection data at a later time via a hardwire connection such as USB port 48a, the portable computing device can be programmed to immediately transmit data to remote device 532, indicating a token has been read, using either a transmitter that is part of accessory 502 or included in portable computing device 504. Thus, a central security station (the remote device) can be immediately informed of the results of the latest inspection of the bank building access doors.

Figure 9B:
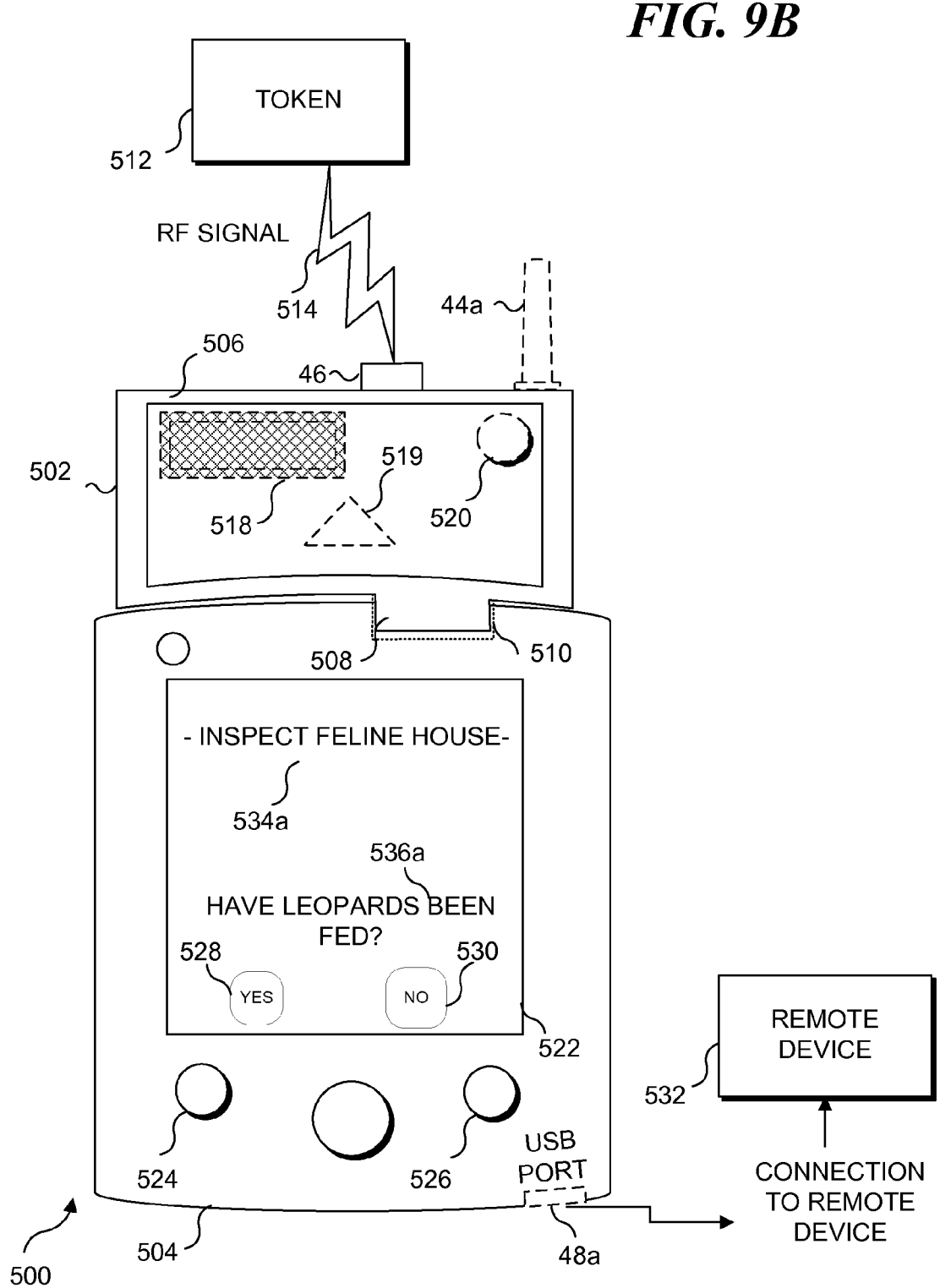
FIG. 9B is a schematic block diagram showing how an accessory is coupled to a portable computing device in another alternative embodiment of the portable device.

FIG. 9B similarly shows portable reader 500, achieved by attaching accessory 502 to portable computing device 504. In FIG. 9B, portable computing device 504 has been programmed to facilitate an inspection of a zoo. Zoo staff can utilize the portable reader to verify that inspections have been made to ensure the diverse zoo residents have clean and properly maintained habitats, and to ensure that feedings and medical care are provided at appropriate intervals. Thus, a zoo staff member may be given accessory 502, coupled to portable computing device 504 (as shown in FIG. 9B) in order to check the feline exhibit at the zoo. When the zoo staff member is within the predetermined maximum distance from a token that is strategically located at a leopard exhibit, the optional indicators can become active (in embodiments where such indicators are included). When present, light indicator 520 can be made to blink when the zoo staff person is sufficiently close to the leopard exhibit to ensure that the habitat has been cleaned and that the leopards have been fed. Similarly, when present, portable computing device 504 can be programmed to activate optional speaker 518 to beep, or provide an audible message to the zoo staff member indicating: "You are within range of the leopard exhibit. Please proceed with the inspection." Preferably, portable computing device 504 has been programmed to use display 522 to show a message 534a ("inspect feline house"), and a message 536a (providing the prompt "have leopards been fed?"). As noted above, portable computing device 504 has preferably been programmed to enable the user to manipulate at least one of conventional controls 524 and 526 or touch screen controls 528 and 530 to indicate a "yes" or "no" response.

Figure 10:
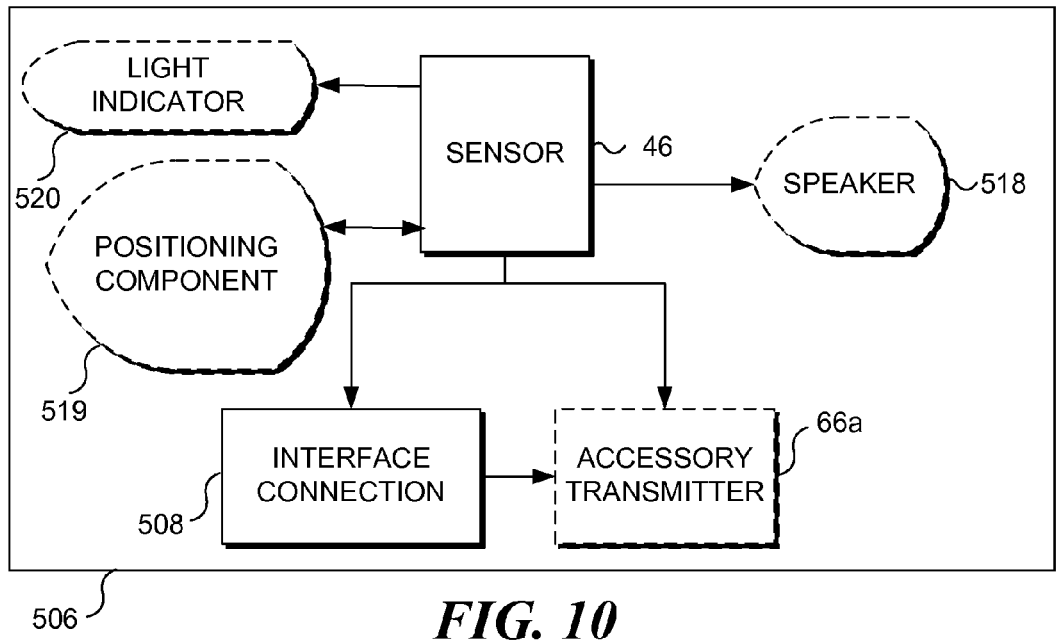
FIG. 10 is a schematic block diagram of the functional components included in the portable device of either FIG. 9A or FIG. 9B.

FIG. 10 illustrates the functional components included in accessory 502, as described in FIG. 9A and FIG. 9B. These components are located either on or within housing 506. Sensor 46 is connected to optional light indicator 520, speaker 518, and connected bi-directionally to positioning component 519 (or alternatively, produces a signal that is used by an intermediate control (not shown) to actuate the optional light indicator and/or speaker and/or positioning component), so that the optional components are activated when the sensor generates a signal. Sensor 46 is also connected to interface connection 508, and an optional accessory transmitter 66a. When sensor 46 detects token 512 (see FIGS. 9A and 9B), it generates sensor signal 514a (see FIGS. 9A and 9B) in response thereto, and that signal is employed for activating optional light indicator 520 and/or speaker 518 and/or positioning component 519, when any combination of these three components are included.

Sensor signal 514a is conveyed to the portable computing device via interface connection 508 (or, the sensor signal can be conveyed to the portable computing device via optional transmitter 66a). If the positioning component is included, positioning data can be provided through the bi-directional connection to the sensor, such that data from the positioning component are conveyed with sensor signal 514a.

In an embodiment where the portable computing device does not include a transmitter/receiver, but the accessory does, interface connection 508 conveys data bi-directionally, such that a record generated by the portable computing device in response to the signal generated by the sensor is conveyed to the transmitter in the accessory to be sent to a remote device for storage.

Figure 11:
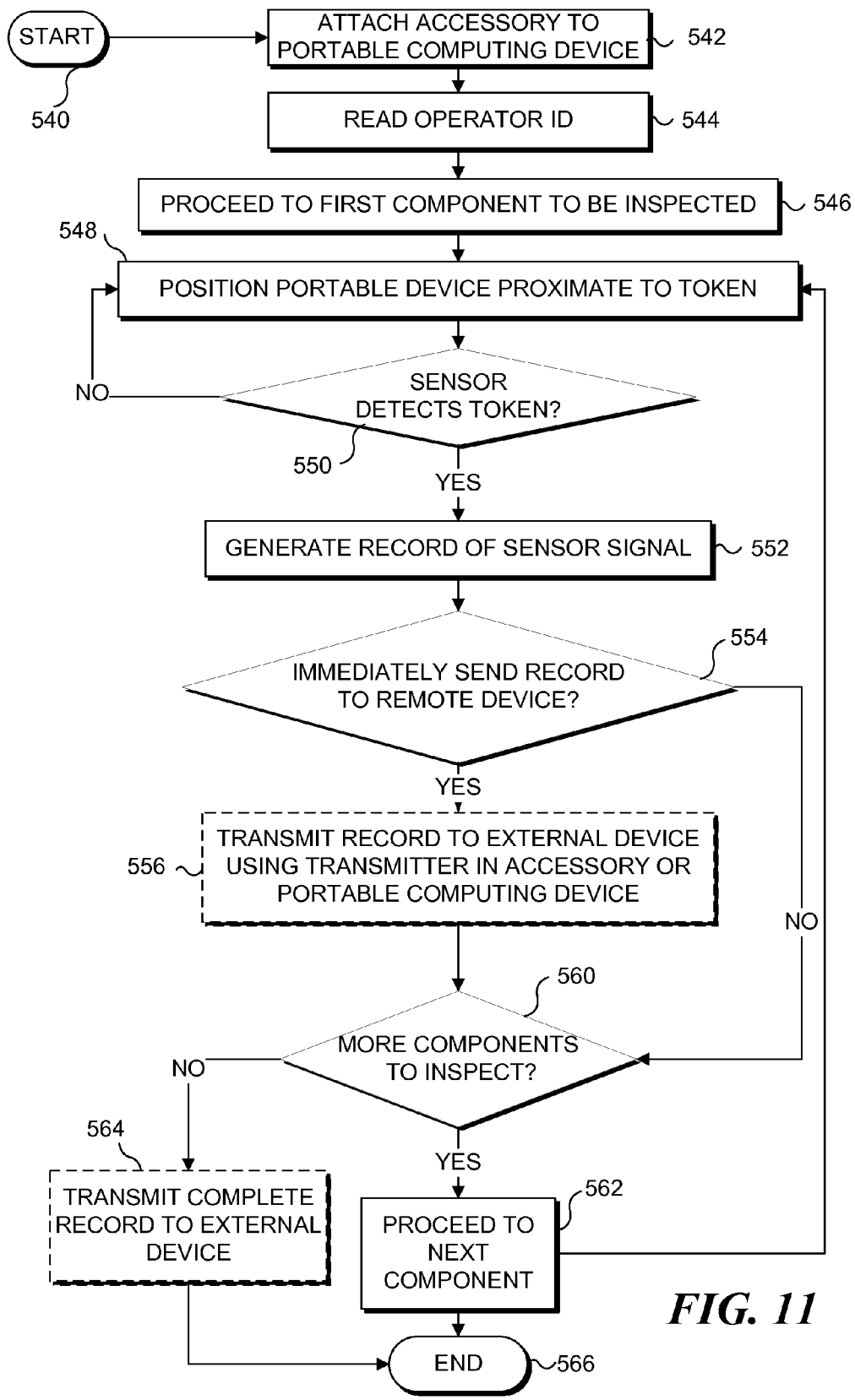
FIG. 11 is a flow chart showing the steps followed in carrying out a component inspection using the accessory coupled to the personal computing device shown in FIG. 9A and FIG. 9B.

FIG. 11 illustrates the logical steps implemented in connection with portable device 500 to carry out an inspection of a component for almost any purpose. The procedure begins at a start block 540, and in a block 542, accessory 502 is attached to portable computing device 504 in order to achieve portable reader 500. This accessory is removably attached, and thus can be detached when the inspection is completed, or may already be attached from a previous inspection. Also, portable computing device 504 must be programmed to process and respond to the sensor signal generated by the accessory. As discussed above, such programming can include configuring the portable computing device to display prompts related to the inspection, to generate a record in response to the signal and store the record in the portable computing device, or alternatively, to generate a record in response to the signal and transmit the record to a remote device, using a transmitter that is part of the portable computing device, or as a still further alternative, to generate a record in response to the signal and transmit the record to a remote device, using a transmitter that is part of the accessory.

Once portable device 500 has been assembled (if not already), the operator may be required to record an operator ID, as indicated in a block 544. Then, in a block 546, the operator proceeds to a first component to be inspected. Using the earlier example, a security guard (operator) may need to inspect the entrance and exit doors of a bank building before, during, and/or after banking hours. In such an exemplary application of this aspect of the concepts disclosed herein, the operator will assemble portable reader 500 and then proceed to the first door that needs to be inspected (for example, to determine if the door is locked or unlocked, or has been tampered with or damaged). In a block 548, the operator positions the portable device proximate the token. In a decision block 550, it is determined whether the sensor detects the token (which is preferably affixed proximate the component to be inspected, as discussed in detail above). If the sensor has detected the token, and the accessory includes the optional speaker, the processor activates the speaker to indicate the signal has been generated. In addition to or as an alternative to the speaker, once the sensor has detected the token, and assuming that the accessory includes the optional light indicator, the processor can activate the light indicator (i.e., causing the indicator to blink, or flash) to indicate the signal has been generated. Furthermore, if the accessory includes the optional positioning component, the processor can activate that component, which will then determine the longitude and the latitude coordinates of the token. The display of the portable computing device can also optionally provide a text message confirming that the sensor has read the token and the coordinate data. It should also be understood that (particularly as prices of GPS and other positioning hardware continue to fall) positioning components can be incorporated into the tokens. Where such tokens are employed, the sensor in the reader can be configured to interrogate the positioning components of a token; so that the signal generated by the sensor indicating that the token has been successfully read includes positional data (e.g., longitude and latitude coordinates) provided by the token. Where a plurality of tokens are associated with a single structure (such as a truck or an airplane), only one token including a positioning component is required to provide positional data for that structure (i.e., not every token will need to include a positioning component). If, in decision block 550, the operator notes that there has been no indication that the sensor has detected the token, the operator again attempts to position the portable reader proximate the token. After the operator has determined that the sensor has read the token and generated a signal in response thereto, in a block 552 the portable computing device generates a record of the sensor signal. This record is generated when the sensor signal is transmitted to the portable computing device, preferably through the interface connection, or optionally, via an accessory transmitter. The record is evidence that a component was visited during an inspection. Where the reader or token includes a positioning component, the record will also preferably include the longitude coordinate and the latitude coordinate of the component that was inspected.

In a decision block 554, the logic controlling the portable computing device determines if the record is to be immediately transmitted to a remote device. Such immediate transmission will require that either the accessory or the portable computing device include at least a transmitter (unless the portable computing device is coupled to the remote device with a physical connection, which is not likely as such a physical connection will make moving the portable computing device and accessory from one inspection point to the next more difficult), and also, preferably a receiver. If yes, the record is transmitted to a remote device in a block 556, using either a transmitter in the accessory or in the portable computing device. For instance, if the inspection requires the immediate transmission of data from each inspection point, a transmitter can be included in either the accessory of the portable computing device, such that after the operator inspects each entrance or exit (or other inspection point or component), the data record can be transmitted to a server for a central security agency (or other remote device), in order to provide real-time inspection data. Those skilled in the art will recognize, however, that if the portable computing device (or accessory) does have a transmitter, the portable computing device can be programmed to transmit inspection records only after a certain number of components are inspected, or only after all components are inspected.

In a decision block 560, the portable computing device determines if any more components need to be inspected. If so, then a block 562 provides that the operator proceed to the next component, and the steps of blocks 548 through 560 are repeated. If there are no more components to be inspected (and if the record data have not already been transmitted to a remote device), then in a block 564, a record of all of the components visited is transmitted to an external device (wirelessly, via a physical connection, or a combination thereof, as discussed above). When no more components remain to be inspected, the process is completed, as indicated by an end block 566.

A Portable Reader Configured to Provide a Time and Date

The next embodiment is particularly well suited to be used in inspections where detailed inspection prompts are not provided to operators to facilitate an inspection. As discussed in detail above, where a portable reader includes a display, the portable reader can be configured to provide text messages to an operator, to prompt the operator to input a response (such as a condition of the component to be inspected), or to provide the operator with detailed instructions as to the location of the next inspection point. While such functionality is beneficial for many inspections (such as a vehicle safety inspection), many other types of inspections do not require detailed instructions or prompts to be provided to the operator. For example, operators of pipelines that are used to move fluids (such as water, natural gas, petroleum or bulk chemicals) frequently need to inspect many miles of pipeline for leaks and inspect pipeline related equipment (such as pumping stations). Railroad companies similarly need to inspect many miles of track and track related equipment (signals and switches). Utilities need to inspect many miles of electrical transmission lines, and the towers supporting the lines. Because there will be little variation in the components to be inspected in such inspections, and because there will likely be no need to provide a map to a next inspection point (the inspector simply follows the pipeline, or track, or electrical line), there is much less benefit for a portable reader to provide detailed instructions or maps via a display. For such inspections, simply providing a record, including a time and a date, that verifies that portions of the pipeline, track, or electrical transmission grid that were inspected would be useful. Since these types of structures are stationary, it is unlikely that the positioning component will be included, although such a component can be included if desired. Because of the many miles of pipeline, track, and electrical lines, it would be preferable to minimize the time required at each inspection point. Tunnels and roads are also examples of structures that represent only a few components requiring inspection, but which extend for great distances so that considerable time is required to complete the inspection. A portable reader 578, shown in FIG. 12, is very useful for providing evidence that the operator was present to carry out such inspections.

As shown, portable reader 578 has a generally cylindrical housing 576, because the cylindrical form factor is easier to carry and manipulate than other alternatives. However, other form factors are contemplated as also being useful in practicing this aspect of the concepts disclosed herein, and the concepts disclosed herein are not intended to be limited to a cylindrical form factor. For example, the housing could be configured as a square with rounded edges, similar to a pager, that readily fits into an operator's hand. Alternatively, this housing could be shaped as a wrist-mounted unit that is intended to be worn on someone's wrist in a manner similar to the way wristwatches are worn. A wrist mounted portable device may be easier to avoid losing, since the cylindrical portable device is similar in shape to a small writing pen or flashlight and can easily be misplaced or lost, as such devices frequently are. Because portable reader 578 is intended to be used in outdoor environments, the housing is preferably weatherproof and durable.

Figure 12:
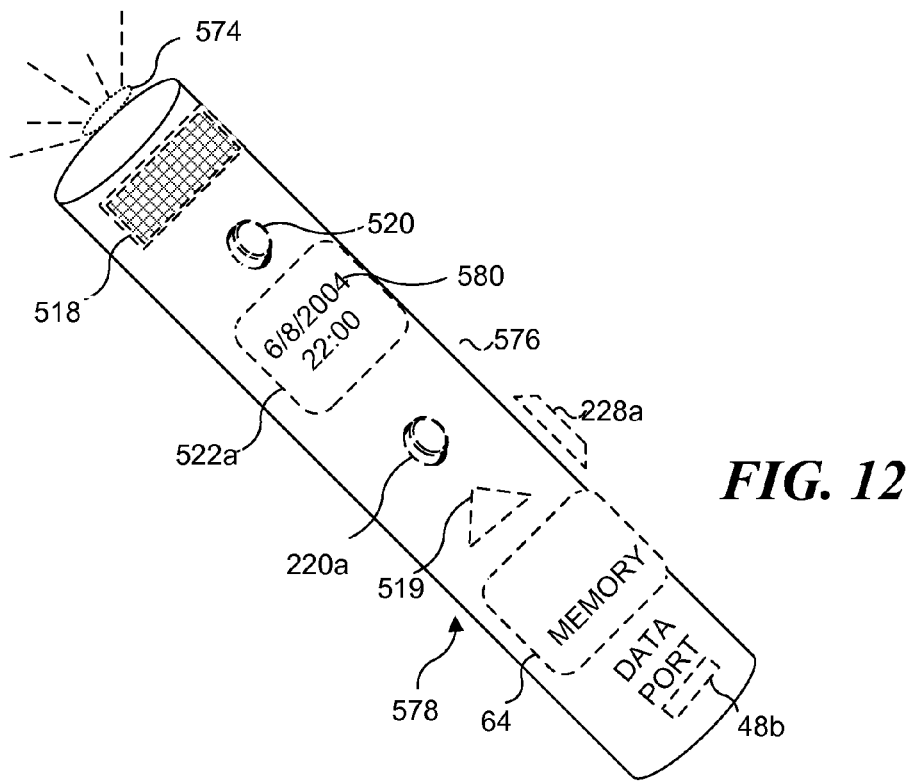
FIG. 12 is a side view of an alternative embodiment of a cylindrical portable device that provides date and time component inspection data.
Figure 13:
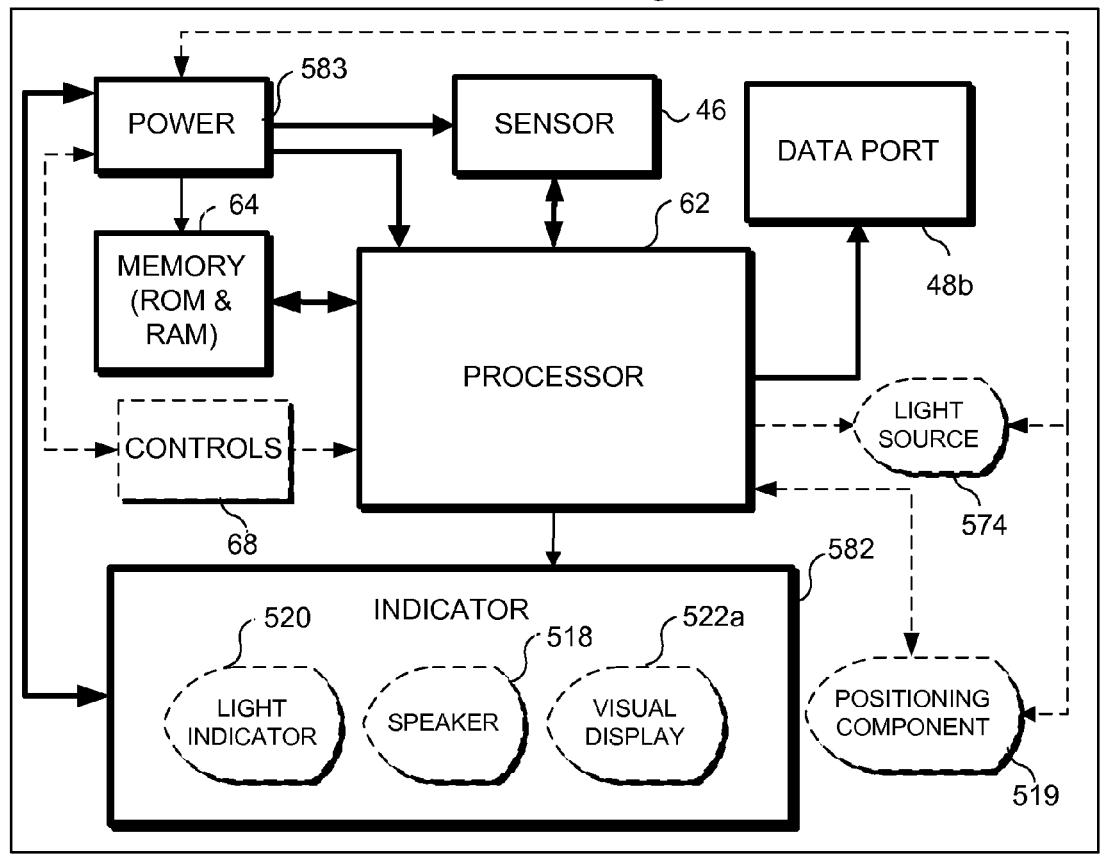
FIG. 13 is a schematic block diagram of the functional components included in the portable device of FIG. 12.

FIG. 13, which in combination with FIG. 12 illustrates portable reader 578, showing the basic components of portable reader 578, and the most likely optional components. At a minimum, portable reader 578 includes sensor 46 (configured to respond to a token adjacent to a component to be inspected, as discussed in detail above), a memory 64, and a processor 62 (comprising either a software controlled central processing unit (CPU) or a hard wired logic application specific integrated circuit (ASIC)). Processor 62 is configured to generate and store a time and date record, along with a record of the longitude coordinate and the latitude coordinate of each token, if so desired, in the memory whenever sensor 46 generates a sensor signal in response to reading a token and the optional positioning component has been included. Memory 64 preferably includes both random access memory (RAM) and read only memory (ROM), particularly where processor 62 executes machine instructions to control the functionality of the portable reader. Portable reader 578 also includes a power source 583, preferably a rechargeable battery, although disposable batteries can also be employed. Rechargeable batteries are particularly preferred, because such batteries can be recharged in a vehicle, as the vehicle is being used to transport the operator and portable reader 578 to the next inspection point. Preferably, the vehicle is equipped with a docking station that serves as a storage area for portable reader 578 when it is not in use and which is coupled to the vehicle's electrical system to enable the docking station to recharge the batteries of portable reader 578.

FIG. 8 shows a docking station configured to upload data from a portable device. The docking station of FIG. 8 can be modified to match the form factor of portable reader 578 and to recharge batteries and/or to upload data. Upload data from portable reader 578 can be stored in a memory integrated into the docking station (or a memory disposed elsewhere in the vehicle), so that the data from the portable device is regularly backed up, and so that the loss of the portable device would not result in the loss of all inspection data. If desired, and if the vehicle is within range of a remote receiver, the docking station can include a transmitter (or be coupled to a transmitter in the vehicle). Then, by inserting portable reader 578 into the docking station in the vehicle, the records stored in the portable device can be retrieved and transmitted to a remote device. Particularly if a recharging cradle is provided, portable reader 578 will not need an on/off switch, because removing the portable reader 578 from the recharging cradle will turn on portable reader 578, and replacing the portable reader 578 in the recharging cradle will turn off portable reader 578.

Portable reader 578 also minimally includes a data port 48*b*, which enables records stored in the memory of the portable reader to be uploaded to a remote device. As discussed in detail above, physical connections, such as USB cables and serial data cables can be used to transfer data. Accordingly, data port 48*b* preferably comprises either a USB port or a serial port, or other appropriate port for transferring data. Data port 48*b* can alternatively comprise an IR transmitter, a radio frequency transmitter, a microwave transmitter, or an inductively coupled data transmitter. The data port is used to upload data to a remote device in the operator's vehicle (or to a transmitter in the operator's vehicle), or the data will alternatively remain stored in the portable reader until the operator returns to an office or terminal to upload the data. Uploading data to a vehicle (for storage in the vehicle or transmission to a remote device) is preferred, because if the portable reader is lost, only the data collected since the last upload will be lost.

A component that is not minimally required for functionality, but which is particularly preferred, is an indicator 582 (see FIG. 13), which is configured to indicate to the operator that the sensor has successfully detected a token. If this indicator is not included, it is possible that an operator might move the reader close to the token, but not sufficiently close so as to enable the sensor to read a token. In this case, the operator will likely assume the token has been read, when it actually has not been read. The record will then incorrectly indicate that the operator was not disposed adjacent to the unread token, and thus, could not have inspected the corresponding component. The indicator can comprise a speaker 518, a light indicator 520, or a visual display 522*a*, or a combination thereof.

In an embodiment that includes speaker 518, the portable reader will activate the speaker to produce an audible prompt indicating that the portable reader has successfully read a token. Such an audible prompt is likely to be very useful in portable reader 578 because a large display screen is not feasible if the size of portable reader 578 is to be kept relatively small. If desired, portable reader 578 can include sufficient memory to store relatively complex audible instructions for the operator, such as voice messages that prompt the operator to proceed to a specific inspection point, to upload any records stored in the portable reader, or to replace or recharge the batteries in the portable reader. For example, the prompt may instruct the operator to "proceed to pipeline component A located at mile marker 35." Once the operator arrives at that point and locates the token that is preferably proximate to the component to be inspected, the audible prompt, for example, may then verify that the component has been accessed by producing an audible message that "component A of mile marker 35 has been accessed (at latitude N3147.55000 longitude W09905.43000); proceed to component B." Alternatively, the speaker can simply emit a distinctive tone that indicates the sensor has successfully just read a token.

Because portable reader 578 has been configured for applications where a large display is not required (i.e., prompts and text data are not required to be displayed to the operator to facilitate an inspection), any visual display included as an indicator will preferably be small and limited to a few characters. An elegant implementation of an indicator is a display 522*a* that indicates a time and date 580 (i.e., 22:00; 8 Jun. 2004), which is generated in response to a signal from the sensor indicating a token has been read. If the display has the correct time, the operator knows the sensor has read the token. If the time is not displayed, or if the previous date is displayed, the operator will understand that the sensor has not read the token and can reposition the portable reader, as appropriate. Alternatively, speaker 518 can provide a simple audible tone, requiring few memory resources, each time a token is read.

Light indicator 520 can also be used to inform the operator that the sensor has read a token, by illuminating or flashing for a predetermined amount of time, each time a token is read. As noted above, a compact display 522*a* can be used to indicate that the sensor has read a token, by displaying the most recent time and date that a token was read. Of course, any combination of these three indicators can alternatively be used to indicate to the operator that the sensor has successfully read a token, so that the operator can proceed to the next component.

Optional components for portable reader 578 include an on/off power switch 228*a* (FIG. 12, and generally indicated as "controls 68" in FIG. 13), a light source 574, positioning component 519, and a light source power switch 220*a* (FIG. 12, and generally indicated as the "controls" in FIG. 13). The light source may comprise an incandescent bulb, or more preferably, a white or blue light LED source (for reduced power consumption). When a light source is included, light source power switch 220*a* enables a user to activate the light source (to illuminate a component that is being inspected, or to produce light for some other purpose). Such a light source will be extremely convenient for inspecting components in tunnels, or other structures that tend to be dark or poorly illuminated. Because the inspection of pipelines, tunnels, railroads, roads, electrical power lines, and telephone lines will be very time consuming, it is possible that such inspections will not always be finished during daylight hours, particularly where structures must be inspected during the short periods of daylight available in the winter months. Portable reader 578 can optionally include controls (each logically coupled to processor 62), for turning the portable reader on, and for selectively energizing the optional light source.

It should be noted that the minimally required components of portable reader 578 in FIG. 13 are indicated in bold, solid line blocks, while optional components are indicated by dash line blocks. Because indicator 582, while not strictly required, is so particularly preferred, it is shown as a bold, solid line block.

Figure 14:
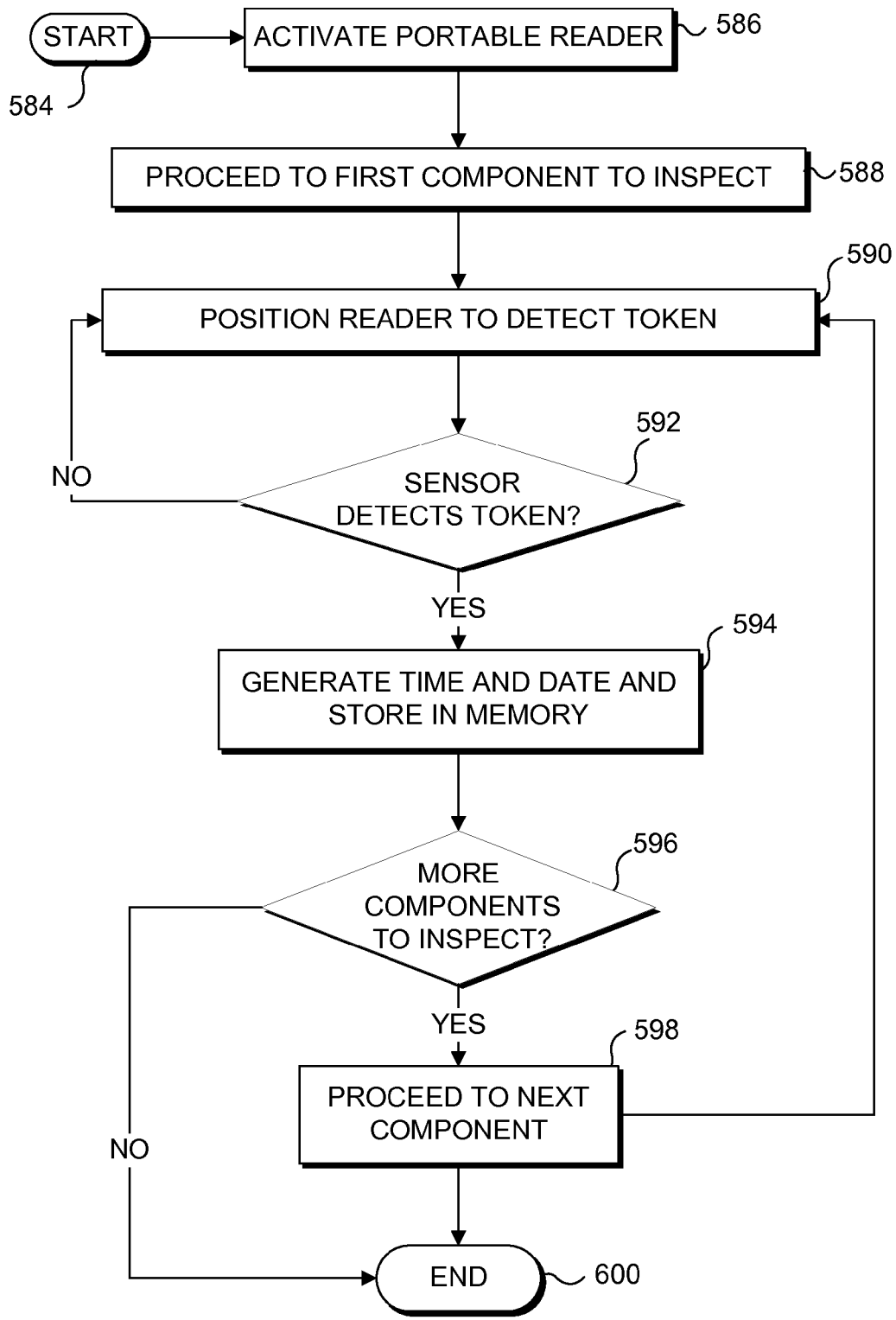
FIG. 14 is a flow chart showing the steps followed in carrying out a component inspection using the portable device described in FIG. 12.

FIG. 14 is a flow chart illustrating the steps followed in carrying out a component inspection using portable reader 578. The logical process begins in a start block 584. In a block 586, the operator activates portable reader 578 (for example, by manipulating optional on/off switch 228*a*, or simply by removing portable reader 578 from a recharging cradle/docking station). Unlike portable device 500, there is no accessory to be removably attached in order to use portable reader 578 to read a token. In a block 588, the operator moves to a first component (such as a portion of a pipeline, a portion of a road, a portion of a tunnel, a portion of a railroad track, a portion of an electrical transmission grid, or a portion of a telephone network) to perform an inspection. If portable reader 578 includes a speaker (and uses audible prompts stored in the memory of the portable reader), the operator may be audibly prompted to proceed to the first component. For example, in regard to the pipeline and tunnel inspection examples, the operator may hear the audible message of "Proceed to first component in Area 1 of pipeline. Begin inspection," or an audible message: "Proceed to first component in section D of tunnel. Begin inspection." Regardless of the form of the prompt, the operator proceeds to the first component.

In a block 590, the operator positions portable reader 578 proximate to the component. If portable reader includes the optional light source, the operator may find it helpful to energize and use light source 574 to locate the token, assuming that the available ambient light does not make the token readily visible. In a decision block 592, it is determined if the sensor has detected the token. If the portable reader includes optional speaker 518, the operator will hear a message (such as "You have accessed component #1, please proceed to component #2.") or a tone indicating the sensor has detected the token. If optional light indicator 520 is provided, the operator will be able to observe light indicator 520 blinking or being steadily illuminated, thus indicating that the sensor has detected the token. In embodiments including optional display 522*a*, the operator will be able to observe the current time and date being displayed, thus indicating the sensor has detected the token (if the sensor has not detected the token, then display 522*a* will be blank, or will display the previous time and date, depending on the programming of portable reader 578). For example, as shown in FIG. 12, component #1 was accessed on Jun. 8, 2004 at 22:00 hours. If the portable reader includes the positioning component, in addition to the time and date that component #1 was accessed, the operator may observe an indication, for example, of a latitude N3037.55000, and a longitude W09805.43000 (not shown in FIG. 12). Any one of these optional techniques for indicating that the sensor has detected a token can be implemented in portable reader 578, and in any combination. If the operator determines that the sensor has not yet read a token, then the operator repositions portable reader 578 (as indicated in block 590), until the operator determines (via one of the indicators described above) that the sensor has detected the token.

Once the portable reader sensor has detected the token, in a block 594 the portable reader will generate the time and date, and optionally, the coordinate data, that will be stored for the inspection. Note that if display 522*a* is the indicator that alerts the operator that the sensor has detected the token, then the step of generating the record in block 594 occurs concurrently with determining if the sensor has detected the token in decision block 592, because the operator will reposition the portable reader only if the time and date are not displayed (the lack of the current time and date in the display indicates that the sensor has not yet read the token).

Preferably, the time and date are stored in the memory of the portable device, along with a unique identifier corresponding to the specific token that was read at that time and date. Such a record will verify that an operator was proximate a specific inspection point at a specific time and date. If the party tasked with inspecting a pipeline, railroad, tunnel, or an electrical transmission grid is accused of negligence for failing to regularly inspect equipment associated with such structures, the inspection records produced by this aspect of the concepts disclosed herein can be employed to refute the accusation, by proving that operators were physically present at specific portions of such items, and at specific dates and times. While proof that an operator was present to make an inspection does not prove that an inspection was actually performed, such proof will be clear evidence that the party responsible for such structures did have an inspection plan that was implemented on a routine basis.

Once the time and date are generated, as noted in block 594, as an alternative to storing the time and date in portable reader 578, a wireless transmitter (such as an RF or microwave transmitter) in the portable reader can be used to transmit the data and the time and date in real time to a receiver. Such a receiver could be beneficially incorporated into a work vehicle used by the operator to move from one inspection point (component) to the next. An advantage of such a system would be that the record will be stored in the vehicle, which is much less likely to be lost than the portable reader. A disadvantage is that requiring a transmitter to be included in the portable reader will increase the size and cost of such a device.

After the time and date are generated in block 594, in a decision block 596 it is determined if more components require inspection. If so, the operator proceeds to the next component, as indicated in a block 598, and the steps in blocks 590-594 are repeated for the next component to be inspected. If there are no more components to inspect, the process is complete, as indicated in an end block 600.

A Portable Reader without a Display and which Provides Audible Prompts

Another aspect of the concepts disclosed herein is particularly well suited for use in inspections where detailed textual prompts or visual diagrams are not needed to facilitate the inspection. While a display will be a desirable element for portable readers employed for many types of inspections, many other types of inspections do not require an interactive display to provide prompts or inspection instructions. Portable reader 141, shown in FIG. 15A, has been configured for making inspections where a display of inspection related data is not required. Instead of including a display to provide prompts and inspection related information to an operator, portable reader 141 includes a speaker, and a memory in which audible prompt data are stored, such that prompts intended to facilitate an inspection are provided audibly, rather than visually. Of course, portable reader 141 can be implemented with a different form factor (such as the generally cylindrical form factor of portable reader 578 of FIG. 12). The minimal required functional components for portable reader 141 include a speaker, a memory, a processor, and a sensor, as described in detail below.

Figure 15B:
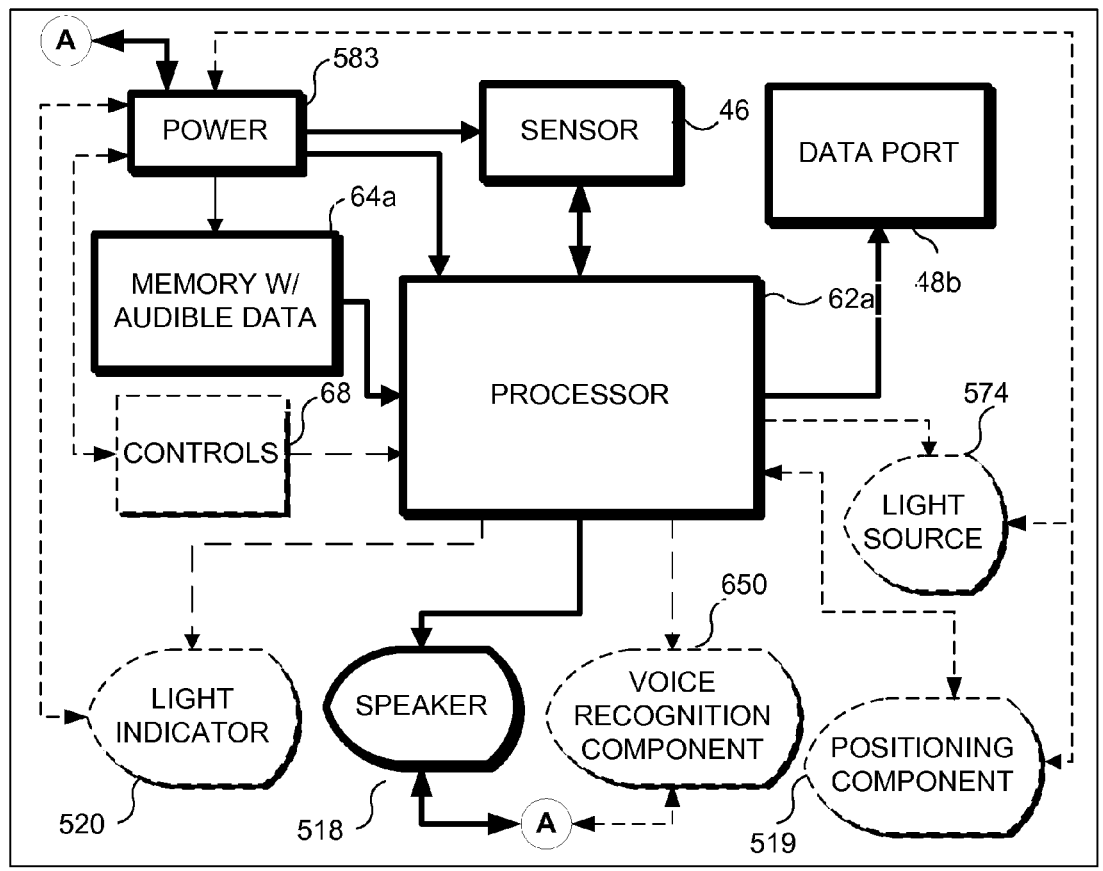
FIG. 15B is a schematic block diagram of the functional components included in the portable device of FIG. 15A.
Figure 15A:
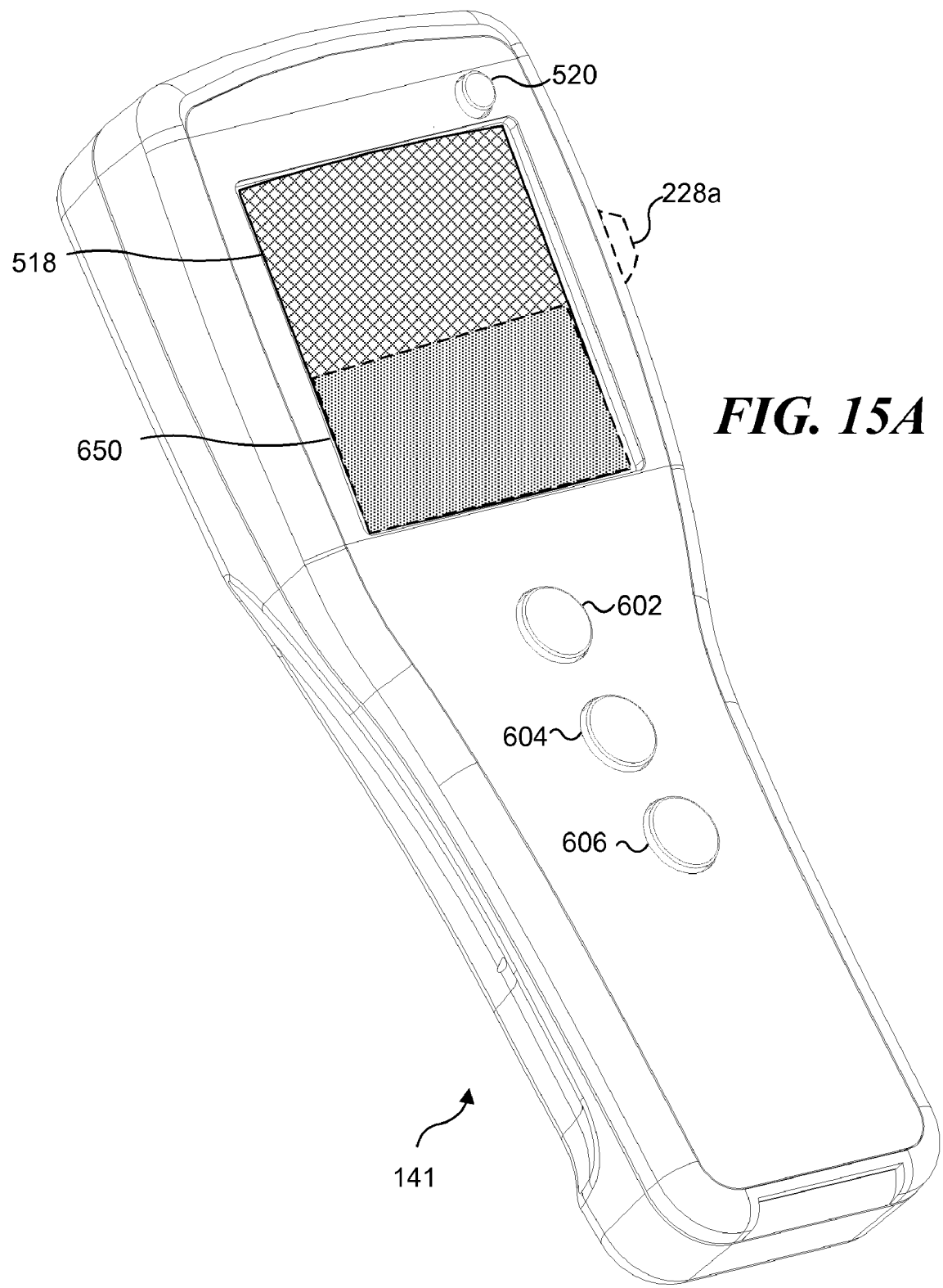
FIG. 15A is an isometric view of the upper surface of a portable device embodiment that provides audible prompts to a user carrying out a component inspection.

FIG. 15A schematically illustrates a preferred form factor for portable reader 141, and shows required and optional elements of the portable reader. FIG. 15B is a functional block diagram showing the required and optional elements of portable reader 141. Thus FIGS. 15A and 15B, in conjunction with the following description, define portable reader 141. At a minimum, portable reader 141 includes sensor 46 (configured to respond to a token adjacent to a component to be inspected, as discussed in detail above) a memory 64*a* (which stores data used to generate audible prompts to facilitate an inspection), and a processor 62*a* (preferably comprising a software-controlled CPU, but alternatively comprising an ASIC). Processor 62*a* creates a record in response to receiving a signal from the sensor, generally as described above. While such a record will generally be stored in memory 64*a*, in some embodiments processor 62*a* can be configured to immediately transmit the record to a remote device, rather than storing the record in the memory 64*a*. Memory 64*a* comprises both ROM and RAM, with a portion of the memory being allocated to store the audible data used to generate audible inspection prompts, and a portion of the memory being used to store records created in response to signals from the sensor (indicating a token associated with an inspection point/component has been read). Portable reader 141 also minimally includes speaker 518, which rather than being an optional component (as it is in other embodiments of the concepts disclosed herein), is a required component in this embodiment, because the speaker is used to provide audible inspection prompts to facilitate an inspection.

Portable reader 141 further minimally includes a power source 583, preferably a rechargeable battery, although disposable batteries can alternatively be employed. Rechargeable batteries are particularly preferred, because such batteries can be recharged in a vehicle, and in many instances a vehicle may be used to transport the operator and portable reader 141 between inspection points. Preferably, the vehicle will be equipped with a docking station that stores portable reader 141 when the portable reader is not in use, and which is coupled to the vehicle's electrical system to enable the docking station to recharge the battery power source of portable reader 141. FIG. 8 shows a docking station configured to upload data from a portable reader. The docking station of FIG. 8 can recharge batteries, and if desired, upload data from portable reader 141, so that the data are stored in a memory integrated in the docking station (or a memory disposed elsewhere in the vehicle), and so that the data from the portable device are regularly backed up. Consequently, the loss of the portable device would not result in a loss of all inspection data. If desired, and if the vehicle is within range of a remote receiver, the docking station can include a transmitter (or be coupled to a transmitter in the vehicle), so that inserting portable reader 141 into the docking station in the vehicle results in the records stored in the portable device being retrieved, and transmitted to a remote device. Particularly if a recharging cradle is provided, portable reader 141 will not need an on/off switch, because removing portable reader 141 from the recharging cradle will turn the portable reader on, and replacing the portable reader in the recharging cradle will turn the portable reader off.

Portable reader 141 also minimally includes a data port 48*b*, which enables records stored in the memory of the portable reader to be uploaded to a remote device. As discussed in detail above, physical connections, such as USB cables and serial data cables can be used to transfer data (and data port 48*b* is therefore a USB port or serial port, or other suitable port for coupling with a corresponding data input). Data port 48*b* can alternatively comprise an IR transmitter, a radio frequency transmitter, a microwave transmitter, or an inductively coupled data transmitter. The data port can be used to upload data to a remote device in the operator's vehicle (or to a transmitter in the operator's vehicle), or the data can remain stored in the portable reader until the operator returns to an office or a terminal to upload the data. When an operator uses a vehicle to move between inspection points, uploading data to a vehicle (for storage in the vehicle or transmission to a remote device) is preferred, because if the portable reader is lost or damaged, only the data collected since the last upload will be lost.

The minimally required components of portable reader 141 in FIG. 15B are indicated in bold, solid line blocks, while optional components are indicated by dash line blocks. Optional components for portable device 141 include an on/off power switch 228*a* (FIG. 15A, and generally indicated as "controls 68" in FIG. 15B), a light indicator 520 (FIGS. 15A and 15B) that illuminates, or flashes to indicate to the operator that the sensor has detected a token, and positioning component 519. The indicator is not required, because portable reader 141 can be configured so that speaker 518 emits a tone or produces an audible message (such as "Token has been read") to indicate to the operator that the sensor has successfully read a token. Additional optional elements include a light source 574 and a light source power switch 228*a* (FIG. 15A, and generally indicated as "controls" in FIG. 15B. As discussed above, the light source can comprise an incandescent bulb or an LED array. Portable reader 141 can also include optional controls 602, 604, and 606 (FIG. 15A, and generally indicated as "controls" in FIG. 15B), and an optional voice recognition component 650. As described above, it may be desirable to provide the operator with detailed audible prompts instead of visual prompts. Voice recognition component 650 enables the user to respond audibly to the prompts instead of responding by manipulating controls 602, 604, and 606. Instead of a voice recognition module, the reader might include only a digital recorder for recording the operator's verbal response, e.g., as a WAV file or using one of the audible compression file formats.

It should be recognized that if desired, a display could be added to portable reader 141. While portable reader 141 without a display is likely to be cheaper to produce than portable reader 141 with a display, it will be apparent that a display can be included, even though audible prompts are employed to facilitate an inspection.

Figure 16:
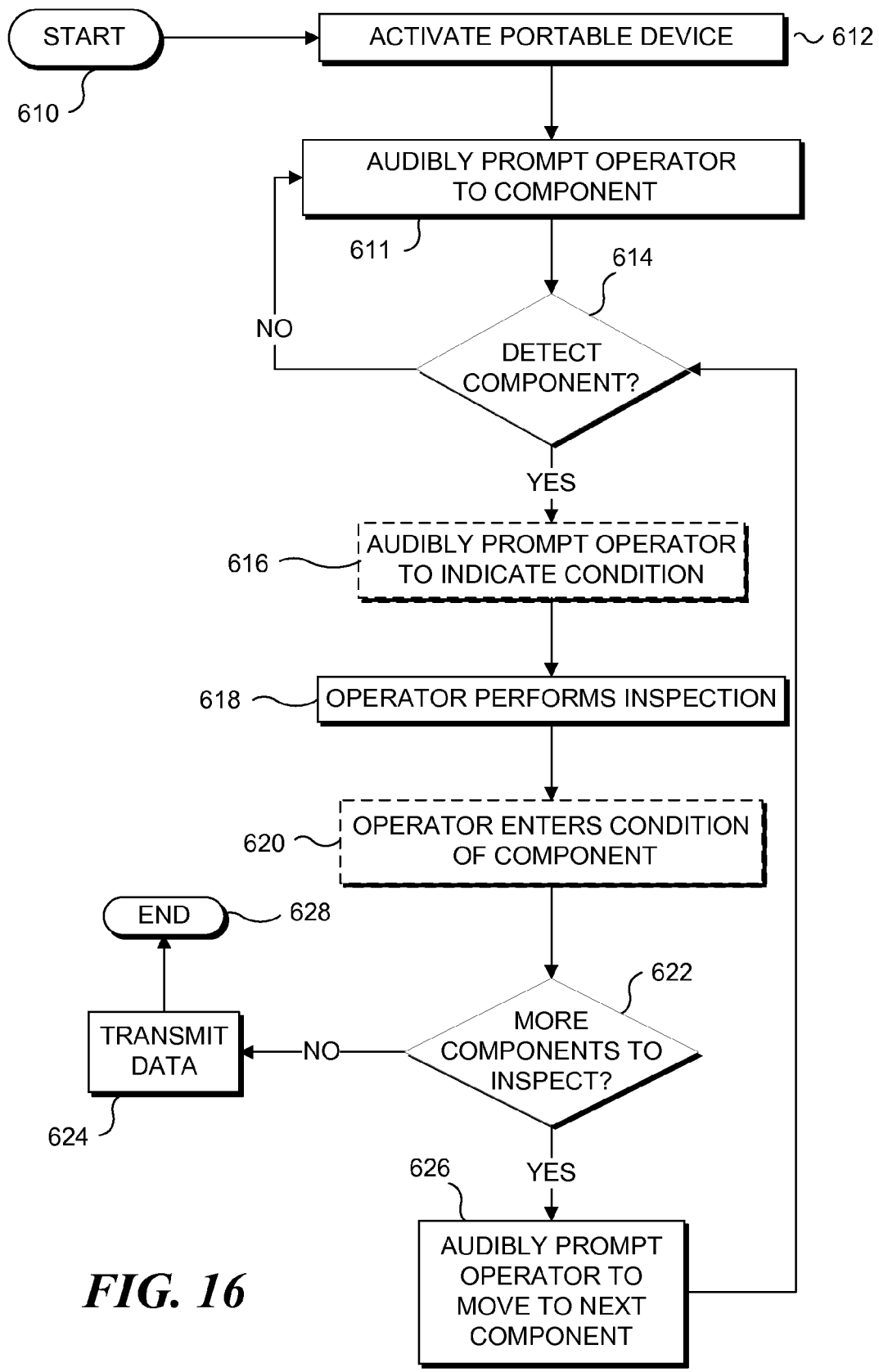
FIG. 16 is a flow chart showing the steps followed in carrying out a component inspection using the portable devices shown in FIG. 15A and FIG. 15B.

FIG. 16 illustrates the logical steps implemented to use portable reader 141 to perform an inspection. In particular, the steps below are described in connection with performing an inspection of fencing used by ranches to control the movement of livestock. Large ranches can employ many miles of fencing, and these fences need to be periodically inspected to reduce loss of livestock, where the fence is down or damaged. Military installations and prisons also use miles of fencing that must periodically be inspected. It should be understood that such an application of the concepts disclosed herein is merely exemplary, and that portable reader 141 is not limited to use in making such inspections.

Many different audible prompts can be used to guide an operator through an inspection. A first preferred type of audible prompt will instruct the operator to move to the component that is next to be inspected. For example, the audible prompt may instruct the operator to "Proceed to the south fence. Inspect fence post S1001." A second type of preferred audible prompt will indicate to the operator that the sensor has detected a token at a specific location, if the optional positioning component is included. Such an audible prompt may be, "Token read at latitude N3037.55000 and longitude W09805.43000. Proceed to next inspection point," or "Token read. Proceed to fence post S1002." Yet another type of preferred audible prompt will instruct the operator to input data regarding the condition of a specific component. For example, the audible prompt may instruct the operator to respond to the following query: "What is the condition of fence post S1002?" The operator will then manipulate controls (if such optional controls are included in the portable reader) to indicate the relative condition of the component. For example, a red button can indicate a broken component needing immediate repair, a yellow button can indicate a damaged component that remains functional, and a green button can indicate a component in good condition. It should be understood that any combination of the above noted types of audible prompts may be implemented. Further, those of ordinary skill in the art will recognize that many different types of audible prompts, including audible prompts that are unique to a specific inspection, can be employed, and that the audible prompts noted above are exemplary and are not intended to limit the scope of the concepts disclosed herein.

The process of using portable reader 141 begins at a start block 610. In a block 612 portable reader 141 is activated, either by manipulating optional power switch 228*a* or removing the portable reader from a recharging cradle/docking station. At this point, processor 62*a* will use the audible prompt data in memory 64*a* to energize speaker 518 and provide an audible prompt to facilitate the inspection in block 611. For example, the first audible prompt that the operator may hear could be "Proceed to the south fence. Inspect fence post S1001."

In a decision block 614, it is determined if the sensor has detected the token. If portable reader includes visual indicator 520, the indicator will be illuminated, or blink to indicate that the sensor has detected the token to be read. The portable reader can be configured to use speaker 518 to provide an audible indication that the sensor has read the token, such as by producing a beep, or a phrase indicating that the token has been read. If in decision block 614, it is determined that the sensor has not read the token, then the logic loops back to block 611, and an audible prompt is again provided, to prompt the user to move the portable reader closer to the component. If in decision block 614 it is determined that the sensor has detected the token, then in a block 616, a further audible prompt instructs the user to input a condition of the component (in embodiments where the portable reader includes controls enabling such input). In a block 618, the operator performs the inspection, and in a block 620, the operator enters the condition of the component. If portable reader 141 includes optional controls 602, 604, and 606, the operator utilizes controls 602, 604, and 606 to input conditions (for example, manipulating control 602 can indicate the component is in good condition, manipulating control 604 can indicate the component is in marginal but operable condition, and manipulating control 606 can indicate the component is in a non-functional condition). If portable reader 141 includes optional voice recognition component 650, the operator can simply state "good," "acceptable," or "broken" (or some other suitable words). The portable reader can thus be configured to recognize answers that the operator gives in response to a series of questions. While entry of the condition of the component is preferred, it should be noted that the entry of condition data for a component is optional.

Once the condition of the component has been entered (or the inspection of the component has been made in block 618, if no condition entry is to be made) in a decision block 622, processor 62a determines if more components are to be inspected. If so, in a block 626, an audible prompt instructs the operator to move to the next component. Such a prompt can simply indicate that a next component is to be inspected, or the audible prompt can specify what specific component that is next to be inspected. The logic then determines if the sensor has detected the next component, and the sequence of steps from decision block 614 to decision block 622 are repeated. If in decision block 622, it is determined that there are no additional components to inspect, then in a block 624, inspection data collected by portable reader 141 are transmitted to a remote device. As discussed in detail above, such data transmission can be implemented using a hard wire connection, IR data transmission, wireless data transmission (such as an RF or microwave transmission), or any combination thereof. Once the data transmission is completed, the process is concluded, as indicated in an end block 628.

A Portable Reader Configured to Immediately Transmit an Inspection Record

Yet another embodiment is specifically configured to immediately transmit either the sensor signal, or a record based on the sensor signal, to a remote device, such that the portable reader need not store an inspection record in a memory within the portable device. Such an embodiment can be used with a remote device configured to receive a transmission from the portable device if the remote device is sufficiently physically close to the portable device during the inspection to receive a transmission from the portable device. For an inspection of a facility such as a building or vessel, such a receiver could be integrated into the building or vessel, so that the receiver for the remote device will clearly be physically close to the portable device and will receive transmissions during the inspection. For inspections of structures such as pipelines, roads, railroad tracks, and electrical transmission lines where an operator will be using a vehicle to move between inspection points, the remote device and receiver can be integrated into the operator's vehicle, which will likely always be sufficiently close to the portable reader to receive such a transmission during the inspection. As noted above, immediately transmitting inspection data to a remote device, as opposed to storing the inspection data in the portable reader (even temporarily), eliminates the possibility that the inadvertent loss or destruction of the portable reader will result in a loss of inspection data recently collected.

Figure 17:
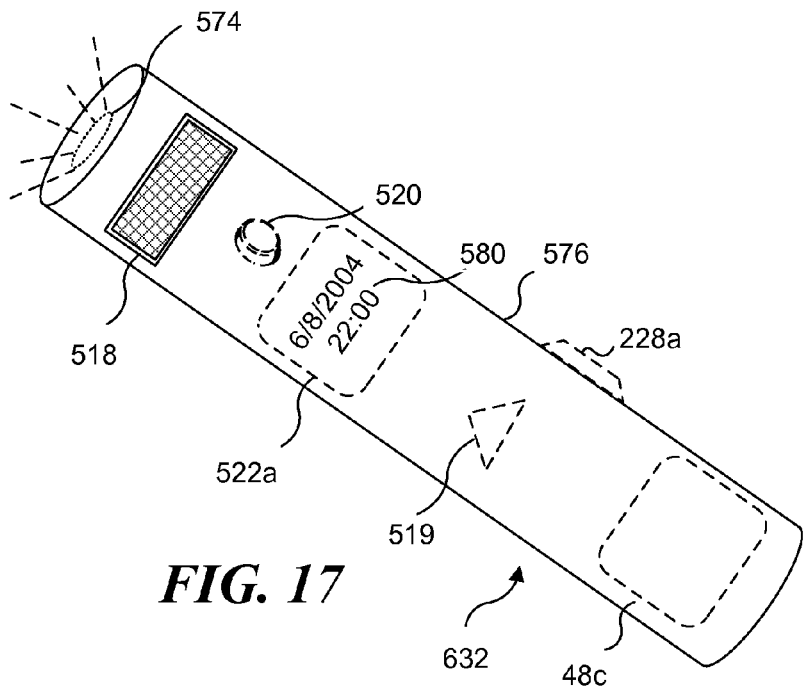
FIG. 17 is an alternative embodiment of a cylindrical portable device that is capable of transmitting time and date component data.
Figure 18:
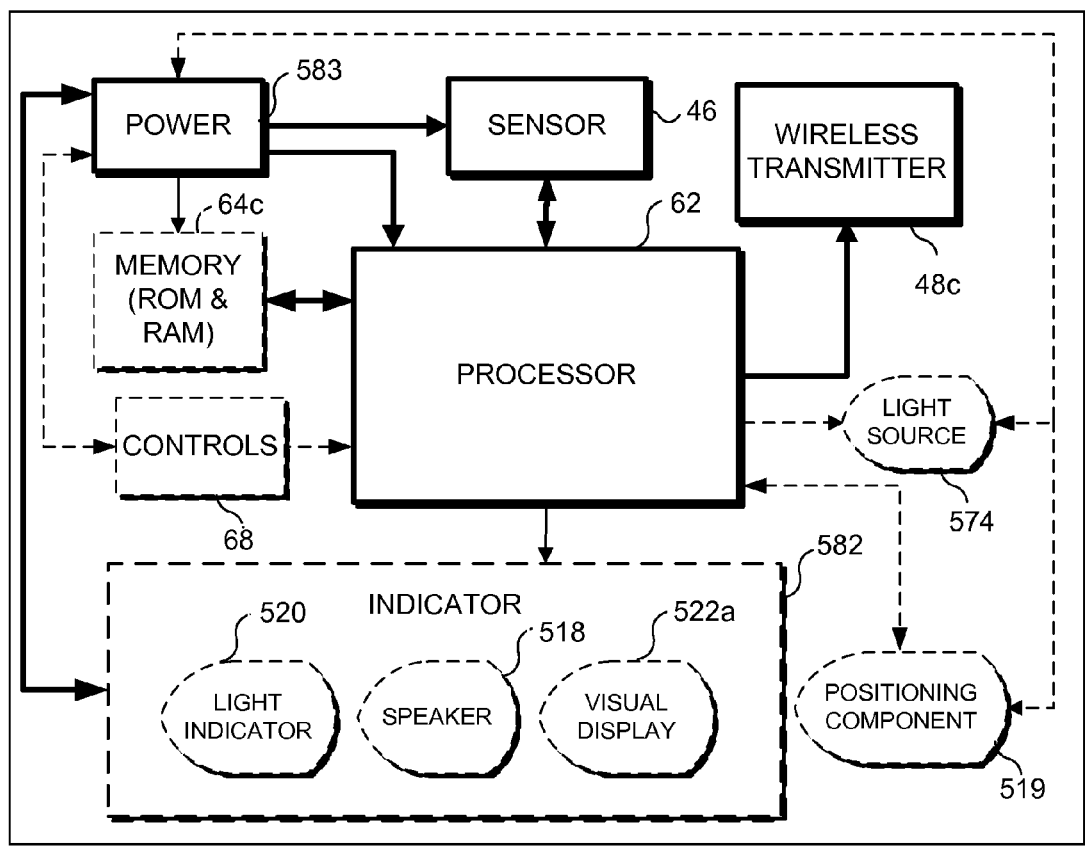
FIG. 18 is a schematic block diagram of the functional components included in the portable device of FIG. 17.

FIG. 17 schematically illustrates one possible form factor for a portable reader 632, which is configured to immediately transmit inspection data, rather than storing the inspection data within the portable reader. FIG. 18 is a block diagram of the functional elements of portable reader 632, in which minimally required elements are indicated by bold solid line blocks, and optional elements are indicated as dash line blocks. While the form factor of portable reader 632 shown in FIG. 17 is very similar to the form factor of portable reader 578 of FIG. 12, it should be understood that the form factor or shape shown is intended to be exemplary, rather than limiting the scope of the concepts disclosed herein.

The minimally required components for portable reader 632 are a power source 583 (such as a battery, as discussed in detail above), sensor 46 (also discussed in detail above), processor 62b, and a wireless transmitter 48c. Processor 62b can comprise an ASIC (in which case no memory is required), or a CPU that executes machine instructions stored in a memory 64c. If processor 62b is implemented as a CPU, the memory included in portable reader 632 only need be employed to store program machine language instructions for controlling the CPU, and is not required to store inspection data. The wireless transmitter preferably comprises a radio frequency, or microwave transmitter. An IR transmitter, while wireless, is not likely to have sufficient range to enable the portable reader to be positioned at a useful distance from a receiver configured to receive the inspection data transmitted from portable reader 632. The dashed lines used to indicate wireless transmitter 48c in FIG. 17 simply indicate that the transmitter is an internal component, not an optional component.

Optional components for portable device 632 include an on/off power switch 228a, speaker 518, light indicator 520, visual display 522a, positioning component 519, and light source 574, each of which have been described in detail above in connection with other embodiments. While most embodiments include on/off power switch 228a, as noted above, the portable reader can be configured to automatically be energized when the portable reader is removed from a docking station or a recharging cradle.

Figure 19:
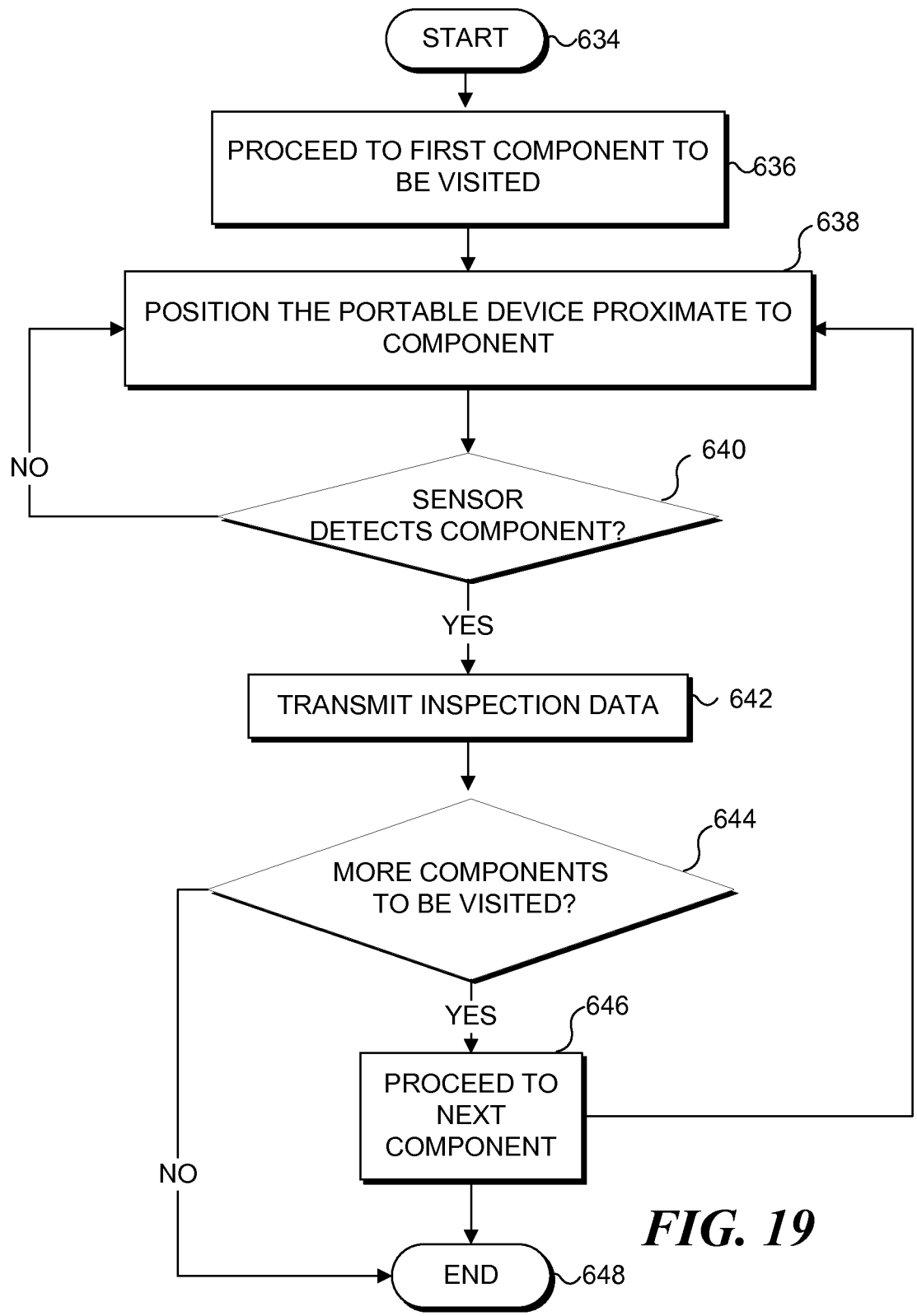
FIG. 19 is a flow chart showing the steps followed in carrying out a component inspection using the portable device described in FIG. 17.

FIG. 19 is a flow chart illustrating the steps followed in carrying out a component inspection using portable reader 632. The process begins in a start block 634, and then in a block 636 the operator proceeds to the first component to be visited. If desired, and portable reader 632 includes a memory and an optional speaker, an audible prompt can be provided. Similarly, if portable reader 632 includes a memory and an optional display, a textual prompt can be provided. In a block 638, the operator positions the portable device proximate to the component. In a decision block 640 it is determined whether or not the sensor has detected the token. Preferably, either optional speaker 518, optional display 522a, or optional visual indicator 520 is used to alert the operator that the detector has read the token. If optional positioning component 519 has been included, the alert will preferably include the GPS coordinates of the token. If the operator does not receive an indication that the sensor has read the token, the operator can reposition the sensor closer to the token until such an indication is received.

Once the sensor has detected the token, in a block 642, the inspection data are immediately transmitted to a remote device. The inspection data comprise a record generated by processor 62b that identifies the specific token read, and a time and date that the token was read and optionally, the token's GPS coordinates. If desired, and if portable reader 632 includes optional controls that enable an operator to input a condition of the component associated with the token, the inspection data can include condition data input by the operator. The inspection data can instead simply be the signal generated by the sensor, such that the inspection data are generated by a processor in the reader that is coupled to a receiver so that the wireless transmission from portable reader 632 is received and stored with the time and date generated by the receiver. Because such transmissions occur nearly instantaneously, the fact that the time and date are generated by a remote device is irrelevant.

In a decision block 644, it is determined if there are more components to be visited, and if so, the operator proceeds to the next component, as indicated in a block 646. The steps associated with blocks 638-644 are then repeated. Once no additional components remain to be inspected, the process terminates, as indicated in an end block 648.

Other Applications of the Concepts Disclosed Herein

The portable readers disclosed herein can be used in connection with many different types of inspections. While much of the discussion presented above specifically refers to safety inspections of tractors and trailers in the commercial trucking industry, or to inspections of pipelines, tunnels, railroad tracks, roads, electrical transmission lines, zoos, buildings, and fences, it should be understood that the portable readers disclosed herein are useable for many other types of inspections. There are many other types of safety inspections and security inspections unrelated to the inspections identified above, which can be facilitated by use of one or more of the portable readers in accord with the concepts disclosed herein. Other types of vehicles besides trucks, such as aircraft and buses, can also benefit from use of the concepts disclosed herein to provide proof that the components of the vehicle have been visited and observed by the operator or the person doing an inspection.

Still other applications of the concepts disclosed herein are unrelated to vehicles. For example, in a chemical processing plant or a petroleum refinery, it is common for technicians to make periodic inspections of valves, gauges, reactors, pressure vessels, and other processing equipment and system components to ensure that they are operating properly and within nominal or acceptable limits. During an inspection, a technician may note that a valve is leaking slightly, and schedule it for repair or replacement. Clearly, if the leak is of a non-hazardous substance and is insignificant in volume, there might well be no reason to shut down the process line in which the valve is installed, simply because of the leaking valve. However, if the valve controls an extremely hazardous or toxic substance, even a small leak may be unacceptable. In this case, the technician should immediately report the leaking condition of a valve to a supervisor who would then likely shut down the process or divert the flow of hazardous substance to a different process line, to enable the condition to be corrected by immediate replacement or repair of the valve. Additional applications, without any implied limitation, include the inspection of amusement park rides, such as roller coasters, etc., where the condition of many different components of the ride hardware can directly affect its safety.

Contemporaneous and Automatic Collection of Ancillary Data During an Inspection

Another embodiment disclosed herein relates to the collection of ancillary data during an inspection. The term ancillary data is intended to refer to data that does more than simply verify that an inspector was present at a particular location, checkpoint, or component during an inspection. For example, in the embodiments described above, wherein a plurality of tokens are affixed to predefined inspection locations, preferably each token will provide a unique ID to the portable device, such that the records stored by the portable device can be used to determine each location that was visited during an inspection. If data corresponding to a particular token or location is missing from the record generated by the handheld device during the inspection, such an occurrence can indicate that the particular token or location was not visited by the inspector during the inspection (of course such an omission could also indicate that there was a communication failure between that token and the portable device). Such ID data is not ancillary data, because the only function of the ID data is to verify that an inspector was present at a particular location or component. In contrast, ancillary data is intended to represent data that has an additional utility. For example, a sensor may be disposed in proximity of the component or location to be inspected. Data collected by such a sensor represents ancillary data, because such data does more than uniquely identify a particular location or component that was to be visited during an inspection. In accord with one exemplary embodiment, during an inspection, ancillary data will be collected from at least one location or component during an inspection. It should also be recognized that the ancillary data can be collected by a sensor disposed at a location other than the location of a token configured to convey the ancillary data to a portable device. While most often the ancillary data will likely be generated proximate the location where the ancillary data are conveyed to the portable device, it should be recognized that such a requirement is not a limitation of the concepts described herein. Thus, ancillary data can be collected from a first location, but conveyed to a portable device from a different location, as long as a logical connection is provided between the sensor and the token or other unit configured to convey the ancillary data to the portable device.

Thus, another embodiment described herein relates to extracting data stored in a token using a portable reader generally consistent with those described above (i.e. portable devices 20, 141, 578, and 632). It should be understood that while in one embodiment the extraction of ancillary data using a portable reader encompasses using a portable reader to extract data from a modified token (a token including a memory or coupled with a memory), the overall concept of collecting ancillary data during an inspection presented herein also encompasses conveying ancillary data from a sensor to a portable reader, regardless of whether the sensor is considered a token. While in a particularly preferred implementation the portable reader will extract the data from the sensor/token without requiring a physical connection between the sensor/token in the portable reader, the concept disclosed herein also encompasses embodiments in which a physical connection must be made between the portable reader and the sensor/token in order to extract data from the sensor/token. The IBUTTON™ computer chip, discussed above, represents an exemplary data interface that requires a physical connection with a portable reader to extract data. Of course, conventional data ports including serial ports, parallel ports, and USB ports can be used to implement a data interface requiring a physical connection with a portable reader, such that a portable reader can extract data from a sensor/token. It should thus be understood that the disclosure presented herein further encompasses a modified token or sensor configured to 1) collect ancillary data; 2) store ancillary data; and 3) enable the stored ancillary data to be automatically conveyed to a portable reader. FIGS. 20A-23 relate to the collection and conveyance of ancillary data in accord with another aspect of the concept disclosed herein.

Figure 20A:
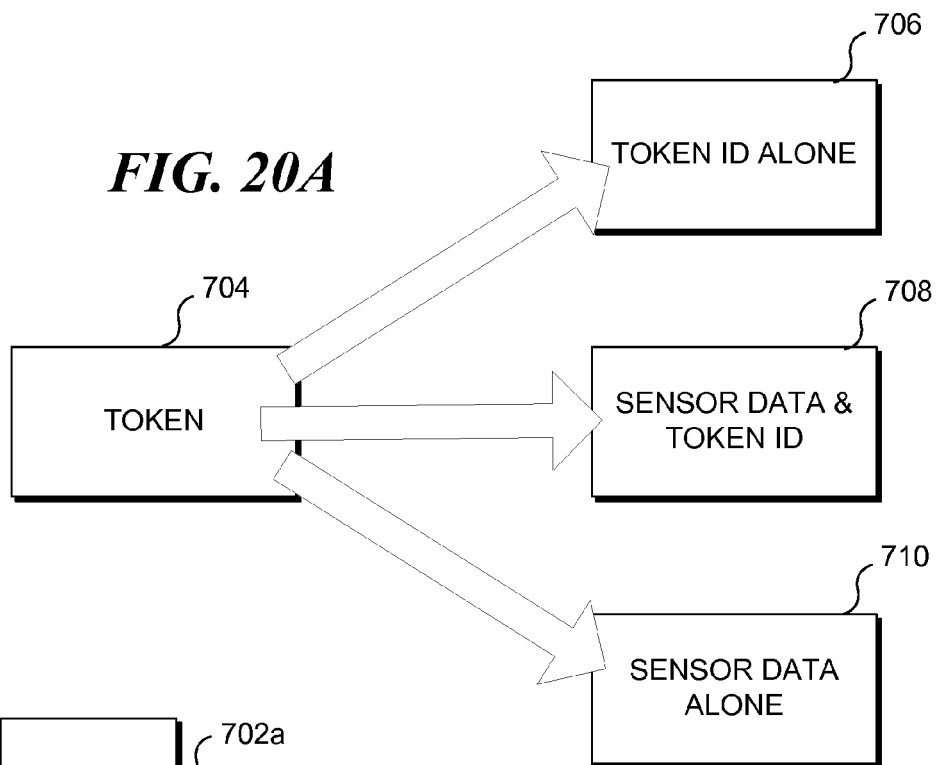
FIG. 20A is a schematic block diagram indicating three different types of data that can be collected by the portable device in accord with yet another embodiment described herein.

FIG. 20A is a block diagram schematically illustrating three different types of data that can be collected by the portable devices described herein during an inspection, in which ancillary data are collected contemporaneously with the inspection. It should be understood that consistent with the above discussion, token 704 can be implemented using a number of different components enabling data to be exchanged between the token and the portable device. While an RFID tag represents one type of token that is particularly useful for this purpose, it should be understood that the concepts disclosed herein are not limited to embodiments where tokens are implemented as RFID tags.

Token 704 can be configured to provide a token ID alone, as indicated in a block 706. As discussed above, token IDs enable individual tokens to be uniquely discriminable, such that a record stored in the portable device of a specific token ID will indicate that the user of the portable device was proximate that specific token during an inspection. As discussed in greater detail below, token 704 can be configured to communicate both ancillary data (such as sensor data) and a token ID to a portable device, as indicated in a block 708. Alternatively, token 704 can be configured to communicate only the ancillary data to a portable device, as indicated in a block 710.

Figure 20B:
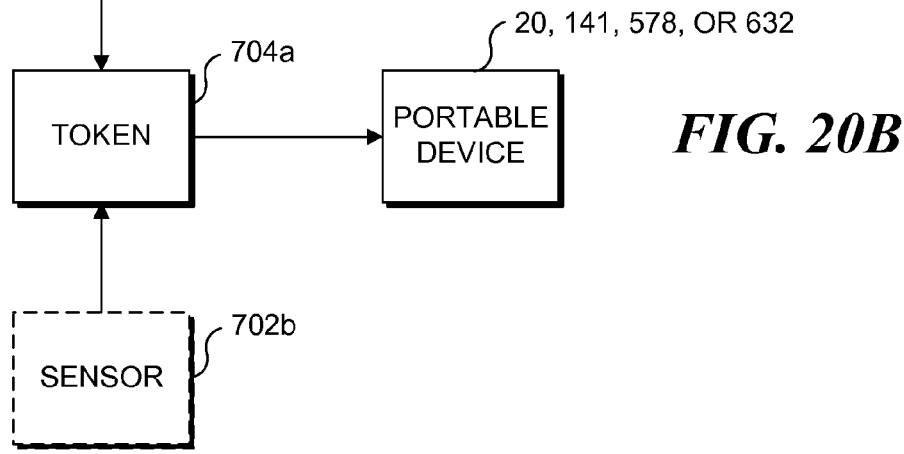
FIG. 20B is a schematic block diagram of a sensor configured to collect ancillary data logically coupled to a token, thereby enabling the portable device to automatically collect ancillary data during an inspection.

FIG. 20B is a block diagram schematically illustrating a sensor 702a logically coupled to a token 704a, such that when a portable device consistent with those described herein is proximate token 704a, the portable device will automatically collect both token ID data and ancillary data that have been collected by sensor 702a. It should be understood that more than one sensor can be logically coupled to a single token, as indicated by optional sensor 702b.

Figure 20C:
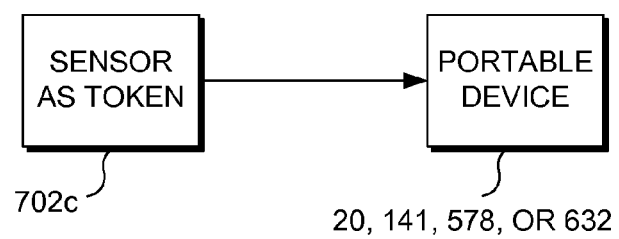
FIG. 20C is a schematic block diagram of a sensor configured to collect ancillary data and to communicate with the portable devices described herein, thereby enabling the portable devices to automatically collect ancillary data during an inspection.

FIG. 20C is a block diagram schematically illustrating a sensor 702c acting as a token, such that when a portable device consistent with those described herein is proximate sensor/token 702c, the portable device will automatically collect ancillary data collected by sensor/token 702c, but without also collecting any unique token ID. Such a configuration can be implemented when the data collected by the sensor uniquely identifies a location associated with the inspection so that an ID is not required. For example, if one inspection location specified for a vehicle inspection corresponds to an engine compartment of the vehicle, and sensor/token 702c is configured to collect engine data (e.g., one or more parameters such as oil level, oil temperature, coolant temperature, etc.), and no other engine data are collected in any other part of the inspection, the presence of such engine data in the record generated by the portable device during the inspection will provide evidence that the inspector was proximate sensor/token 702c during an inspection of the vehicle. Thus, if ancillary data collected during an inspection can uniquely identify a particular location, then a token ID need not be collected by the portable device while the operator is inspecting that location. With respect to implementing sensor/token 702c, it should be understood that sensor/token 702c encompasses any type of sensor configured to communicate with a portable device, as well as a sensor logically coupled to a token configured to communicate with the portable device, where the token is not configured to provide a unique token ID to the portable device. All possible combinations of the sensor/token embodiments illustrated in FIGS. 20A-20C are also contemplated as being useful during inspections with the portable devices, where the token/sensor at one or more locations included in an inspection can correspond to the token/sensor embodiment in any of these three Figures.

Accordingly, FIG. 21 schematically illustrates a public transportation vehicle including a plurality of tokens, some of which are configured to convey to a portable device only a token ID, some configured to convey to a portable device only ancillary data, and some configured to convey to a portable device both a token ID and ancillary data. It should be understood that the concepts disclosed herein are not limited to applications with any specific type of public transportation vehicle, and can be equally applied to vehicles such as trains, marine vessels, and aircraft. Furthermore, the broad concept of collecting ancillary data contemporaneously with an inspection, while using a portable device that provides a record of locations that were visited during an inspection, can be implemented for any type of inspection, and is not limited to an inspection of a vehicle. Thus, the exemplary embodiment disclosed with respect to FIG. 21 should not be considered to limit the applicability of the concepts disclosed herein.

Public transportation vehicle 712 is a bus, which includes a plurality of tokens 714, which are positioned in overhead luggage compartments 716. The purpose of tokens 714 is to ensure that an inspector was positioned proximate to each overhead luggage compartment during an inspection. When one of the portable devices disclosed herein is positioned proximate to any of tokens 714, the portable device will collect a unique token ID from each token 714, providing a record that the inspector was proximate to each of the overhead luggage compartments where the token is disposed. While not providing proof that the inspector actually inspected each luggage compartment, such a record does provide proof that the inspector was proximate to the overhead luggage compartments and could readily have inspected the overhead luggage compartment. Clearly, it is intended that, while proximate to each of the overhead luggage compartments, the inspector will search for any contraband, toxic material, explosive material, or any other undesirable or other materials that may have been left behind by the last group of passengers to use vehicle 712. This inspection will provide assurance to the next group of passengers that the vehicle is safe for their use. Note that tokens 714 are configured to communicate only a token ID to the portable device. It should be understood, however, that other types of inspections, and not simply inspections designed to minimize terrorist threats, are encompassed by the concepts disclosed herein and defined by the claims that follow.

Vehicle 712 also includes a plurality of tokens 720, each of which are generally positioned underneath a different group of seats 718. The purpose of tokens 720 is to ensure that an inspector was positioned proximate to each group of passenger seats during an inspection. When one of the portable devices disclosed herein is positioned proximate to any of tokens 720, the portable device will collect a unique token ID from that token, providing a record that the inspector was proximate to the corresponding group of passenger seats in the vehicle. Again, while not providing proof that the inspector actually inspected a group of seats, such a record does provide proof that the inspector was proximate to the seats in the group. It is the intention that, while proximate to each group of passenger seats, the inspector again will search for any contraband, toxic material, explosive material or any other undesirable or other materials that may have been left behind by the last group of passengers to use vehicle 712. This actual inspection will provide assurance to the next group of passengers that the vehicle is safe for their use. Note that tokens 720 are configured to communicate only a token ID to a portable device.

Vehicle 712 further includes a plurality of tokens 722, each of which are positioned proximate to the vehicle tires 723. Significantly, each token 722 is logically coupled to a sensor 724. Those of ordinary skill in the art will recognize that sensors 724 can be configured to collect a wide variety of data related to vehicle tires, which vehicle maintenance personnel may have an interest in having collected contemporaneously with an inspection of the vehicle. For example, sensors 724 can be configured to collect tire pressure data, data related to the wear of brake components associated with the tire, tire temperature data, or various combinations of different types of data values. Each token 722 is configured to communicate to a portable device (consistent with those described above) both a token ID, as well as ancillary data collected by sensors 724. The token ID can be used to correlate specific ancillary data to a specific tire. Thus, if the record automatically collected by the portable device indicates that a specific one of the vehicle's tires is seriously under inflated, the token ID associated with the ancillary data can be used to identify which tire needs attention. Those of ordinary skill in the art will recognize that once such data have been collected, a plurality of different techniques can be used to manage the data. For example, the portable device can be configured to provide a warning to the inspector that the ancillary data identify an unsafe condition that needs to be addressed before the vehicle can be placed into service. Furthermore, if the portable device is equipped to connect to a data management service (such as vehicle fleet management database, as are used by many operators of fleets of vehicles) via a remote transmission, once such an unsafe condition has been indicated in the ancillary data, the portable device can communicate the unsafe condition to the data management service. Operators at the data management service can then implement one or more appropriate responses, such as dispatching a repair crew to deal with the unsafe condition, or documenting that the vehicle is unfit for service and dispatching a replacement vehicle.

It should be recognized that many types of sensors collecting many different kinds of ancillary data are encompassed by the concepts provided herein. Other sensor/token combinations can include (without limitation) combinations configured to detect and convey vehicle mileage data, vehicle engine parameters (including engine hours), fluid levels and consumption rates, equipment parameters, environmental conditions, positional/location information, etc. The specific sensors noted above are intended to be exemplary, rather than limiting, since almost any type of sensor can be used.

Vehicle 712 also includes at least one token 726, which is configured to communicate only ancillary data to a portable device (consistent with the description above with respect to FIG. 20C). As noted above, if ancillary data communicated by token 726 uniquely identify the location associated with an inspection, then no token ID need be communicated to a portable device for the location. As indicated in FIG. 21, token 726 is disposed in the front of vehicle 712, generally proximate to the vehicle operator's seat (i.e., generally near the steering wheel and other vehicle controls). Those of ordinary skill in the art will recognize that many vehicles are equipped with onboard computers to measure and manage regular vehicle operating conditions, such as engine parameters, and in some vehicles, other vehicle subsystems as well, including brake systems, engine power transmission systems, fuel systems, and suspension systems. Thus, token 726 can be configured to communicate a variety of ancillary data collected by the onboard computer to a portable device, while the inspector is inspecting a particular portion of the vehicle, such as a driver's seat location. Some vehicles are equipped with positioning systems, such as global positioning satellite (GPS) based systems for determining the location of the vehicle. The ancillary data provided by token 726 can also include such positioning data. Note that while token 726 does not communicate a token ID to a portable device responding to the proximity of token 726, the ancillary data from token 726 can be easily differentiated from any other ancillary data collected during the inspection, thereby providing evidence that an inspector was proximate token 726 during an inspection. It should be understood that tokens communicating only ancillary data to a portable reader/device configured to communicate with the token are not limited to being implemented in any specific location, as long as ancillary data communicated to a portable reader by such a token can be used to uniquely identify that location in an inspection. Thus, the description of token 726 contained herein is intended to be exemplary, rather than limiting. Also, in some types of inspections, the data may not necessarily be of a nature that uniquely indicates the inspection was made of a specific location, but will at least indicate the data have been collected by the inspector.

In particular, with respect to the pre-trip inspection reports discussed in detail above, operators of commercial vehicles require data about their vehicles to properly manage their fleets. If such ancillary data can be automatically collected contemporaneously with a required vehicle inspection, operators of such vehicles will be able to collect valuable data with no additional effort. The only effort required is to equip their vehicles with sensors configured to collect the ancillary data, and tokens configured to communicate that ancillary data to the portable reader. Once a vehicle has been thus modified, ancillary vehicle data can be automatically collected during each inspection. With respect to pre-trip vehicle inspections, ancillary data that fleet operators are likely to desire include one or more of the following: tire pressure data for each vehicle tire, tire temperature data (e.g., maximum temperature for each vehicle tire), brake condition data (such as brake stroke data), engine hour data, fuel level data, fuel consumption data, oil temperature data, oil level data, coolant temperature data, coolant level data, engine temperature data, and vehicle location data (i.e., GPS data).

It must be emphasized that the term "ancillary data" is intended to encompass a wide variety of different types of data. Indeed, the type of ancillary data communicated to a portable device during an inspection will largely be a function of the type of inspection that is being conducted. If the inspection is related to a vehicle, the ancillary data will likely involve data relating to the condition of the vehicle or one of the components or subsystems comprising the vehicle. If the inspection is related to a building, the ancillary data will likely involve data relating to a condition of the building, or one of the building's subsystems (such as an alarm system, a computer system, a heating system, a cooling system, etc.). Generally, ancillary data encompass any data other than static data that uniquely identify a specific token.

While RFID tags represent a particularly useful token implementation, it should be recognized that currently available RFID tags generally have a relatively low baud rate for transfer of data. To accommodate this relatively low data transfer rate, RFID tags configured to communicate ancillary data can be selected to provide a plurality of outputs based on a single request for data. For example, a standard RFID tag can hold ten 4-bit nibbles of data. In order to send more data across the RFID link, a protocol can be provided that enables multiple transmissions of RFID data over the RFID data link (preferably, a 125 kHz link). An exemplary protocol will separate the data to be transmitted into a plurality of subsets. During an initial read, the RFID data link identifies the number of additional reads that will be transmitted, based on a single request for data. Subsequent reads will transmit subsets of the data collected. For example, if the data to be transmitted include token identification data, tire pressure data, and tire temperature data, each of those different types of data can be considered a subset, to be transmitted as a separate read. If more than one subset of data can be transmitted in a single read, then fewer reads than the number of subsets can be employed.

While a data interface is readily implemented enabling data to be communicated between a token or sensor and one of the portable devices described herein using an RFID tag, it should be understood that the present disclosure is not thus limited. The IBUTTON™ computer chip discussed above could also be used to implement the data interface (i.e., the IBUTTON™ computer chip might be used to simultaneously implement the controller, the memory, and the data interface). Furthermore, it should be recognized that such a data interface can be implemented with conventional data ports, including any of a parallel port, a serial port, a USB port, and a proprietary data port.

As noted above, with respect to using a portable device as described herein to automatically collect ancillary data contemporaneously with an inspection, some mechanism must be provided for enabling data to be conveyed from a token or a sensor disposed proximate a location to be inspected, to the portable device. As schematically illustrated in FIG. 22, an exemplary ancillary data conveying token 800 includes a data interface 802, a controller 804, and a memory 806 (preferably nonvolatile). Preferably, a housing 822 encloses data interface 802, controller 804, and memory 806, although if the data conveying token is placed in a protected location (such as within the cab of a vehicle), the housing is optional and not required. In one implementation, housing 822 is waterproof and shock resistant, so that token 800 can be secured to the exterior of a vehicle or location to be inspected.

Controller 804 is central to the data conveying token. The controller communicates bi-directionally with data interface 802, and memory 806. In addition, the controller is also logically coupled to one or more sensors 814, which are configured to collect ancillary data to be conveyed to a portable reader by token 800 when the portable reader is in close proximity to the token, generally as described above. As discussed above with respect to FIG. 21, examples of useful sensors include a tire pressure sensor 816, a tire temperature sensor 818, and a brake condition sensor 820. It should be understood, however, that such sensors are intended to be exemplary, rather than limiting the applicability of the present disclosure. Preferably, the controller is implemented as a microprocessor, such as a central processing unit (CPU) that executes a software program comprising machine instructions stored in the memory. Alternatively, the controller may be implemented using an application specific integrated circuit (ASIC). In either case, the controller is configured to execute a plurality of functions. Those functions will typically include determining when the portable reader/portable device is sufficiently close to token 800 to convey the ancillary data to the portable device (this function can be implemented by recognizing an interrogation signal received from the portable device), and if the amount of ancillary data exceeds a data transfer rate achievable by token 800, formatting the ancillary data such that data transmission can be achieved using a plurality of separate data transmissions based on a single request for data from the portable device, generally as described above.

Where the controller includes a microprocessor, memory 806 can be used to store machine instructions for enabling the microprocessor to implement the plurality of functions described above, as well as for storing the ancillary data.

Data interface 802 enables data to be extracted from the metering device. In a preferred embodiment, the data interface is implemented as an RFID tag, enabling data to be extracted without requiring a physical connection between the data interface and the portable reader. Ancillary data conveying tokens that implement data interface 802 using an RFID tag can be read using any of portable devices 20, 141, 578, and 632. While an initial prototype has implemented data interface 802 using an RFID tag, it should be understood that the concept is not thus limited. The IBUTTON™ computer chip discussed above could also be used to implement the data interface (i.e., the IBUTTON™ computer chip might be used to simultaneously implement the controller, the memory, and the data interface). Furthermore, it should be recognized that data interface 802 can be implemented with conventional data ports, including any of a parallel port, a serial port, a USB port, and a proprietary data port.

With respect to the disclosure provided above relating to the use of the token and a portable reader, it should be understood that data interface 802, controller 804, and memory 806, can be collectively considered as a "token." Although not like the other types of tokens discussed above, these components interact with a reader that is used to extract data through the data interface and thus to that extent, function like these other types of tokens.

In one implementation, the data interface discussed above is implemented using a coil. Those of ordinary skill in the art will recognize that RFID tags convey data using a coil. Commercially available devices including a memory, a coil (and sometimes an integrated processor) are referred to as transponder interfaces. Particularly preferred transponder interfaces, such as types U3280M™ or U3280B™, are available from Amtel Corp. of San Jose, Calif. Amtel also provides a transponder interface that includes an integrated controller, the U9280M-H™, which would avoid the need for a separate microprocessor. It should be understood that similar products from other vendors can be employed, and the present disclosure is not intended to be interpreted as being limited to a specific transponder interface integrated circuit. Furthermore, it should also be recognized that the data conveying token described above is intended to be exemplary, rather than limiting. Those of ordinary skill in the art will recognize that many different possibilities exist for conveying data to a portable device during an inspection. As noted above, data can be conveyed from a token or other component to a portable device via wireless communication or by a hardware link between the component conveying the data and the portable device. The concept of collecting ancillary data during an inspection is not limited to any specific technique for conveying data from a component disposed at a location associated with an inspection, and the portable device used to generate a record of the inspection. It should also be recognized the term token as used herein is intended to be interpreted broadly. Tokens represent any type of component that can be detected by a sensor in the portable device. Some tokens are configured to convey identifying data to the portable device, such as a token ID. Other tokens are configured to convey only ancillary data to a portable device. Still other tokens are configured to convey both ancillary data and a token ID to a portable device. Exemplary tokens include RFID tags and IBUTTON™ computer chip, although such examples are simply intended to be exemplary, rather than limiting on the scope of this disclosure.

With respect to tokens configured to convey ancillary data and no token ID, it should be recognized that an inspection could involve inspecting locations in which every single token is configured to convey only ancillary data and no token ID, in which case, the ancillary data itself provides not only the additional information comprising the values included in the data, but also provides data that can be used to verify that an inspector was proximate each location or component included in the inspection. This conclusion would require that the ancillary data conveyed by each token be sufficiently unique to enable that data to be distinguishable from data conveyed by other tokens disposed at other locations or components involved in the inspection. For example, consider an inspection of a restaurant, in which the restaurant owner wants an inspection to be performed nightly to determine that the stove has been turned off (to avoid an accidental fire), that the refrigeration unit is working properly (to avoid spoilage of food products), and that the safe has been secured (to prevent employees or others from being tempted to commit a theft). The closing manager is tasked with using a handheld device such as those described above to perform this inspection every night before leaving. A token proximate to the stove can be configured to convey ancillary data to the handheld device indicating whether the stove is on or off. The token proximate to the refrigeration unit can be configured to convey ancillary data to the handheld device indicating the ambient temperature in the refrigerator. The token proximate to the safe can be configured to convey ancillary data to the handheld device indicating whether or not the safe is locked. At the end of the inspection, if the inspection has been properly executed, the record generated by the handheld device will include: a value indicating whether the stove gas valve has been turned off or left on (corresponding to the state of the stove), a temperature value (corresponding to the temperature inside the refrigerator), and a value indicating whether the safe is locked or open (corresponding to the state of the safe). If the record contains no temperature value, it can be inferred that the manager failed to inspect the refrigerator. If the record contains no value for the stove gas valve, it can be concluded that the manager failed to inspect the stove. Similarly, if the record contains no value indicating the locked state of the safe, it can be concluded that the manager failed to inspect the safe.

Method of Automatically Collecting Ancillary Data During an Inspection

FIG. 23 is a flow chart 730 schematically illustrating a sequence of logical steps employed in using a portable device consistent with those described herein to collect ancillary data during an inspection. From a start block 732, a first step (that is optional) is to enter an operator identification number (ID) into the portable device, as indicated in a block 734. As discussed in detail above, it would be desirable to be able to identify a particular individual conducting an inspection, so if the record generated by the portable device during the inspection indicates that a particular location was missed during the inspection, feedback can be given to the correct individual, to ensure that future inspections are conducted more thoroughly.

Once the operator ID is entered (if required), the portable device prompts the operator to proceed to a first inspection point as indicated by a block 736. A decision block 738 determines if the portable device has detected the token associated with the component or location that is to be inspected, by determining if a corresponding token ID has been detected. If not, then the logic determines if the portable device has detected any ancillary data being conveyed to the portable device, as indicated in a decision block 744. If not, the logic loops until either a token ID or ancillary data is detected, indicating that the portable device is disposed proximate to the token or sensor configured to provide at least one of a token ID and ancillary data to the portable device.

Referring to decision block 738, once the portable device has detected a token ID, the token ID is stored in the memory in the portable device, as indicated in a block 740. In a decision block 742, the logic determines if any ancillary data are also being detected, along with the token ID (as discussed in detail above, some tokens are configured to convey both token ID and ancillary data to a portable reader, while other tokens are configured to convey only ancillary data, or only a token ID). If ancillary data are detected, the ancillary data are stored in the memory, as indicated in a block 746.

Referring to decision block 744, once the portable device has detected ancillary data, the ancillary data are stored in the memory in the portable device as indicated in block 746. Regardless of which path is traversed to reach block 746, the portable device then prompts the operator to perform the inspection of the location or component proximate to the token, as indicated by a block 748. As discussed in detail above, the portable device may give specific prompts to the operator indicating the conditions or components that are to be inspected. In the context of inspecting public transportation vehicles to minimize terrorist threats, the portable device will likely prompt the operator to look for unattended packages, bags, or containers, which may contain explosive devices, or toxic materials.

In a decision block 750, the controlling logic determines if there are further inspection points or locations in the inspection currently being carried out. If not, the data collected by the portable device (the ancillary data and the record of the token IDs recognized during the inspection) are transmitted or uploaded into storage at a remote site, as indicated in a block 754. As discussed in detail above, this step can be executed immediately after the inspection is completed, or at some later time, perhaps after additional inspections have been completed, and/or after the portable device has been inserted into the external cradle or docking station. Once the data are transmitted to the remote site for long-term storage, the process is complete.

Assuming that further inspection points remain in the inspection at decision block 750, a block 752 indicates that the operator is to proceed to the next inspection point, which will again preferably be determined by a prompt displayed to the operator on a display of the portable device. The logic then loops back to decision block 738, which determines if the sensor on the portable device has detected a token ID, indicating that the portable device is within the predefined maximum range of the token, thus ensuring that the operator is sufficiently close to the component to inspect it.

Alternate Verification Technology

The above disclosure emphasizes the use of a sensor that is incorporated into a portable data collection device, to determine if the portable data collection device is disposed proximate to the item to be inspected. In a particularly preferred (but not limiting) embodiment, the sensor is configured to detect a token positioned proximate the item to be inspected. This technology is particularly well-suited for the inspection of an item whose geographical position is not static. For example, where the item to be inspected is a component on a vehicle, while the component's position relative to the vehicle is likely to be static, the vehicle itself will change its geographical position frequently. If the item to be inspected has a geographical position that is static (and known), an alternative verification technology can be employed. This alternative verification technology is based on incorporating a geographical positioning system in the portable data collection device. When the geographical position of the portable data collection device corresponds to the geographical position of the item to be inspected, a verification signal can be produced by the portable data collection device, and at that signal can be used to produce an indication verifying that the user of the device was proximate to the item requiring inspection.

FIG. 24 is a functional block diagram of a portable device 760. At a minimum, portable device 760 includes a positioning component 762 (configured to determine a geographical position of portable reader 760; it will be recognized that many types of positioning components, such as GPS devices, can be employed to implement positioning component 762), a memory 64, and a processor 764 (comprising either a software controlled central processing unit (CPU) or a hard wired logic application specific integrated circuit (ASIC)). In an exemplary embodiment, processor 764 is configured to generate and store a record of the longitude coordinate and the latitude coordinate of the portable device during an inspection, based on a signal provided by positioning component 762. That record can be continuous, such that the geographical position of the portable device during an inspection of a plurality of items is continuously recorded, or intermittent, such that the geographical position of the portable device is recorded only when the portable device is disposed proximate to one of the plurality of items being inspected. The continuous record has the advantage of providing a detailed record of the whereabouts of the user of the portable device during an inspection, but such a record will consume greater memory resources. The intermittent records have the benefit of consuming less memory resources, particularly if the different items to be inspected are spaced apart (meaning that a significant portion of the continuous record will not provide verification that the user was near an item to be inspected, but rather moving from one item to another). The intermittent record functionality can be supported by providing a user actuable control (not separately shown) enabling the user to generate a portion of the intermittent record when the user approaches an inspection point. The intermittent record functionality can also be supported by providing a database of the geographical positions of inspection points to the portable device, such that the processor compares the position signal provided by positioning component 762 with the known positions of various inspection points, and a portion of the intermittent record is generated when a match is obtained. Note that depending on the accuracy of the positioning system being employed, some offset may be allowed. For example, if positioning component 762 is known to be accurate within plus or minus three meters, then an offset of plus or minus 3 meters may be employed, to ensure that a portion of the intermittent record is generated when positioning component 762 indicates that the user is plus or minus 3 meters from an inspection point. Preferably, the record will include the data and time as well.

Memory 64 preferably includes both random access memory (RAM) and read only memory (ROM), particularly where processor 764 executes machine instructions to control the functionality of the portable reader. Portable device 760 also includes a power source 583, preferably a rechargeable battery, although disposable batteries can also be employed. As discussed in detail above, docking stations including ports to facilitate recharging batteries can be employed with portable device 760.

Portable reader 760 will also typically include a data port 48b, which enables records stored in the memory of the portable reader to be uploaded to a remote device. As discussed in detail above, physical connections, such as USB cables and serial data cables can be used to transfer data. Accordingly, data port 48b preferably comprises either a USB port or a serial port, or other appropriate port for transferring data. Data port 48b can as alternatively comprise an IR transmitter, a radio frequency transmitter, a microwave transmitter, or an inductively coupled data transmitter. The data port is used to upload data to a remote device in the operator's vehicle (or to a transmitter in the operator's vehicle), or the data will alternatively remain stored in the portable reader until the operator returns to an office or terminal to upload the data. Uploading data to a vehicle (for storage in the vehicle or transmission to a remote device) is preferred, because if the portable reader is lost, only the data collected since the last upload will be lost.

It should be recognized that additional components, consistent with those generally discussed above, can also be incorporated into portable device 760 if desired. Such additional components include, but are not limited to, indicators configured to indicate to the operator that the portable device has successfully identified an inspection point, a speaker to indicate to the operator that the portable device has successfully identified an inspection point (or to provide an audible prompt to the user to instruct the user to proceed to the next inspection point), a user interface configured to enable a user to enter in additional inspection related data (such as information regarding the condition of the item to be inspected), a display, a light to provide illumination of an item that needs to be inspected, and a digital camera to record images of an item to be inspected.

In at least one embodiment, the continuous or intermittent record is stored within portable device 760, and the record will be transferred to a remote storage device at a later time. However, generally as discussed above, it would also be possible to transmit the record (continuous or intermittent) in real-time, such that the record was not temporarily stored within the portable device, reducing the memory storage requirements of the portable device.

In embodiments where a continuous record of the geographical position of the portable device during an inspection is provided, the processor in the portable device can compare the continuous record to a database of inspection points, in order to ensure that all of the inspection points for a particular inspection are actually visited during the inspection. If the processor identifies that an inspection point has been missed, the user can be alerted to return to the missed inspection point. Alternatively, the analysis of comparing the continuous record to the database of inspection points can be performed by a different processor after the continuous record has been forwarded to a remote or separate computing device. Similarly, the processor in the portable device can compare the intermittent record to a database of inspection points, to similarly ensure that all required inspection points have been visited in a particular inspection. Of course, this type of comparative analysis can also be performed after the intermittent record has been forwarded to a separate computing device.

Facilitating Sharing of Inspection Related Data with Third-Party Applications

During the performance of inspections, many different types of data related to the inspection may be collected, such as data relating to the person performing the inspection (e.g., the identity of the person and the time the person performed the inspection) and data relating to the item being inspected (e.g., the condition of the item being inspected, and/or ancillary data automatically collected during the inspection). The inspection related data include at least an indication that the item has been inspected (i.e., the verification aspect discussed above), but may include other data, such as data related to the item being inspected that are input by the user of the portable device. In an exemplary embodiment, inspection related data are stored in a memory that is accessible over a computer network, such as the Internet, or a local or wide area network. In a further exemplary (but not limiting) embodiment, a vendor supplies portable data collection devices (generally corresponding to one or more of the devices discussed in detail above) to vehicle fleet operators (or organizations that desire to perform verified inspections of various items, not necessarily limited to vehicles). The vendor manages a website or other storage site that stores inspection data for the vehicles of the operator's fleet, so that the operator can access the inspection data online.

The following aspect of the concepts disclosed herein relates to a system and method to enable inspection related data to be readily accessed over a computer network by individuals and applications requiring such data. For example, payroll processing can be facilitated where inspection data (such as pre-trip and post-trip inspections of a vehicle) include employee starting and stopping times for each day worked or for each task performed. Thus, one aspect of the concepts disclosed herein enables third party accounting applications to access inspection related data. As another example, data related to a condition of the item being inspected may be added to the inspection data, and third party maintenance applications can then be enabled to access the inspection related data. Thus, whereas other aspects of the concepts disclosed herein have emphasized verification that a person performing an inspection was proximate to an item to be inspected, and the collection of different types of data during an inspection, the following aspect of the concepts disclosed herein emphasizes the sharing of the collected data with third parties and/or for other applications.

FIG. 25 schematically illustrates a website 770 (or web portal, or more generally, a network accessible node) that hosts a memory 772 in which inspection related data (preferably acquired using a portable device consistent with those disclosed herein) are stored. Website 770 also includes a third party interface 774, which is configured to enable a third party application 776 to access inspection related data stored in memory 772.

Website 770 can be accessed via the Internet or over other types of data networks, and it should be recognized that the concepts disclosed herein can also be applied to local area and wide area networks, for example. Thus, a significant functional aspect of this technology is that memory 772 can be accessed in a networked environment, regardless of the specific details of the network. It also should be recognized that the specific implementation of memory 772 is not critical, so long as desired inspection related data can be retrieved from memory 772. Thus, memory 772 can be implemented as one or more memory storage devices coupled to a network, for example, as hard drives, optical storage devices, or other types of data storage. Those of ordinary skill in the art will recognize that other components not specifically shown or described will likely be utilized to enable access to inspection related data stored in memory 772, including but not limited to servers, routers, modems, computer displays, operating systems, search engines, connectivity hardware, and software. Apparatus used for accessing data on a memory that is coupled to a network are well known and need not be described in greater detail to enable this aspect of this technology.

Significantly, website 770 includes an interface 774 that is configured to enable a third party application to access the inspection related data stored in memory 772. In general, interface 774 will be a software module or plug-in hosted by website 770 to facilitate interaction between a third party software application (such as an accounting or maintenance program) and the inspection related data in memory 772. Interface 774 is specifically configured to enable third party software application, which normally would not be able to access website 770 or the data stored in memory 772, to access the inspection related data in a form usable by the third party application. Such third party software applications may be applications provided by vendors other than the website operator, and can include (but are not limited to) applications offered by vendors such as Dexter and Chaney, J. J. Keller, Omni Fleet, and Arsenault Associates, who currently provide large fleet personal computer-based accounting software programs and solutions.

In at least some embodiments, the inspection related data stored in memory 772 will include more than just an indication that a user of a portable device (such as those generally described above) was proximate to an item being inspected (i.e., the inspection related data will include more than a verification that the item was likely inspected).

In a first exemplary embodiment, the inspection related data will include data that can be used by a third-party accounting software application. Where the item that was inspected is a rental vehicle, and a third-party accounting application is used to provide invoicing for such rental vehicles, the following types of data represent exemplary (but not limiting) types of data that can be collected during an inspection of the vehicle: an amount of fuel stored in a fuel tank in the vehicle, an amount of mileage indicated on vehicle odometer, an amount of time that has elapsed between when the vehicle was initially rented and when the vehicle was returned, an amount of engine hours indicated on an engine hour meter (if the vehicle is so equipped), a cosmetic condition of the vehicle as returned, and any mechanical conditions identified in the inspection. Such data will likely effect the cost of the vehicle rental, and such data can likely be efficiently collected during an inspection of the rental vehicle when it is returned. Enabling the third-party accounting application to access such inspection related data could facilitate accounting operations for the rental fleet.

In a second exemplary embodiment, the inspection related data will also include data that can be used by a third-party accounting application. In this embodiment, the item being inspected is a delivery truck, and the delivery company operates a fleet of delivery trucks. Based in part on a requirement issued by the federal Department of Transportation, the fleet operator requires its drivers to perform an initial pre-trip inspection of the delivery truck before they begin any deliveries, as well as a post-trip inspection of the delivery truck after they have completed their deliveries. Each driver is paid an hourly wage. To facilitate the collection of payroll data, the delivery company has instructed each of its drivers to utilize a portable device consistent with those described above to inspect a predefined portion of the delivery truck as both their first task of their workday, and their last task of their workday. Generally as described above, the portable device will provide an indication that will be stored in the network accessible memory indicating that the driver performed an inspection of the predefined portion of the delivery truck during an initial pre-trip inspection and a post-trip inspection. A time/date stamp will be added to the indication, such that the inspection related data for the pre-trip vehicle inspection will include the driver's start time, and the inspection related data for the post-trip vehicle inspection will include the driver's ending time. Enabling the third-party accounting application to access such inspection related data will likely facilitate calculating payroll for drivers of the delivery fleet. The drivers can be trained to utilize their pre-trip and post-trip inspections as a time clock function, eliminating any need for a separate time clock system. It should be noted that the predefined inspection location used for this time clock functionality can represent a portion of the vehicle normally inspected in a pre-trip or post-trip inspection, or an additional inspection location that need only be inspected to provide the time/date stamp needed for the payroll functionality.

It should be recognized that several different modifications can be made to the second exemplary embodiment. For example, the initial start time and ending time for a driver can be manually input into a portable device using a user interface included on the portable device. Such a modification will have an advantage where a driver is required to perform additional duties either before or after the vehicle inspections (in other words, it would be unreasonable to associate the actual starting and ending times of the particular driver with the inspection of a predefined portion of the vehicle). In another possible modification, each driver will be required to obtain a key for a vehicle to which they have been assigned at a designated location. A key distribution station could be configured such that each driver would need to use the portable device to scan or read the vehicle keys as the keys are picked up (to establish a starting time) and to scan or read the vehicle keys as the keys are returned (to establish an ending time). It should also be recognized that the keys themselves need not be scanned; the key distribution station itself may include a token (or a predefined geographical location) that is scanned by the portable device to establish a starting time and an ending time. Another possible variation would be to use the portable device collecting the inspection data to identify when a driver leaves a fleet yard and when a driver returns to a fleet yard, and using those times to establish starting and ending times for payroll functionality (to provide a driver sufficient time to enter their vehicle and leave the fleet yard, some amount of additional time may automatically be added to their starting time or ending time; for example, drivers may be informed that they will have a 10 minute grace period added to their timesheet as defined by the inspection related data, to account for time required to arrive at a fleet yard, obtain their vehicle keys, and exit the fleet yard to begin their deliveries). Each fleet vehicle could be equipped with a sensor (such as an RFID tag) configured to register each time the vehicle enters and exits the fleet yard. The portable device can be used to extract data from such RFID tags, generally as discussed above with respect to the collection of ancillary data.

In a third exemplary embodiment, the inspection related data will include data that can be used by a third-party maintenance application. In this embodiment, the item being inspected once again is a delivery truck, and the delivery company operates a fleet of delivery trucks. Most fleet operators have recognized that third-party maintenance applications can reduce operating expenses by managing the maintenance records of the vehicle fleet, to ensure both that routine maintenance of the vehicle fleet is performed at regularly scheduled intervals, as well as to identify intermittent equipment failures that need to be repaired. During the above noted pre-trip inspections and post-trip inspections of the fleet vehicles, maintenance related data can be incorporated into the inspection related data collected during the inspections. The maintenance related data can be collected automatically or input by the drivers as they inspect their vehicles, or some combination thereof. Automatic data collection can be accomplished using the concepts discussed above with respect to the collection of ancillary data. Manual data collection can be accomplished using the concepts discussed above with respect to drivers entering in a relative condition of a component during the vehicle inspection. Maintenance related data that can be readily incorporated into inspection related data can include (but is not limited to) data such as: vehicle mileage, vehicle engine hours, vehicle operating parameters extracted from a vehicle onboard computer, vehicle brake condition, vehicle tire condition, vehicle cosmetic conditions, and vehicle mechanical conditions. Enabling the third-party maintenance application to access such inspection related data will likely facilitate identifying vehicles that must be scheduled for preventative maintenance or maintenance to correct a deficiency noted in an inspection.

It should be noted that although the above examples discuss sharing inspection data produced by conducting vehicle inspections, with third-party software applications, the data being shared need not be produced by making vehicle inspections, since any type of inspection data can thus be shared.

FIG. 26 is a flow chart of exemplary steps implemented to enable a third party application access to the inspection related data stored in memory 772. In a block 780, a request from a third party application is received and processed by website 770. In a block 782, website 770 determines if the requestor is authorized. For example, Fleet Operator A and Fleet Operator B may both have accounts at website 770, but neither fleet operators may wish to share data with the other. Thus, an appropriate authentication technique (and those of ordinary skill in the art will recognize that such techniques are well known in the software arts) is used to ensure that the requestor is actually authorized to access the data. It should be noted that the requestor is not simply the identity of the third-party application, but rather the party (Fleet Operator A or Fleet Operator B) using the third-party application.

In a block 784, the data being requested are identified. For example, Fleet Operator A may collect both accounting related data and maintenance related data during inspections performed on the vehicles of that operation, and both types of data are stored in memory 772. In some cases, Fleet Operator A's accounting application might want accounting data stored with the inspection related data for all the vehicles in the fleet, or only for selected vehicles. Once the desired data are identified, the corresponding inspection related data are retrieved from memory 772. Since the inspection related data are collected during an inspection, tags are appended to the data to enable the different specific types of data (such as accounting related data and inspection related data) to be readily identified, to ensure that only the data relevant to the third-party application are provided for processing by the third-party application.

In a block 786, a determination is made as to whether the data needs to be reformatted to be compatible with the specific third-party application requesting the data. If data reformatting or conversion is required, such tasks are performed. In a block 788, the requested data are provided to the third-party application.

Additional Modifications

It should be noted that the discussion above related to facilitating the sharing of inspection related data with third party applications is described in the context of including an indication that verifies that a user of the portable device used to collect the inspection related data was proximate the item to be inspected, although such an indication is not strictly required. While providing such indications will likely be beneficial, portable data collection devices (such as PDAs, and other portable computing devices including a user interface enabling inspection related data to be recorded and means to transfer the inspection related data to a network accessible memory) that do not provide such an indication verifying that the user was proximate the item to be inspected can still be used to collect inspection related data that are ultimately shared with third party applications. Thus, another aspect of the concepts disclosed herein facilitates sharing inspection related data with third party applications, without being limited to collecting the inspection related data with a device configured to provide such an indication.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system for storing inspection related data, wherein the inspection related data include at least an indication that a particular item has been inspected, the system comprising:
   (a) a network accessible memory for storing inspection related data, the memory being accessible via a data communications network;
   (b) a portable device comprising:
      (i) a sensor configured for determining, and thereby for verifying, that the portable device is proximate an item to be inspected;
      (ii) means for conveying an indication that the portable device is proximate the item to be inspected to the network accessible memory, such that the inspection related data stored by the network accessible memory for the item to be inspected comprise the indication provided by the portable device, the indication providing evidence that a user of the portable device was actually proximate an item to be inspected;
   (c) a plurality of unique tokens, each unique token being disposed at a different item to be inspected, and each unique token being detectable by the sensor; and wherein at least one token is coupled with a second sensor configured to collect ancillary data for an item, where the second sensor is not part of the portable device, such that the ancillary data are automatically conveyed to the portable device when the sensor included in the portable device detects the at least one token, the ancillary data being added to the inspection related data for that item, wherein the at least one token is configured to convey the ancillary data to the portable device by implementing the following functions:
      (i) detecting the presence of the portable device;
      (ii) acquiring ancillary data from the second sensor in response to the detection of the portable device; and
      (iii) conveying the ancillary data from the token to the portable device; and
   (d) a data interface application configured to enable a third party application to access the inspection related data stored by the network accessible memory, the data interface application implementing the functions of:
      (i) receiving a request for inspection related data from at least one of a third party accounting program and a third party maintenance program;
      (ii) determining if the requestor is approved;
      (iii) identifying the inspection related data being requested;
      (iv) reforming the inspection related data as required; and
      (v) providing the inspection related data that was requested.

2. The system of claim 1, wherein said means for conveying the indication to the network accessible memory comprises at least one element selected from a group consisting of:
   (a) a wireless communication component configured for wireless communication; and
   (b) a data port configured for wired communication.

3. The system of claim 1, wherein the portable device further comprises at least one element selected from a group consisting of:
   (a) an inspection checklist configured to facilitate execution of an inspection; and
   (b) a user interface configured to enable a user of the portable device to input data for an item, the data input by the user being added to the inspection related data for that item.

4. The system of claim 1, wherein the data interface application is configured to implement at least one function selected from a group consisting of:
   (a) extracting billing data from the inspection related data, and providing the billing data extracted to a third party accounting program; and
   (b) extracting maintenance data from the inspection related data, and providing the maintenance data extracted to a third party maintenance management program.

5. The system of claim 4, wherein the billing data comprises at least one type of data selected from the group consisting of: a starting time record, a finishing time record, an employee timesheet record, an engine hour record, and a vehicle mileage record.

6. A system for storing inspection related data, wherein the inspection related data include an indication verifying that a particular item has been inspected, the system comprising:
   (a) a network accessible memory for storing inspection related data, the memory being accessible via a data communications network;
   (b) a portable data collection device configured to collect inspection related data, the portable device being configured to tag accounting related data and maintenance related data during collection, so that such types of data can be readily extracted from the inspection related data at a later time, the portable data collection device comprising:
      (i) means for verifying that the portable data collection device is proximate an item to be inspected;
      (ii) a user interface configured to enable a user of the portable data collection device to input data; and
      (ii) means for conveying an indication that the portable data collection device is proximate the item to be inspected and any user input data to the network accessible memory, such that inspection related data stored by the network accessible memory for the item to be inspected comprises the indication provided by the portable device and any data input by the user relating to the item; and
   (c) a data interface application configured to enable a third party application to access the inspection related data stored by the network accessible memory, the data interface application implementing the function of using the tags included during the collection of the inspection related data to determine what data to allow the third party application to access.

7. The system of claim 6, wherein said means for verifying that the portable data collection device is proximate an item to be inspected comprises means to determine a geographical position of the portable data collection device, such that the portable data collection device generates the signal when the geographical position of the portable data collection device generally matches a known geographical position of the item to be inspected.

8. The system of claim 6, wherein said means for verifying that the portable data collection device is proximate an item to be inspected comprises a sensor configured to determine that the portable data collection device is proximate an item to be inspected.

9. The system of claim 8, further comprising a plurality of unique tokens, each unique token being disposed at a different item to be inspected, and each unique token being detectable by the sensor.

10. A method for verifying that an inspection of an item has been performed, and enabling data associated with the inspection of the item to be readily disseminated, the method comprising the steps of:
    (a) providing a portable device configured to verify that the portable device is sufficiently close to an item to be inspected so as to enable an operator to inspect the item;
    (b) positioning the portable device proximate the item to be inspected during an inspection;
    (c) automatically verifying that the portable device is proximate the item to be inspected, and producing an indication to that effect;
    (d) conveying the indication that the portable device was proximate the item to be inspected during the inspection to a network accessible memory, such that data associated with the inspection of the item comprise at least the indication provided by the portable device;
    (e) storing the data associated with the inspection of the item in the network accessible memory; and
    (f) enabling a third party application to access the data associated with the inspection of the item that are stored by the network accessible memory, wherein the step of enabling the third party application to access the data comprises the steps of:
        (i) receiving a request for inspection related data from at least one of a third party accounting program and a third party maintenance program;
        (ii) determining if the requestor is approved;
        (iii) identifying the inspection related data being requested;
        (iv) reforming the inspection related data as required; and
        (v) providing the inspection related data that was requested.

11. The method of claim 10, wherein the step of automatically verifying that the portable device is proximate the item to be inspected comprises at least one step selected from a group consisting of:
    (a) the step of comparing a geographical position of the portable device with a known geographical position of the item to be inspected; and
    (b) the step of using a sensor in the portable device to determine if the portable device is proximate the item to be inspected.

12. The method of claim 11, wherein the step of using the sensor in the portable device to determine if the portable device is proximate to the item to be inspected comprises the step of using the sensor to automatically detect a token disposed proximate to the item to be inspected.

13. The method of claim 12, wherein the step of using the sensor to automatically detect the token disposed proximate to the item to be inspected comprises the step of automatically conveying ancillary data collected by a second sensor coupled to the token to the portable device when the sensor detects the token, the ancillary data being added to the data associated with the inspection of the item, the second sensor not being part of the portable device, wherein the step of automatically conveying ancillary data from the token to the portable device comprises the steps of:
    (a) detecting the presence of the portable device;
    (b) acquiring ancillary data from the second sensor in response to the detection of the portable device;
    (c) determining if a quantity of the ancillary data exceeds a bandwidth between the token and the portable device, and if so, packaging the ancillary data into a plurality of data packets; and
    (d) conveying the ancillary data from the token to the portable device.

14. The method of claim 10, wherein the step of enabling a third party application to access the data associated with the inspection of the item stored by the network accessible memory comprises at least one step selected from a group consisting of:
    (a) extracting billing data from the data associated with the inspection of the item, and providing the billing data to a third party accounting program; and
    (b) extracting maintenance data from the data associated with the inspection of the item, and providing the maintenance data to a third party maintenance management program.

15. The method of claim 10, further comprising the step of enabling a user of the portable device to input inspection related data into the portable device, the inspection related data being conveyed to the network accessible memory along with the indication, such that data associated with the inspection of the item comprise the indication and any inspection related data input by the user for the item.

16. The method of claim 15, further comprising the step of automatically prompting the user of the portable device to input inspection related data for the item into the portable device when the portable device has verified that the portable device is proximate the item to be inspected.

17. The method of claim 15, wherein the inspection related data input by the user comprise at least one type of data selected from a group consisting of:
    (a) a starting time record;
    (b) a finishing time record;
    (c) an employee timesheet record;
    (d) an engine hour record;
    (e) a vehicle mileage record; and
    (f) a condition of the item being inspected.

18. A method for verifying that an inspection of an item has been performed, and enabling data associated with the inspection of the item to be readily disseminated, the method comprising the steps of:
    (a) providing a portable device configured to verifying that the portable device is sufficiently close to an item to be inspected so as to enable an operator to inspect the item;
    (b) positioning the portable device proximate the item to be inspected during an inspection;
    (c) automatically verifying that the portable device is proximate the item to be inspected, and producing an indication to that effect;

(d) enabling a user of the portable device to input inspection related data for the item into the portable device, wherein the step of enabling such input includes the steps of;
  (i) tagging any accounting related data input into the portable device, so that such accounting related data can be readily extracted from the inspection related data; and
  (ii) tagging any maintenance related data input into the portable device, so that such maintenance related data can be readily extracted from the inspection related data;
(e) conveying any inspection related data input by the user and the indication, to a network accessible memory, such that data associated with the inspection of the item comprise any user entered data and the indication provided by the portable device;
(f) storing the data associated with the inspection of the item in the network accessible memory; and
(g) enabling a third party application to access the data associated with the inspection of the item stored by the network accessible memory, wherein the step of enabling the third party application to access the data comprises the step of using the tags included during the collection of the inspection related data to determine what data to allow the third party application to access.

19. The method of claim 18, wherein the step of enabling a third party application to access the data associated with the inspection of the item stored by the network accessible memory comprises at least one step selected from a group consisting of:
  (a) extracting billing data from the data associated with the inspection of the item, and providing the billing data to a third party accounting program; and
  (b) extracting maintenance data from the data associated with the inspection of the item, and providing the maintenance data to a third party maintenance management program.

20. A portable data collection device for verifying that a checkpoint was visited during an inspection by an operator carrying the portable device, comprising:
  (a) means for automatically verifying that the portable data collection device is proximate to an item to be inspected;
  (b) a user interface configured to enable a user of the portable data collection device to input data;
  (c) a controller configured to tag accounting related data and maintenance related data during collection, so that such types of data can be readily extracted from inspection related data collected by the portable data collection device; and
  (d) means for conveying an indication that the portable data collection device is proximate the item to be inspected and any data input by the user, to the network accessible memory, such that inspection related data stored by the network accessible memory comprises the indication provided by the portable device and any data input by the user relating to the item.

21. The portable data collection device of claim 20, wherein said means for automatically verifying that the portable data collection device is proximate an item to be inspected comprises at least one element selected from a group consisting of:
  (a) means to determine a geographical position of the portable device, such that the indication is generated by the portable device when the geographical position of the portable device matches a known geographical position of the item to be inspected; and
  (b) a sensor configured to determine that the portable data collection device is proximate the item to be inspected.

* * * * *